US008945420B2

(12) United States Patent
Manabe et al.

(10) Patent No.: US 8,945,420 B2
(45) Date of Patent: Feb. 3, 2015

(54) LIQUID CRYSTAL DISPLAY AND LIQUID CRYSTALLINE MEDIUM

(75) Inventors: Atsutaka Manabe, Bensheim (DE); Kazuaki Tarumi, Seeheim-Jugenheim (DE); Hubert Spreitzer, Viernheim (DE); Axel Jansen, Darmstadt (DE); Melanie Klasen-Memmer, Heuchelheim (DE)

(73) Assignee: Merck Patent GmbH, Darmstadt (DE)

( * ) Notice: Subject to any disclaimer, the term of this patent is extended or adjusted under 35 U.S.C. 154(b) by 36 days.

(21) Appl. No.: 13/577,513

(22) PCT Filed: Jan. 17, 2011

(86) PCT No.: PCT/EP2011/000172
§ 371 (c)(1),
(2), (4) Date: Aug. 7, 2012

(87) PCT Pub. No.: WO2011/098202
PCT Pub. Date: Aug. 18, 2011

(65) Prior Publication Data
US 2012/0307177 A1 Dec. 6, 2012

(30) Foreign Application Priority Data

Feb. 11, 2010 (DE) .......................... 10 2010 007 539

(51) Int. Cl.
| C09K 19/34 | (2006.01) |
| C09K 19/30 | (2006.01) |
| C09K 19/12 | (2006.01) |
| C09K 19/20 | (2006.01) |
| C09K 19/52 | (2006.01) |
| C09K 19/06 | (2006.01) |
| C07C 19/08 | (2006.01) |
| C07C 25/13 | (2006.01) |
| C07C 43/20 | (2006.01) |
| C07C 43/18 | (2006.01) |
| C09K 19/02 | (2006.01) |
| C09K 19/16 | (2006.01) |
| C09K 19/04 | (2006.01) |

(52) U.S. Cl.
CPC ............ *C09K 19/3048* (2013.01); *C09K 19/02* (2013.01); *C09K 19/16* (2013.01); *C09K 19/3059* (2013.01); *C09K 2019/0459* (2013.01)
USPC ............ 252/299.63; 252/299.61; 252/299.66; 252/299.67; 428/1.1; 428/1.3; 349/167; 349/182; 570/128; 568/663; 568/669

(58) Field of Classification Search
USPC ............... 252/299.01, 299.6, 299.61, 299.63, 252/299.66, 299.67; 428/1.1, 1.3; 349/167, 349/182; 568/663, 669; 570/128
See application file for complete search history.

(56) References Cited

U.S. PATENT DOCUMENTS

| 5,516,949 A | 5/1996 | Shinya et al. |
| 5,663,463 A | 9/1997 | Shinya et al. |
| 5,914,071 A | 6/1999 | Shinya et al. |
| 6,468,608 B1 | 10/2002 | Bremer et al. |
| 6,468,609 B2 | 10/2002 | Marien et al. |
| 7,651,742 B2 | 1/2010 | Wittek et al. |
| 7,732,022 B2 | 6/2010 | Klasen-Memmer et al. |
| 7,854,970 B2 | 12/2010 | Klasen-Memmer et al. |
| 7,923,079 B2 | 4/2011 | Wittek et al. |

(Continued)

FOREIGN PATENT DOCUMENTS

| DE | 196 31 945 | 2/1998 |
| DE | 198 14 550 | 10/1999 |

(Continued)

OTHER PUBLICATIONS

Fuji Photo Film Co Ltd., "Cellulose acylate film, polarizer plate and liquid crystal display," Patent Abstracts of Japan, Publication Date: Oct. 26, 2006; English Abstract of JP-2006 291140.
Fujifilm Corp., "Protective film for polarizing plate, the polarizing plate and liquid crystal display," Patent Abstracts of Japan, Publication Date: Jul. 10, 2008; English Abstract of JP-2008 158483.
Goodby, J. W. et al., "*Trans*-1,2-Difluorostilbenes: Promising Materials for High Dielectric Biaxiality Ferroelectric Mixtures," Mol. Cryst. and Liq. Cryst. 2001, vol. 364, pp. 889-898.
International Search Report for PCT/EP2011/000172 dated Apr. 20, 2011.
Konica Minolta Opto Inc., "Optical film and its manufacturing method," Patent Abstracts of Japan, Publication Date: Oct. 18, 2007; English Abstract of JP-2007 271955.
Merck Patent GmbH, "Flussigkristallines medium," Espacenet, Publication Date: Aug. 14, 2002; English Abstract of DE-101 55 073.
Merck Patent GmbH, "Nematic liquid crystal mixture and displays comprising the same," Espacenet, Publication Date: Jun. 19, 2002; English Abstract of EP-1 215 270.

(Continued)

*Primary Examiner* — Geraldina Visconti
(74) *Attorney, Agent, or Firm* — Millen, White, Zelano & Branigan, P.C.

(57) ABSTRACT

The invention relates to an electro-optical liquid-crystal display which contains, as dielectric, a liquid-crystalline medium having negative dielectric anisotropy and includes a backlight which essentially only emits light having a wavelength of 400 nm or more or has, between the liquid-crystal layer and the backlight, a cut-off filter which essentially only allows light having a wavelength of 420 nm or more to pass through.
In particular, the liquid-crystalline medium comprises
a) a (first) dielectrically negative component (component A) which consists of one or more dielectrically negative compounds of the formula I

I

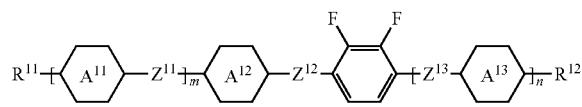

in which the parameters have the meanings indicated in claim 2, and a further (second) dielectrically negative component (component B). Very particular preference is given to the use of the liquid-crystalline media in an electro-optical display, particularly in an active-matrix display based on the VA, ECB, PSVA, FFS or IPS effect and very particularly in displays which use an LED backlight.

23 Claims, No Drawings

(56) References Cited

U.S. PATENT DOCUMENTS

| | | |
|---|---|---|
| 2008/0149891 A1 | 6/2008 | Klasen-Memmer et al. |
| 2008/0260971 A1 | 10/2008 | Wittek et al. |
| 2010/0051864 A1 | 3/2010 | Klasen-Memmer et al. |
| 2010/0085529 A1 | 4/2010 | Wittek et al. |
| 2011/0216271 A1* | 9/2011 | Suzuki et al. .................. 349/71 |

FOREIGN PATENT DOCUMENTS

| | | |
|---|---|---|
| DE | 101 57 674 | 6/2002 |
| DE | 101 55 073 | 8/2002 |
| DE | 10 2008 035 890 | 3/2009 |
| EP | 1 215 270 | 6/2002 |
| EP | 0 560 382 | 9/2003 |
| EP | 1 932 896 | 6/2008 |
| EP | 2 031 040 | 3/2009 |
| JP | 2002 249600 | 9/2002 |
| JP | 2006 282979 | 10/2006 |
| JP | 2006 291140 | 10/2006 |
| JP | 2007 271955 | 10/2007 |
| JP | 2008 158483 | 7/2008 |
| WO | WO-2006 133783 | 12/2006 |

OTHER PUBLICATIONS

Merck Patent GmbH, "Novel alkenyl compounds are useful as components in liquid crystal media which have a high specific resistance, wide operating temperature, short switching time and high contrast," Espacenet, Publication Date: Jun. 20, 2002; English Abstract of DE-101 57 674.

Sakurazawa Mamoru Nozoe Hiroshi, "Cellulose acylate film, and polarizing plate and liquid crystal display using the same," Patent Abstracts of Japan, Publication Date: Nov. 19, 2006; English Abstract of JP-2006282979.

Sekisui Chem Co Ltd., "Norbornene-based resin film and method for manufacturing the same," Patent Abstracts of Japan, Publication Date: Sep. 6, 2002; English Abstract JP-2002 249600.

Suckel Henning DIPL Ing., "LCD Video signal projector for e.g. television or computer monitor," Espacnet, Publication Date: Feb. 12, 1998; English Abstract of DE-196 31 945.

Yokokojk, O. et al., "Synthesis and properties of (E)-1,2-difluoroethylene derivatives: improvement of the ultraviolet light stability," Liquid Crystals, Aug. 2009, vol. 36, No. 8, pp. 799-807.

\* cited by examiner

LIQUID CRYSTAL DISPLAY AND LIQUID CRYSTALLINE MEDIUM

The present invention relates to liquid-crystal displays, particularly liquid-crystal displays which use the ECB (electrically controlled birefringence) effect with dielectrically negative liquid crystals in a homeotropic initial alignment, and to the liquid-crystal media used in these liquid-crystal displays. The liquid-crystal displays according to the invention are, in particular, liquid-crystal displays which use an LED backlight or those which use a cut-off filter between the backlight and the liquid-crystal cell. The liquid-crystal displays according to the invention are distinguished by a long lifetime and high reliability at the same time as a particularly short response time and at the same time a high voltage holding ratio (VHR or HR for short).

Displays which use the ECB effect have become established as so-called VAN (vertically aligned nematic) displays, besides IPS (in-plane switching) displays (for example: Yeo, S. D., Paper 15.3: "An LC Display for the TV Application", SID 2004 International Symposium, Digest of Technical Papers, XXXV, Book II, pp. 758 & 759) and the long-known TN (twisted nematic) displays, as one of the three more recent types of liquid-crystal display that are currently the most important, in particular for television applications.

The most important designs that should be mentioned are: MVA (multidomain vertical alignment, for example: Yoshide, H. et al., Paper 3.1: "MVA LCD for Notebook or Mobile PCs . . . ", SID 2004 International Symposium, Digest of Technical Papers, XXXV, Book I, pp. 6 to 9, and Liu, C. T. et al., Paper 15.1: "A 46-inch TFT-LCD HDTV Technology . . . ", SID 2004 International Symposium, Digest of Technical Papers, XXXV, Book II, pp. 750 to 753), PVA (patterned vertical alignment, for example: Kim, Sang Soo, Paper 15.4: "Super PVA Sets New State-of-the-Art for LCD-TV", SID 2004 International Symposium, Digest of Technical Papers, XXXV, Book II, pp. 760 to 763), ASV (advanced super view, for example: Shigeta, Mitzuhiro and Fukuoka, Hirofumi, Paper 15.2: "Development of High Quality LCDTV", SID 2004 International Symposium, Digest of Technical Papers, XXXV, Book II, pp. 754 to 757), and PSVA (polymer-stabilised vertical alignment or polymer-sustained vertical alignment).

In general form, the technologies are compared, for example, in Souk, Jun, SID Seminar 2004, Seminar M-6: "Recent Advances in LCD Technology", Seminar Lecture Notes, M-6/1 to M-6/26, and Miller, Ian, SID Seminar 2004, Seminar M-7: "LCD-Television", Seminar Lecture Notes, M-7/1 to M-7/32. Although the response times of modern ECB displays have already been significantly improved by addressing methods with overdrive, for example: Kim, Hyeon Kyeong et al., Paper 9.1: "A 57-in. Wide UXGA TFT-LCD for HDTV Application", SID 2004 International Symposium, Digest of Technical Papers, XXXV, Book I, pp. 106 to 109, the achievement of video-compatible response times, in particular in the switching of grey shades, is still a problem which has not yet been solved to a satisfactory extent.

ECB or VA displays, like ASV displays, use liquid-crystalline media having negative dielectric anisotropy ($\Delta\epsilon$), whereas TN and to date all conventional IPS displays use liquid-crystalline media having positive dielectric anisotropy.

In liquid-crystal displays of this type, the liquid crystals are used as dielectrics, whose optical properties change reversibly on application of an electrical voltage.

Since in displays in general, i.e. also in displays in accordance with these mentioned effects, the operating voltage should be as low as possible, use is made of liquid-crystal media which are generally predominantly composed of liquid-crystal compounds, all of which have the same sign of the dielectric anisotropy and have the highest possible value of the dielectric anisotropy.

In the media used in accordance with the present application, at most significant amounts of dielectrically neutral liquid-crystal compounds and generally only very small amounts of dielectrically positive compounds or even none at all are typically employed, since in general the liquid-crystal displays are intended to have the lowest possible addressing voltages.

The addressing voltage of the displays of the prior art is often too great, in particular for displays which are not connected directly or not continuously to the power supply network, such as, for example, displays for mobile applications.

In addition, the phase range must be sufficiently broad for the intended application.

In particular, the response times of the liquid-crystal media in the displays must be improved, i.e. reduced. This is particularly important for displays for television or multimedia applications. In order to improve the response times, it has repeatedly been proposed in the past to optimise the rotational viscosity of the liquid-crystal media ($\gamma_1$), i.e. to achieve media having the lowest possible rotational viscosity. However, the results achieved here are inadequate for many applications and therefore make it appear desirable to find further optimisation approaches.

The majority of LCDs produced today use a backlight, for example virtually all computer screens and televisions. The most widespread type of backlight at present are cold cathode fluorescent lamps (CCFLs for short, also called cold cathode light tubes). However, the radiation from these backlights contains a non-negligible proportion of short-wave light, for example in the range of wavelengths of 380 nm and below. Depending on the display substrate used, or its spectral light transparency, a not inconsiderable proportion of this relatively short-wave light, and possibly even in the near UV, reaches the liquid crystal. Since most liquid-crystal materials have only finite stability to UV radiation, and in some cases also to short-wave, visible light, this results in a limited lifetime of the displays. Also for this reason, it has already been proposed in the literature to use backlighting whose light source(s) is (are) light-emitting diodes (LEDs for short). A further advantage of the use of LED backlights is the broadening that can be achieved therewith of the colour space which can be displayed and/or the contrast. The latter effect is particularly pronounced on use of divided, separately addressable LED backlights.

There is therefore a great demand for liquid-crystal displays and corresponding liquid-crystal media which do not have the disadvantages of the displays or media from the prior art, or at least do so to a significantly reduced extent.

Surprisingly, it has been found that it is possible to achieve liquid-crystal displays which have a short response time in ECB or VA displays and at the same time have a sufficiently broad nematic phase, favourable birefringence ($\Delta n$) and a high voltage holding ratio.

Media of this type are to be used, in particular, for electro-optical displays with active-matrix addressing based on the ECB or VA effect and for IPS or FFS (fringe field switching) displays. The medium according to the invention preferably has negative dielectric anisotropy.

The principle of electrically controlled birefringence, the ECB (electrically controlled birefringence) effect or DAP (deformation of aligned phases) effect, was described for the first time in 1971 (M. F. Schieckel and K. Fahrenschon, "Deformation of nematic liquid crystals with vertical orientation in electrical fields", Appl. Phys. Lett. 19 (1971), 3912). Papers by J. F. Kahn (Appl. Phys. Lett. 20 (1972), 1193) and G. Labrunie and J. Robert (J. Appl. Phys. 44 (1973), 4869) followed.

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy $\Delta n$ and values for the dielectric anisotropy $\Delta \epsilon$ of $\leq -0.5$ in order to be suitable for use for high-information display elements based on the ECB effect. Electro-optical display elements based on the ECB effect have a homeotropic edge alignment (VA technology=vertically aligned). Dielectrically negative liquid-crystal media can also be used in displays which use the IPS or FFS effect.

Industrial application of this effect in electro-optical display elements requires liquid-crystalline media which have to meet a multiplicity of requirements. Particularly important here are chemical resistance to moisture, air and physical influences, such as heat, radiation in the infrared, visible and ultraviolet regions, and direct and alternating electric fields.

Furthermore, liquid-crystalline media which can be used industrially are required to have a liquid-crystalline mesophase in a suitable temperature range and low viscosity.

None of the series of compounds having a liquid-crystalline mesophase that have been disclosed hitherto includes a single compound which meets all these requirements. Mixtures of two to 25, preferably three to 18, compounds are therefore generally prepared in order to obtain substances which can be used as liquid-crystalline media.

Matrix liquid-crystal displays (MLC displays) are known. Non-linear elements which can be used for individual switching of the individual pixels are, for example, active elements (i.e. transistors). The term "active matrix" is then used, where in general use is made of thin-film transistors (TFTs), which are generally arranged on a glass plate as substrate.

A distinction is made between two technologies: TFTs comprising compound semiconductors, such as, for example, CdSe, or TFTs based on polycrystalline and, inter alia, amorphous silicon. The latter technology currently has the greatest commercial importance worldwide.

The TFT matrix is applied to the inside of one glass plate of the display, while the other glass plate carries the transparent counterelectrode on its inside. Compared with the size of the pixel electrode, the TFT is very small and has virtually no adverse effect on the image. This technology can also be extended to fully colour-capable displays, in which a mosaic of red, green and blue filters is arranged in such a way that a filter element is opposite each switchable pixel.

The term MLC displays here covers any matrix display with integrated non-linear elements, i.e. besides the active matrix also displays with passive elements, such as varistors or diodes (MIM=metal-insulator-metal).

MLC displays of this type are particularly suitable for TV applications, monitors and notebooks or for displays with a high information density, for example in automobile manufacture or aircraft construction. Besides problems regarding the angle dependence of the contrast and the response times, difficulties also arise in MLC displays due to insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210-288 Matrix LCD Controlled by Double Stage Diode Rings, pp. 141 ff., Paris; STROMER, M., Proc. Eurodisplay 84, September 1984: Design of Thin Film Transistors for Matrix Addressing of Television Liquid Crystal Displays, pp. 145 ff., Paris]. With decreasing resistance, the contrast of an MLC display deteriorates. Since the specific resistance of the liquid-crystal mixture generally drops over the life of an MLC display owing to interaction with the inside surfaces of the display, a high (initial) resistance is very important for displays that have to have acceptable resistance values over a long operating period.

1,2-Difluoroethylene-bridged biphenyls (also called trans-1,2-difluorostilbenes), and corresponding terphenyls, each of which may also carry one F atom or two F atoms in the 2,3-position on the 1-phenylene units present, are mentioned in Goodby, J. W., Hindmarsh, P., Hird, M., Lewis, R. A., and Toyne, K. J., Mol. Cryst. and Liq. Cryst., 2001 Volume 364, pages 889-898. However, the only representatives of the compounds presented are those containing relatively long alkyl or alkoxy end groups, which very predominantly have smectic phases.

In EP 0 560 382, alkoxy compounds having a 1,2-difluoroethylene bridge, inter alia, are disclosed and proposed, in particular, for use in liquid crystals for STN displays.

DE 101 55 073 discloses 1,2-difluoroethylene-bridged biphenyls (also called difluorostilbenes).

Dielectrically positive stilbene compounds having one F atom or having two F atoms on the ethylene bridge are disclosed in EP 1 215 270, and dielectrically neutral or positive stilbene compounds having two F atoms on the ethylene bridge are disclosed in WO 2006/133 783 and used in dielectrically positive liquid-crystal mixtures.

In EP 1 932 896, compounds having a 1,2-difluoroethylene bridge of the general formula

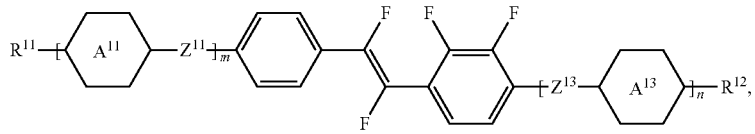

and illustrative representatives, are mentioned and proposed as constituents of liquid-crystal mixtures for, for example, VAN LCDs.

In DE 10 2008 035 890, compounds having a 1,2-ethynylene bridge on a saturated six-atom ring of the general formula

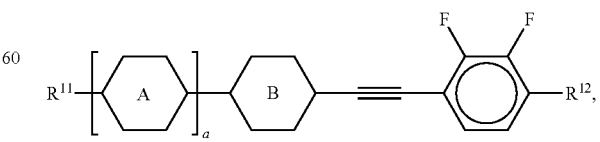

and illustrative compounds of this formula, are mentioned and used as constituents in liquid-crystal mixtures having negative dielectric anisotropy.

The disadvantage of the MLC displays known to date is based on their comparatively low stability to UV radiation, light and/or heat, which limits the lifetime and is inadequate for some applications. These displays often have an inadequate voltage holding ratio and an inadequate lifetime.

Thus, there continues to be a great demand for MLC displays having very high specific resistance at the same time as a large working-temperature range, short response times and a low threshold voltage with the aid of which various grey shades can be produced and which have, in particular, a good and stable voltage holding ratio and a long lifetime.

Surprisingly, it has now been found that this object can be achieved if nematic liquid-crystal mixtures which comprise at least one compound of the formula I and at least one further, mesogenic compound are used in these display elements, in particular if the display elements have an LED backlight and/or a cut-off filter which prevent short-wave radiation (radiation in the near-UV region or short-wave blue light) from reaching the liquid-crystal medium.

In particular, a high VHR, high stability and reliability and short response times are desired here.

The mixtures according to the invention exhibit very broad nematic phase ranges with clearing points ≥85° C., very favourable values for the capacitive threshold, relatively high values for the holding ratio and at the same time very good low-temperature stabilities at −30° C. and −40° C. as well as very low rotational viscosities. The mixtures according to the invention are furthermore distinguished by a good ratio of clearing point and rotational viscosity and by high negative dielectric anisotropy.

The invention relates to a liquid-crystal display which contains a dielectrically negative, nematic medium which comprises a) a first dielectrically negative component (component A), which consists of one or more compounds of the formula I

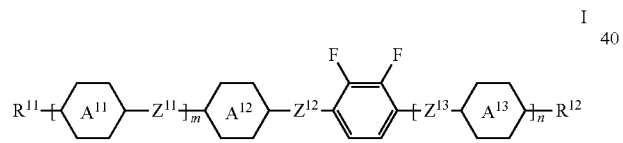

I in which $R^{11}$ and $R^{12}$ each, independently of one another, denote H, an unsubstituted alkyl or alkenyl radical having up to 15 C atoms, where, in addition, one or more $CH_2$ groups in these radicals may be replaced by —O—, —S—,

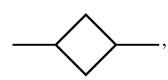

—C≡C—, —$CF_2$—O—, —O—$CF_2$—, —CO—O— or —O—CO— in such a way that O atoms are not linked directly to one another, preferably an unsubstituted alkyl, alkenyl, alkoxy, oxaalkyl or alkenyloxy radical, particularly preferably one of $R^{11}$ and $R^{12}$ denotes an alkyl or alkenyl radical and the other denotes an alkyl, alkenyl, alkoxy or alkenyloxy radical, particularly preferably $R^{11}$ denotes straight-chain alkyl, alkenyl or alkoxy, in particular $CH_3$—, $C_2H_5$—, n-$C_3H_7$, n-$C_4H_9$— or n-$C_5H_{11}$— (or $C_2H_5$—O—), and $R^{12}$ denotes straight-chain alkyl, alkenyl or alkoxy, in particular $C_2H_5$—O— or n-$C_4H_9$—O—,

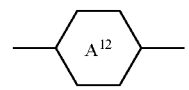

and, if present,

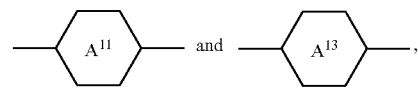

each, independently of one another, denote

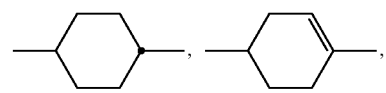

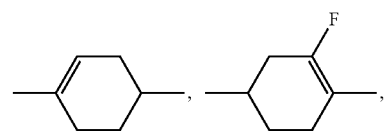

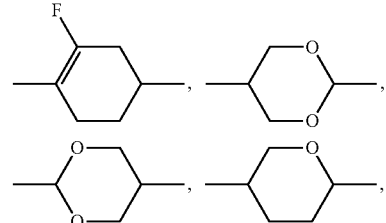

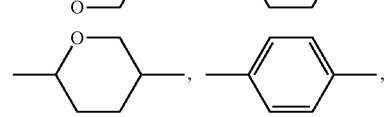

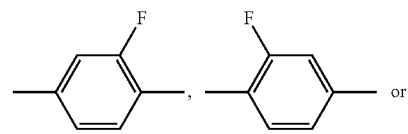 or

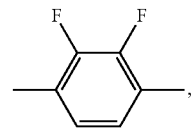

preferably

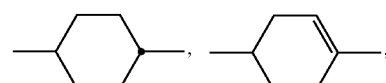

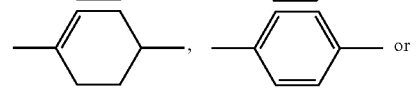 or

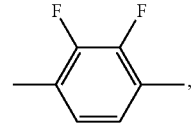

particularly preferably

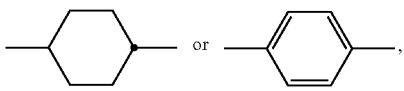

$Z^{12}$ denotes —CF=CF—, —CF=CH—, —CH=CF—, —CH=CH— or —C≡C—, preferably —CF=CF—, —CH=CH— or —C≡C— and particularly preferably —CF=CF— or —CH=CH—, $Z^{11}$ and $Z^{13}$, if present, each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, preferably a single bond, m and n, independently of one another, denote 0, 1 or 2, preferably m denotes 0, 1 or 2 and n denotes 0 or 1, particularly preferably 0, and very particularly preferably m and n both denote 0, and (m+n) preferably denotes 0, 1 or 2, particularly preferably 0 or 1 and very particularly preferably 0 b) optionally, preferably obligatorily, a second dielectrically negative component (component B), which consists of one or more compounds selected from the group of the formulae II, III and IV:

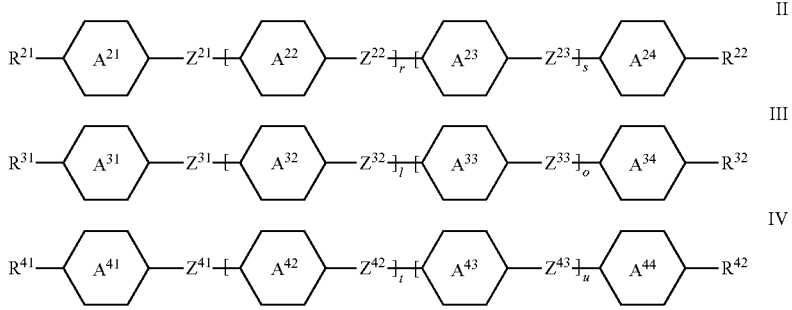

in which $R^{21}$ and $R^{22}$ each, independently of one another, denote H, an unsubstituted alkyl or alkenyl radical having up to 15 C atoms, where, in addition, one or more CH$_2$ groups in these radicals may be replaced by —O—, —S—,

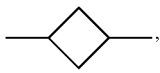

—C≡C—, —CF$_2$—O—, —O—CF$_2$—, —CO—O— or —O—CO— in such a way that O atoms are not linked directly to one another, preferably an unsubstituted alkyl, alkenyl, alkoxy or alkenyloxy radical, particularly preferably one of $R^{21}$ and $R^{22}$ denotes an alkyl or alkenyl radical and the other denotes an alkyl, alkenyl, alkoxy or alkenyloxy radical, preferably, independently of one another, alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 1 to 5 C atoms, or alkoxyalkyl, alkenyl or alkenyloxy having 2 to 7 C atoms, preferably having 2 to 4 C atoms, preferably alkenyl, where in all groups one or more H atoms may be replaced by halogen atoms, preferably F atoms, particularly preferably one of $R^{21}$ and $R^{22}$, preferably $R^{21}$, denotes an alkyl or alkenyl radical and the other denotes an alkyl, alkenyl, alkoxy or alkenyloxy radical, particularly preferably $R^{21}$ denotes straight-chain alkyl, in particular CH$_3$—, C$_2$H$_5$—, n-C$_3$H$_7$—, n-C$_4$H$_9$— or n-C$_5$H$_{11}$—, or alkenyl, in particular CH$_2$=CH—, E-CH$_3$—CH=CH—, CH$_2$=CH—CH$_2$—CH$_2$—, E-CH$_3$—CH=CH—CH$_2$—CH$_2$— or E-n-C$_3$H$_7$—CH=CH—, $R^{31}$, $R^{32}$, $R^{41}$ and $R^{42}$ each, independently of one another, have one of the meanings given for $R^{21}$ and $R^{22}$ and preferably denote alkyl having 1 to 7 C atoms, preferably n-alkyl and particularly preferably n-alkyl having 1 to 5 C atoms, alkoxy having 1 to 7 C atoms, preferably n-alkoxy and particularly preferably n-alkoxy having 2 to 5 C atoms, or alkoxyalkyl, alkenyl or alkenyloxy having 2 to 7 C atoms, preferably having 2 to 4 C atoms, preferably alkenyloxy, particularly preferably one of $R^{31}$ and $R^{32}$, preferably $R^{31}$, denotes an alkyl or alkenyl radical and the other denotes an alkyl, alkenyl, alkoxy or alkenyloxy radical, particularly preferably $R^{31}$ denotes straight-chain alkyl, in particular CH$_3$—, C$_2$H$_5$—, n-C$_3$H$_7$—, n-C$_4$H$_9$— or n-C$_5$H$_{11}$—, or alkenyl, in particular CH$_2$=CH—, E-CH$_3$—CH=CH—, CH$_2$=CH—CH$_2$—CH$_2$—, E-CH$_3$—CH=CH—CH$_2$—CH$_2$— or E-n-C$_3$H$_7$—CH=CH—, one of the rings

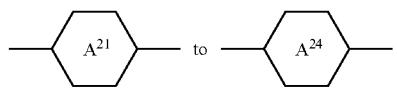

present denotes

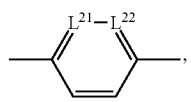

$L^{21}$ and $L^{22}$, independently of one another, denote =C(X$^2$)— and one of $L^{21}$ and $L^{22}$ alternatively also denotes =N—, where preferably at least one of $L^{21}$ and $L^{22}$ denotes =C(—F)— and the other denotes =C(—F)— or =C(—Cl)—, particularly preferably $L^{21}$ and $L^{22}$ both denote =C(—F)—, $X^2$ denotes F, Cl, OCF$_3$, CF$_3$, CH$_3$, CH$_2$F, CHF$_2$, preferably F or Cl, particularly preferably F, and the other rings, if present, each, independently of one another, denote
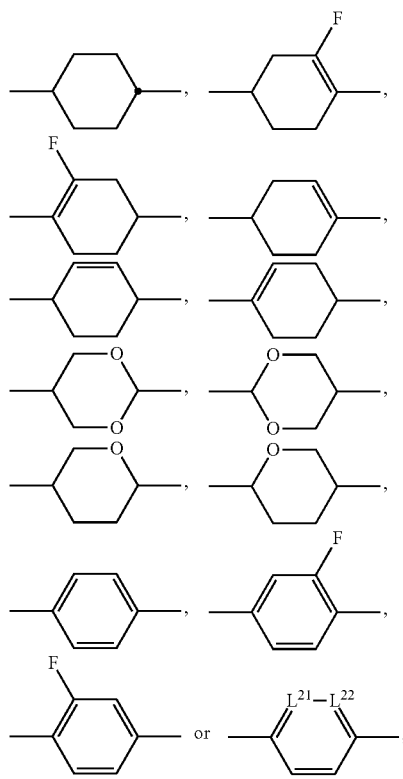
preferably
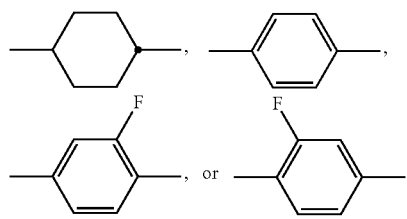
particularly preferably
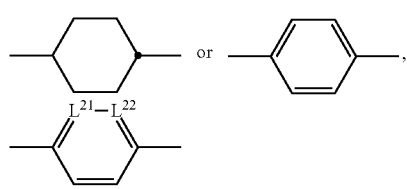
preferably denotes
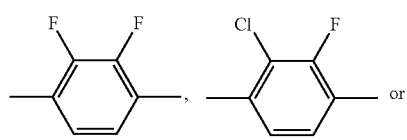
particularly preferably
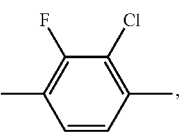
one of the rings
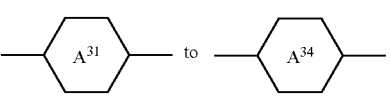
present denotes
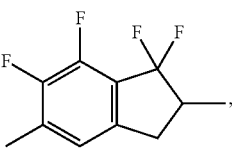
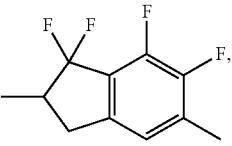
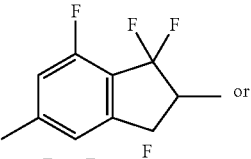
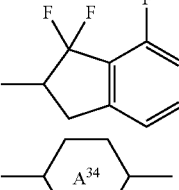
preferably denotes
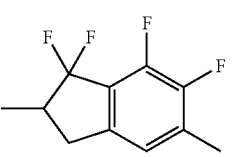
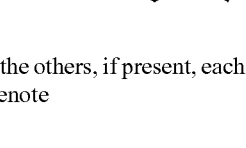
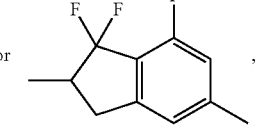
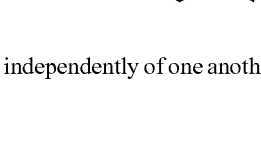
and the others, if present, each, independently of one another, denote

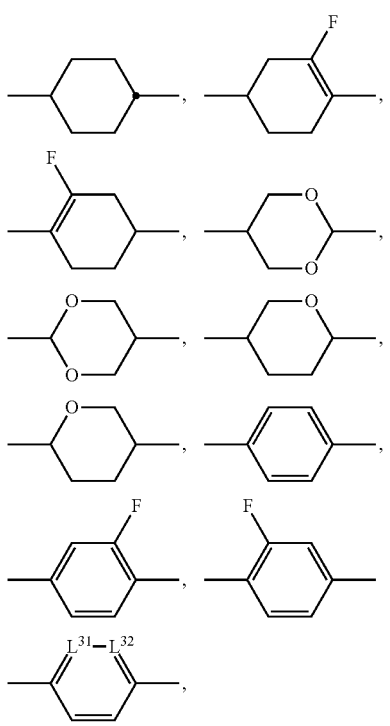

where
L$^{31}$ and L$^{32}$, independently of one another, denote =C(X$^3$)— and one of L$^{31}$ and L$^{32}$ alternatively also denotes =N—, where preferably at least one of L$^{31}$ and L$^{32}$ denotes =C(—F)— and the other denotes =C(—F)— or =C(—Cl)—, particularly preferably L$^{31}$ and L$^{32}$ both denote =C(—F)—, and
X$^3$ denotes F, Cl, OCF$_3$, CF$_3$, CH$_3$, CH$_2$F, CHF$_2$, preferably F or Cl, particularly preferably F, preferably

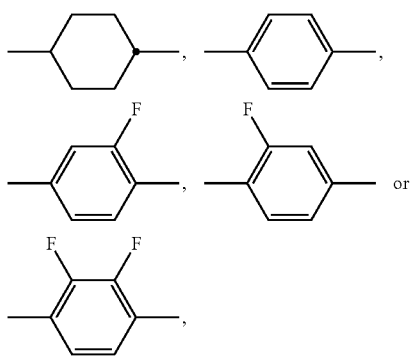

particularly preferably

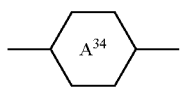

denotes

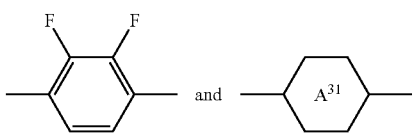

denotes

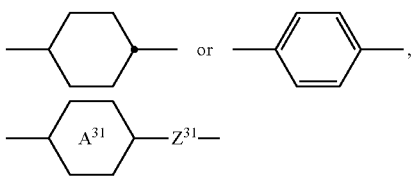

together optionally also denote a single bond, where, in the case where

denotes

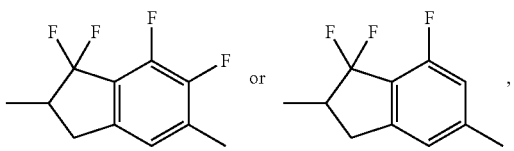

then
R$^{32}$ preferably denotes H,
one of the rings

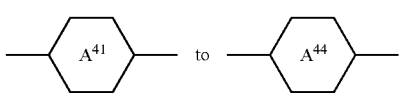

present denotes

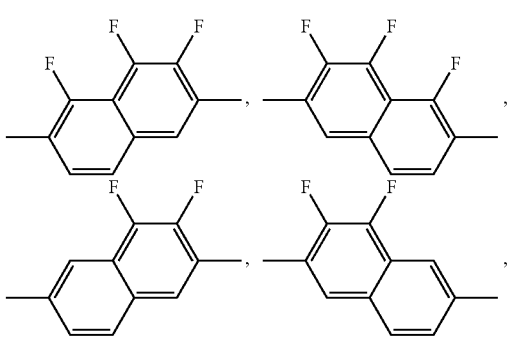

-continued

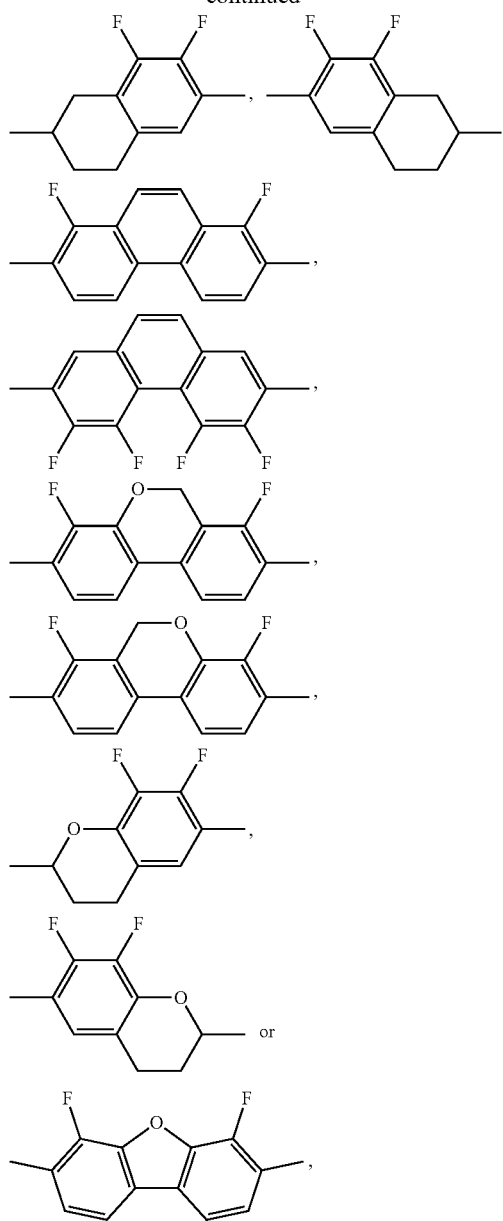

and the others, if present, each, independently of one another, denote

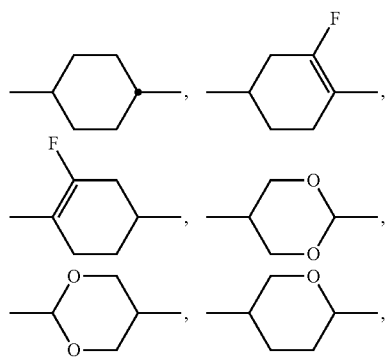

-continued

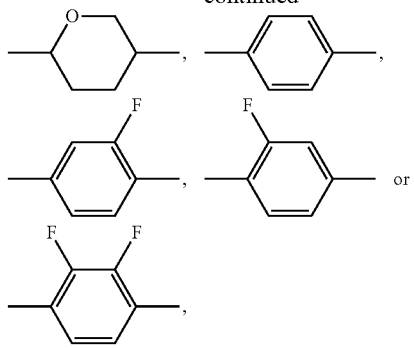

preferably

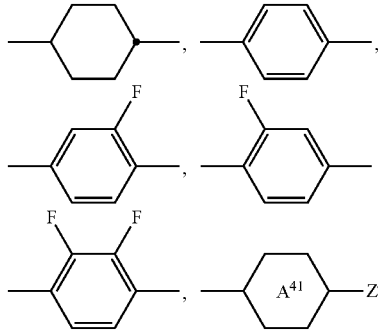

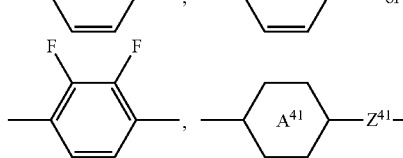

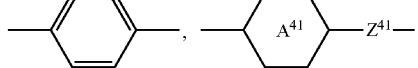

together optionally also denote a single bond, $Z^{21}$ to $Z^{23}$, $Z^{31}$ to $Z^{33}$ and $Z^{41}$ to $Z^{43}$ each, independently of one another, have one of the meanings given for $Z^{11}$ under formula I and preferably denote —CH$_2$—CH$_2$—, —CH$_2$—O—, —CH=CH—, —C≡C—, —COO— or a single bond, preferably —CH$_2$—CH$_2$—, —CH$_2$—O— or a single bond and particularly preferably —CH$_2$—O— or a single bond, $Z^{21}$ to $Z^{43}$ preferably each, independently of one another, denote —CH$_2$—CH$_2$—, —CH$_2$—CF$_2$—, —CF$_2$—CH$_2$—, —CF$_2$—CF$_2$—, —CH=CH—, —CF=CH—, —CH=CF—, —C≡C—, —CH$_2$—O—, —O—CH$_2$—, —CO—O—, —O—CO—, —CF$_2$—O—, —O—CF$_2$— or a single bond, preferably —CH$_2$—CH$_2$—, —CH=CH—, —C≡C—, —CF$_2$—O—, —O—CF$_2$— or a single bond, particularly preferably one or, if present, in each case a plurality of $Z^{21}$ to $Z^{23}$, or $Z^{31}$ to $Z^{33}$, or $Z^{41}$ to $Z^{43}$ denote a single bond, and very particularly preferably all denote a single bond, r and s each, independently of one another, denote 0 or 1, (r+s) preferably denotes 0 or 1, t and u each, independently of one another, denote 0 or 1, (t+u) preferably denotes 0 or 1, preferably 0, l and o each, independently of one another, denote 0 or 1, and (l+o) preferably denotes 0 or 1, and optionally c) a dielectrically neutral component (component C), which consists of one or more compounds of the formula V

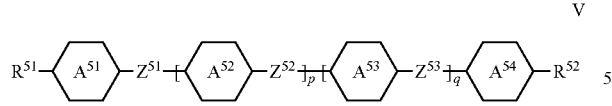

in which

R$^{51}$ and R$^{52}$ each, independently of one another, have one of the meanings given for R$^{11}$ and R$^{12}$ and preferably denote alkyl having 1 to 7 C atoms, preferably n-alkyl, particularly preferably n-alkyl having 1 to 5 C atoms, alkoxy having 1 to 7 C atoms, preferably n-alkoxy, particularly preferably n-alkoxy having 2 to 5 C atoms, alkoxyalkyl, alkenyl or alkenyloxy having 2 to 7 C atoms, preferably having 2 to 4 C atoms, preferably alkenyloxy,

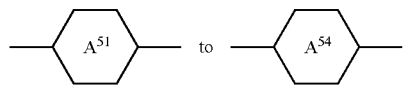

each, independently of one another, denote

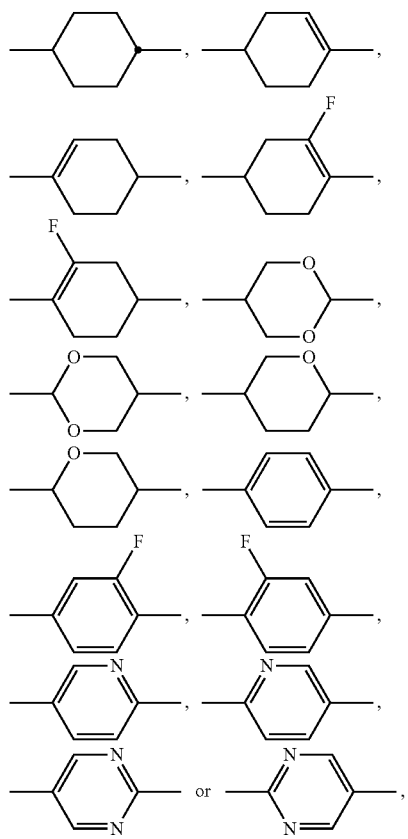

preferably

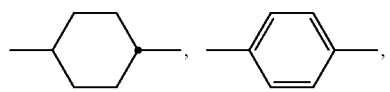

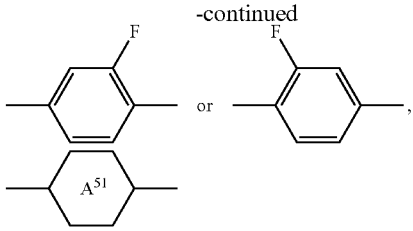

preferably denotes

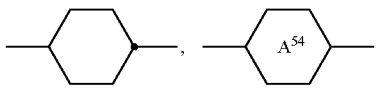

preferably denotes

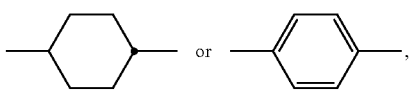

and, if present,

preferably denotes

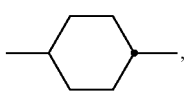

Z$^{51}$ to Z$^{53}$ each, independently of one another, have one of the meanings given for Z$^{11}$ under formula I and preferably denote —CH$_2$—CH$_2$—, —CH=CH—, —C≡C—, —COO— or a single bond, preferably —CH$_2$—CH$_2$— or a single bond and particularly preferably a single bond, p and q each, independently of one another, denote 0 or 1, (p+q) preferably denotes 0 or 1, preferably 0, and optionally d) a chiral component (component D), which consists of one or more chiral compounds.

In addition, the invention relates to novel liquid-crystal media of the composition specified above for the liquid-crystal displays.

The media according to the invention, or the media employed in the displays according to the invention, are preferably dielectrically negative.

The media according to the invention, or the media employed in the displays according to the invention, preferably comprise one, two, three, four or more, preferably two or three or more, compounds of the formula I.

Particular preference is given to compounds of the formula I in which a) R$^{11}$ and/or R$^{12}$ denote H, alkyl, alkenyl, alkoxy, oxaalkyl or alkenyloxy, preferably having up to 6 C atoms, R$^{11}$ very particularly preferably denotes alkoxy or alkenyloxy, and R$^{12}$ very particularly preferably denotes alkyl or oxaalkyl, or b) $R^{11}$ and $R^{12}$ both denote alkyl, where the alkyl radicals may be identical or different, or
c) $R^{11}$ denotes straight-chain alkoxy and $R^{12}$ denotes straight-chain alkyl or oxaalkyl.

If $R^{11}$ and/or $R^{12}$ denote alkenyl, this is preferably $CH_2=CH-$, $CH_3-CH=CH-$, $CH_2=CH-C_2H_4-$ or $CH_3-CH=CH-C_2H_4-$.

If $R^{11}$ and/or $R^{12}$ denote oxaalkyl, this is preferably $CH_3-O-CH_2-$, $CH_3-O-C_2H_4-$, $C_2H_5-CH=CH-CH_2-$, $C_2H_5-CH=CH-C_2H_4-$ or $CH_3-O-C_3H_6-$, preferably $CH_3-O-CH_2-$, $CH_3-O-C_2H_4-$ or $CH_3-O-C_3H_6-$ and particularly preferably $CH_3-O-CH_2-$.

If $R^{11}$ and/or $R^{12}$ denote alkyl, this is preferably methyl, ethyl, n-propyl, nbutyl or n-pentyl, preferably methyl, ethyl, n-propyl or n-pentyl and particularly preferably ethyl or n-propyl.

If $R^{11}$ and/or $R^{12}$ denote alkoxy, this is preferably methoxy, ethoxy or n-butoxy, preferably ethoxy or n-butoxy.

The compounds of the formula I are preferably selected from the group of the compounds of the formulae I-1 to I-5, preferably from the group of the formulae I-1, I-2, I-4 and I-5, particularly preferably of the formulae I-1 and/or I-4 and/or I-5:

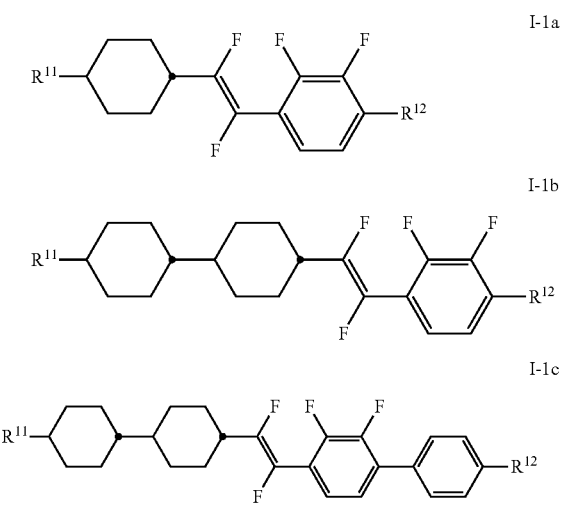

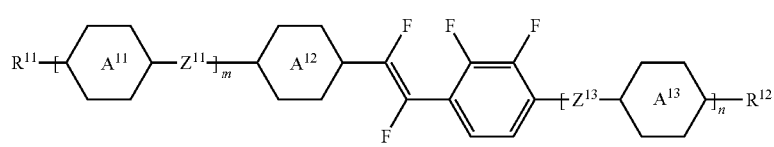

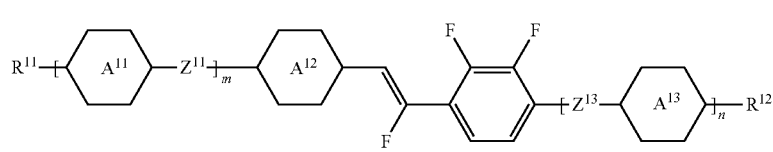

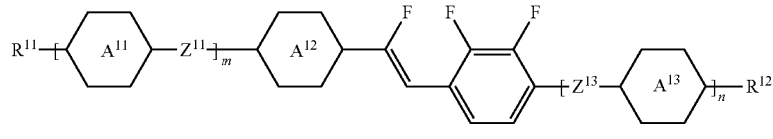

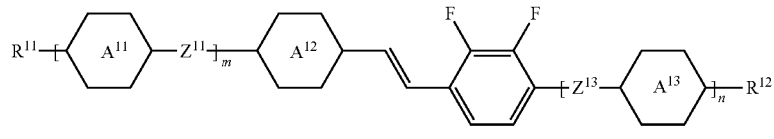

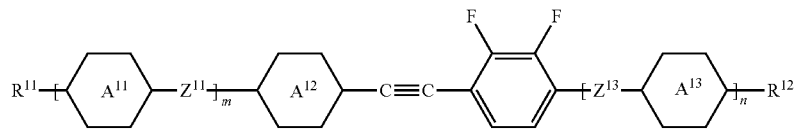

in which the parameters have the respective meanings given above under formula I.

The compounds of the formula I-1 are particularly preferably selected from the group of the compounds of the formulae I-1a to I-1g, preferably from the group of the formulae I-1a, I-1b, I-1c, I-1e and I-1f, particularly preferably of the formulae I-1a, I-1b and/or I-1c and/or I-1d, very particularly preferably of the formulae I-1a and/or I-1b:

-continued

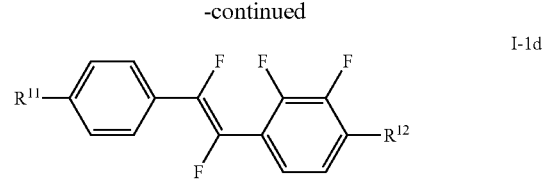

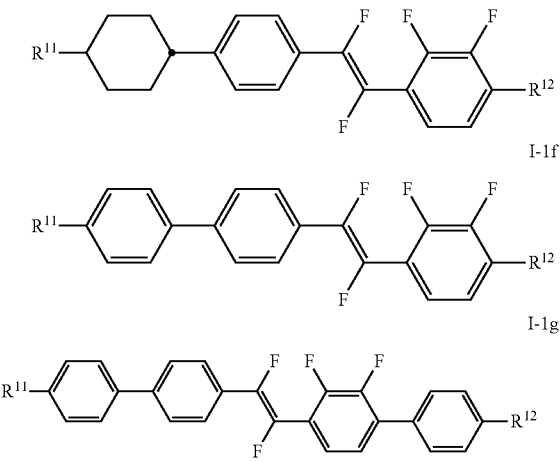

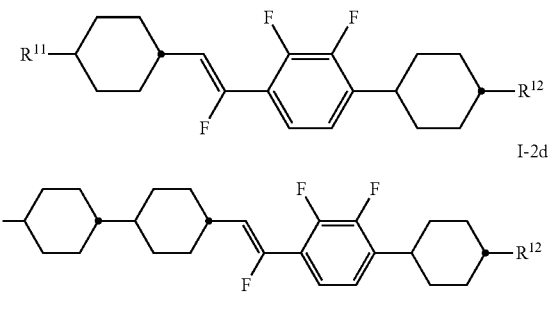

in which the parameters have the respective meanings given above under formula I and preferably in the case of formulae I-1a, I-1b, I-1c, I-1f and I-1g
$R^{11}$ denotes alkyl, alkenyl or oxaalkyl, particularly preferably alkyl or alkenyl, very particularly preferably alkyl, and
$R^{12}$ denotes alkyl, alkenyl or alkoxy, particularly preferably alkoxy, in the case of formula I-1d
$R^{11}$ denotes alkyl, alkenyl or alkoxy, particularly preferably alkyl or alkoxy, and
$R^{12}$ denotes alkyl, alkenyl or alkoxy, particularly preferably alkoxy, in the case of formula I-1e
$R^{11}$ denotes alkyl, alkenyl or oxaalkyl, particularly preferably alkyl or alkenyl, very particularly preferably alkyl, and
$R^{12}$ denotes alkyl, alkenyl or alkoxy, particularly preferably alkyl or alkoxy.

In the case of the compounds of the formulae I-1a, I-1b, I-1c, I-1d, I-1e and I-1g, particular preference is given to the compounds in which $R^{11}$ denotes alkyl or alkenyl and $R^{12}$ denotes alkoxy or $R^{11}$ and $R^{12}$ denote alkoxy.

In the case of the compounds of the formula I-1b, particular preference is given to the compounds in which $R^{11}$ denotes alkyl or alkenyl and $R^{12}$ denotes alkoxy or $R^{11}$ and $R^{12}$ denote alkyl.

The compounds of the formula I-2 are particularly preferably selected from the group of the compounds of the formulae I-2a to I-2d, preferably from the group of the formulae I-2a and I-2b, particularly preferably of the formula I-2a:

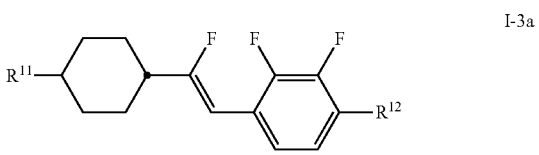

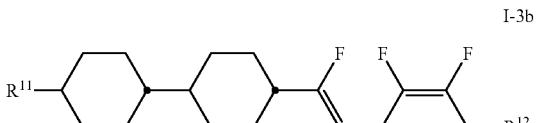

in which the parameters have the respective meanings given above under formula I and preferably in the case of formula I-2b
$R^{11}$ denotes alkyl, alkenyl or alkoxy, particularly preferably alkyl, and
$R^{12}$ denotes alkyl, alkenyl or alkoxy, particularly preferably alkoxy.

The compounds of the formula I-3 are particularly preferably selected from the group of the compounds of the formulae I-3a to I-3d, preferably from the group of the formulae I-3a and I-3b, particularly preferably of the formula I-3a:

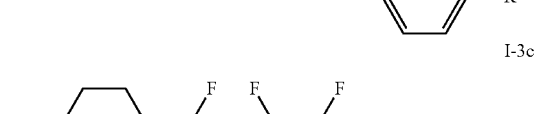

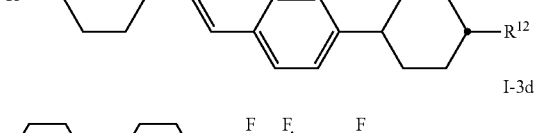

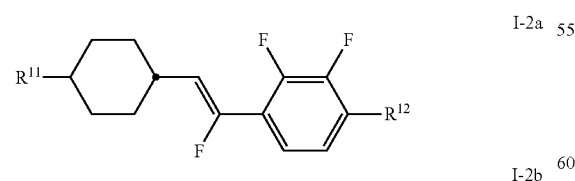

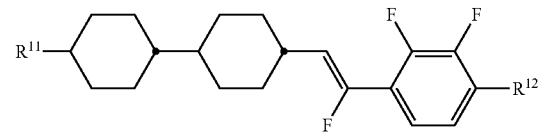

in which the parameters have the respective meanings given above under formula I and preferably in the case of formula I-3b
$R^{11}$ denotes alkyl, alkenyl or alkoxy, particularly preferably alkyl, and
$R^{12}$ denotes alkyl, alkenyl or alkoxy, particularly preferably alkoxy.

The compounds of the formula I-4 are particularly preferably selected from the group of the compounds of the formulae I-4-a to I-4d, preferably from the group of the formulae I-4a and I-4b, particularly preferably of the formula I-4a:

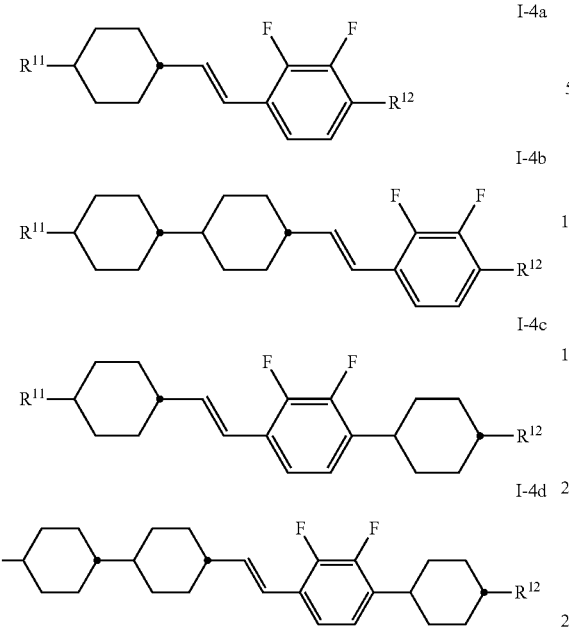

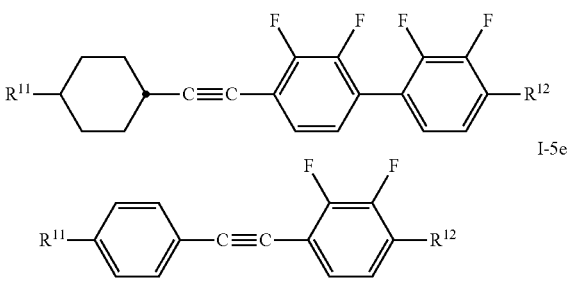

in which the parameters have the respective meanings given above under formula I and preferably in the case of formulae I-4a and I-4b R$^{11}$ denoted alkyl or alkenyl, particularly preferably alkyl, and R$^{12}$ denotes alkyl or alkoxy, particularly preferably alkoxy.

In the case of the compounds of the formula I-4a, particular preference is given to the compounds in which R$^{11}$ denotes alkyl and R$^{12}$ denotes alkoxy or R$^{11}$ denotes alkenyl and R$^{12}$ denotes alkoxy and very particularly the combination in which R$^{11}$ denotes alkyl and R$^{12}$ denotes alkoxy.

In the case of the compounds of the formula I-4b, particular preference is given to the compounds in which R$^{11}$ denotes alkyl and R$^{12}$ denotes alkyl or R$^{11}$ denotes alkyl or alkenyl and R$^{12}$ denotes alkoxy and very particularly the combination in which R$^{11}$ denotes alkyl and R$^{12}$ denotes alkoxy.

The compounds of the formula I-5 are particularly preferably selected from the group of the compounds of the formulae I-5a to I-5e:

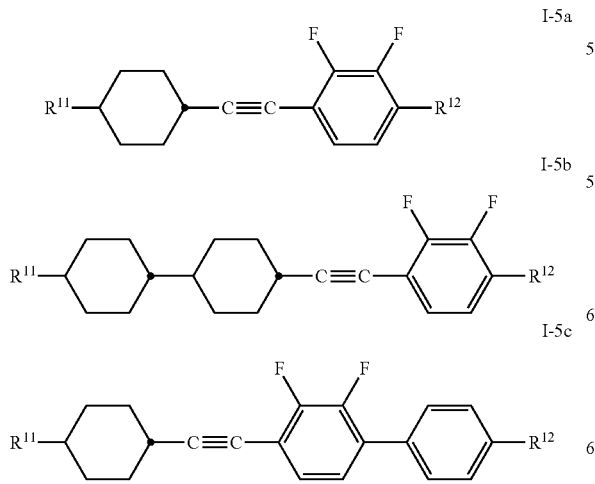

in which the parameters have the respective meanings given above under formula I and preferably in the case of the formulae I-5a and I-5b R$^{11}$ denotes alkyl or alkenyl, particularly preferably alkyl, and R$^{12}$ denotes alkyl, alkenyl or alkoxy, particularly preferably alkoxy, and in the case of the formulae I-5c and I-5d R$^{11}$ denotes alkyl or alkenyl and R$^{12}$ denotes alkyl, alkenyl or alkoxy.

In the case of the compounds of the formula I-5a, particular preference is given to the compounds in which R$^{11}$ denotes alkyl and R$^{12}$ denotes alkyl, R$^{11}$ denotes alkyl and R$^{12}$ denotes alkoxy or R$^{11}$ denotes alkenyl and R$^{12}$ denotes alkoxy and very particularly the combination in which R$^{11}$ denotes alkyl and R$^{12}$ denotes alkoxy.

In the case of the compounds of the formula I-5b, particular preference is given to the compounds in which R$^{11}$ denotes alkyl and R$^{12}$ denotes alkyl, R$^{11}$ denotes alkyl and R$^{12}$ denotes alkoxy, R$^{11}$ denotes alkenyl and R$^{12}$ denotes alkoxy or R$^{11}$ denotes alkenyl and R$^{12}$ denotes alkyl and very particularly the combination in which R$^{11}$ denotes alkyl and R$^{12}$ denotes alkoxy.

In the case of the compounds of the formula I-5c, particular preference is given to the compounds in which R$^{11}$ denotes alkyl and R$^{12}$ denotes alkyl or alkenyl.

In the case of the compounds of the formula I-5d, particular preference is given to the compounds in which R$^{11}$ denotes alkyl and R$^{12}$ denotes alkyl or alkoxy.

In a preferred embodiment, the medium comprises one or more compounds of the formula II, selected from the group of the compounds of the formulae IIA to IID, preferably IIA to IIC and very particularly preferably IIA and IIB:

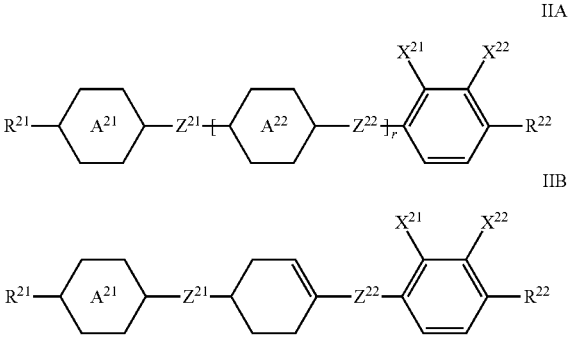

-continued

IIC

R²¹—[A²¹]—Z²¹—[phenyl]—Z²²—[phenyl(X²¹)(X²²)]—R²²

IID

R²¹—[A²¹]—Z²¹—[A²²]—Z²²—[A²³]—Z²³—[A²⁴]—R²² in which the parameters have the respective meanings indicated above, but in formula IIA, in the case where r=1,

—[A²²]— does not denote

—[phenyl]— and does not denote

—[cyclohexenyl]—, and preferably

—[A²¹]— and —[A²²]—, independently of one another, denote

—[cyclohexyl]—, —[tetrahydropyran-O]— or

—[O-tetrahydropyran]—, and particularly preferably

—[A²¹]— denotes

—[cyclohexyl]—, $R^{21}$ denotes alkyl, $R^{22}$ denotes alkyl or alkoxy, particularly preferably $(O)C_vH_{2v+1}$, $X^{21}$ and $X^{22}$ both denote F, $Z^{21}$ and $Z^{22}$, independently of one another, denote a single bond, —CH$_2$—CH$_2$—, —CH=CH—, —CH$_2$O—, —OCH$_2$—, —O—, —CH$_2$—, —CF$_2$O— or —OCF$_2$—, preferably a single bond or —CH$_2$CH$_2$—, particularly preferably a single bond, p denotes 1 or 2, and v denotes 1 to 6.

In a preferred embodiment, the medium comprises one or more compounds of the formula II, selected from the group of the compounds of the formulae II-1 to II-16:

II-1

R²¹—[cyclohexyl]—[difluorophenyl]—R²²

II-2

R²¹—[cyclohexyl]—CH₂CH₂—[difluorophenyl]—R²²

II-3

R²¹—[phenyl]—[difluorophenyl]—R²²

II-4

R²¹—[cyclohexyl]—[cyclohexyl]—[difluorophenyl]—R²²

II-5

R²¹—[cyclohexyl]—[phenyl]—[difluorophenyl]—R²²

II-6

R²¹—[phenyl]—[phenyl]—[difluorophenyl]—R²²

II-7

R²¹—[phenyl]—[difluorophenyl]—[phenyl]—R²²

II-8
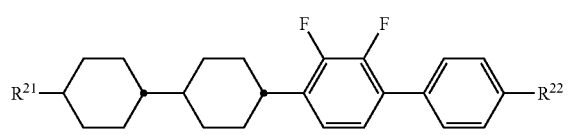

II-9
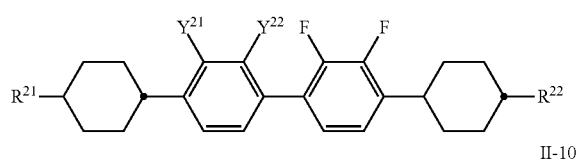

II-10
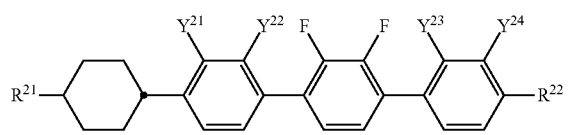

II-11
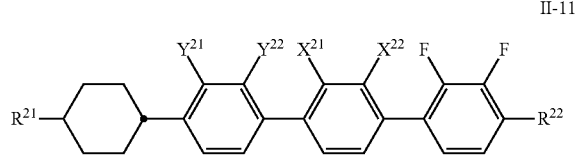

II-12
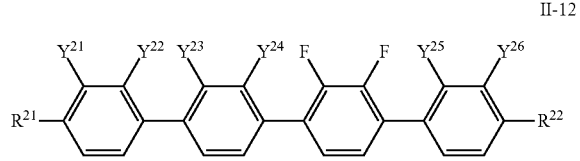

II-13
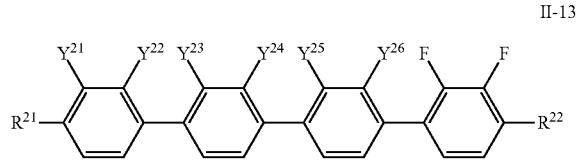

II-14
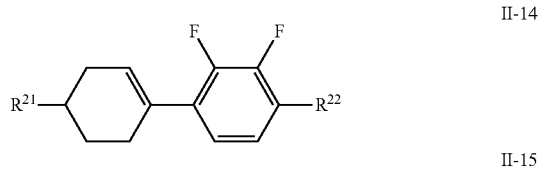

II-15
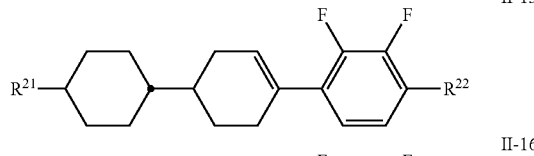

II-16
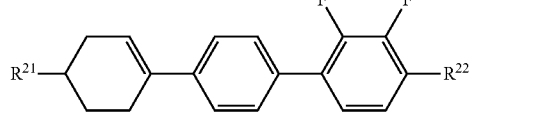

in which $Y^{21}$ to $Y^{26}$, independently of one another, denote H or F, and $X^{21}$ and $X^{22}$ both denote H or one of $X^{21}$ and $X^{22}$ denotes H and the other denotes F, but preferably at most four, particularly preferably at most three and very particularly preferably one or two of $Y^{21}$ to $Y^{26}$, $X^{21}$ and $X^{22}$ denote F, and the other parameters have the respective meanings indicated above for formula II and preferably $R^{21}$ denotes alkyl or alkenyl and $R^{22}$ denotes alkyl, alkenyl, alkoxy or alkenyloxy, preferably $(O)C_vH_{2v+1}$, and v denotes an integer from 1 to 6.

R preferably denotes straight-chain alkyl or alkoxy, each having 1 to 6 C atoms, or alkoxyalkyl, alkenyl or alkenyloxy having 2-6 C atoms, particularly preferably alkyl having 1-5 C atoms, preferably methyl, ethyl, propyl, butyl, or furthermore alkoxy having 1-5 C atoms, preferably hexyl, methoxy, ethoxy, propoxy or butoxy.

The medium preferably comprises one or more compounds of the formula III, selected from the group of the compounds of the formulae III-1 and preferably of the formula III-2:

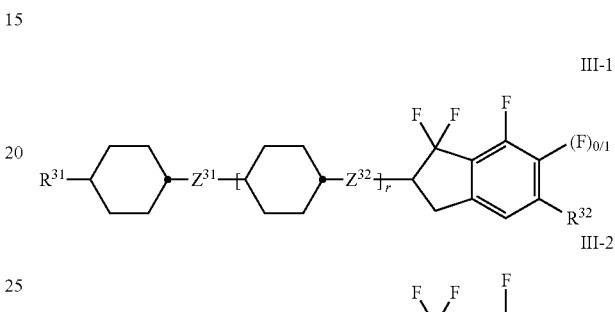

III-1

III-2 in which the parameters have the respective meanings indicated above for formula III and preferably $R^{31}$ denotes alkyl or alkenyl, $R^{32}$ denotes alkyl, alkenyl, alkoxy or alkenyloxy, $Z^{31}$ denotes a single bond and r denotes 0.

In a further preferred embodiment, the medium (additionally) comprises one or more compounds of the formula IV, preferably selected from the group of the compounds of the formulae IV-1 to IV-8, preferably of the formulae IV-7 and/or IV-8:

IV-1
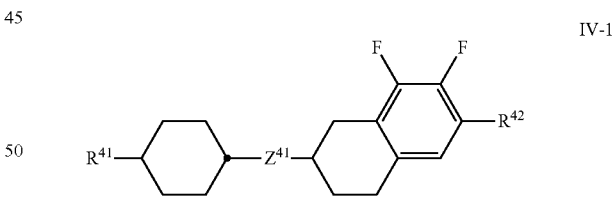

IV-1
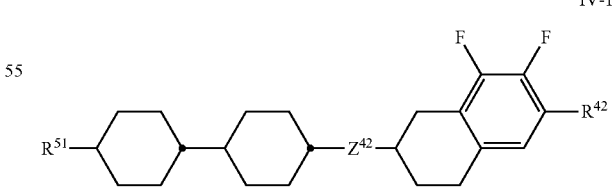

IV-3
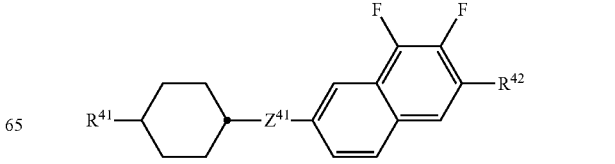

IV-4
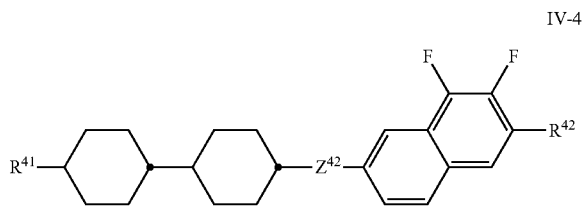

IV-5
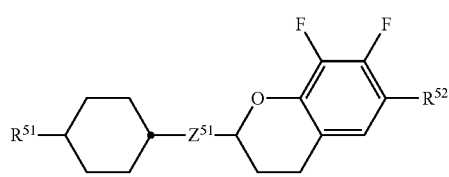

IV-6
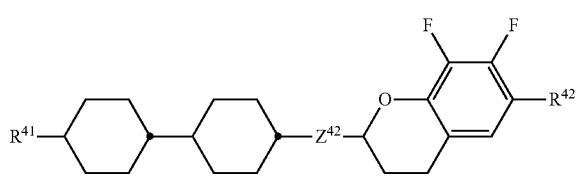

IV-7
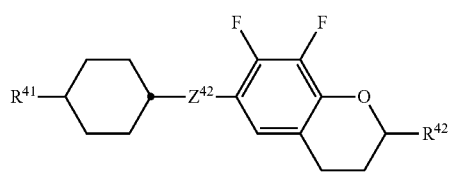

IV-8
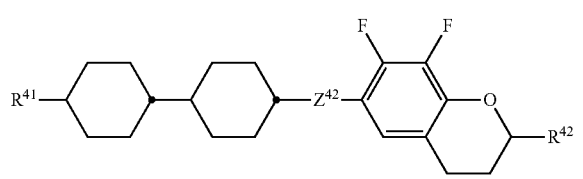

in which the parameters have the respective meanings indicated above for formula IV and preferably $R^{41}$ denotes alkyl or alkenyl and $R^{42}$ denotes alkyl, alkenyl, alkoxy or alkenyloxy.

In this embodiment, preferably if the medium comprises one or more compounds of the formulae IV-7 and/or IV-8, the medium can essentially consist of compounds of the formulae I, II, IV and V.

In a further preferred embodiment, the medium (additionally) comprises one or more compounds which contain a fluorinated phenanthrene unit, preferably compounds of the formula IV, preferably selected from the group of the compounds of the formulae IV-9 and IV-10:

IV-9
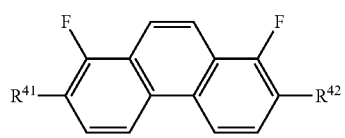

IV-10
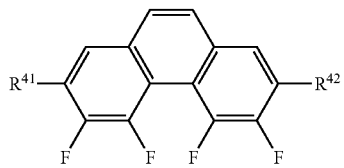

in which the parameters have the respective meanings indicated above for formula IV and preferably $R^{41}$ denotes alkyl or alkenyl and $R^{42}$ denotes alkyl, alkenyl, alkoxy or alkenyloxy.

In a further preferred embodiment, the medium (additionally) comprises one or more compounds which contain a fluorinated dibenzofuran unit, preferably compounds of the formula IV, preferably of the formula IV-11, IV-11

in which the parameters have the respective meanings indicated above for formula IV and preferably $R^{41}$ denotes alkyl or alkenyl and $R^{42}$ denotes alkyl, alkenyl, alkoxy or alkenyloxy.

In a further preferred embodiment, the medium (additionally) comprises one or more compounds of the formula IV selected from the group of the compounds of the formulae IV-12 to IV-15, preferably from the group of the formulae IV-12 and IV-14, particularly preferably of the formula IV-12:

IV-12
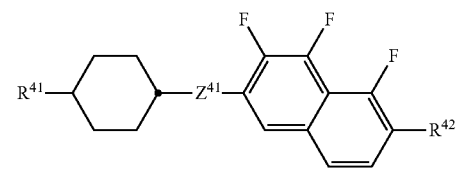

IV-13
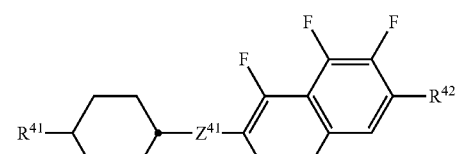

IV-14
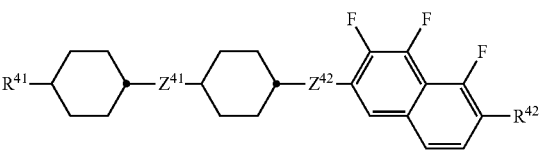

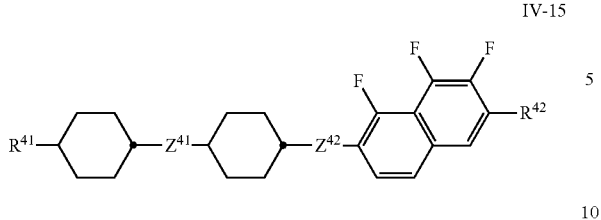

IV-15 in which the parameters have the respective meanings indicated above under formula IV and preferably in formulae IV-12 and IV-13

$Z^{41}$ denotes —CH$_2$—CH$_2$—, —CH$_2$—O— or a single bond, preferably —CH$_2$—O— or a single bond, particularly preferably —CH$_2$—O—, in formulae IV-14 and IV-15

$Z^{41}$ denotes —CH$_2$—CH$_2$— or a single bond, preferably a single bond, and $Z^{42}$ denotes —CH$_2$—CH$_2$—, —CH$_2$—O— or a single bond, preferably —CH$_2$—O— or a single bond, particularly preferably —CH$_2$—O—.

In a further preferred embodiment, the medium comprises one or more compounds of the formula V in which at least two of the rings

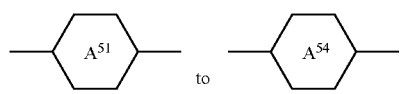

to each, independently of one another, denote

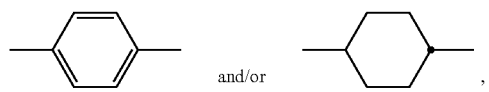

and/or where two adjacent rings are very particularly preferably linked directly, and preferably denote

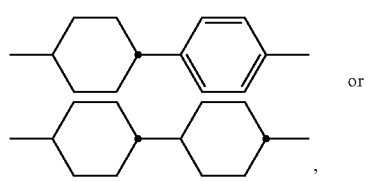

or

, where one or more H atoms in the phenylene ring may be replaced, independently of one another, by F or CN, preferably by F, and one or two non-adjacent CH$_2$ groups of the cyclohexylene ring or one of the two cyclohexylene rings may be replaced by O atoms.

In a further preferred embodiment, the medium comprises one or more compounds of the formula V from the group of the compounds of the formulae V-1 to V-14, preferably selected from the group of the compounds of the formulae V-1 to V-12, preferably from the group V-1 to V-7, V-11 and V-12 and particularly preferably from the group V-1 and V-4:

V-1

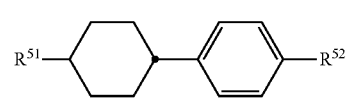

V-2

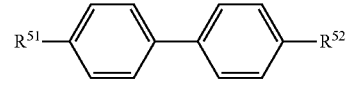

V-3

V-4

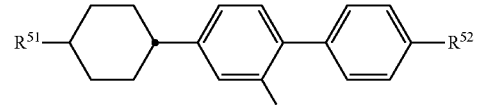

V-5

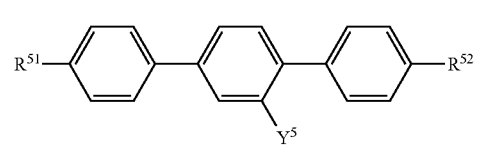

V-6

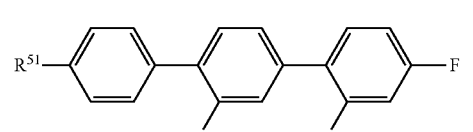

V-7

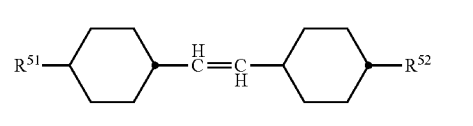

V-8

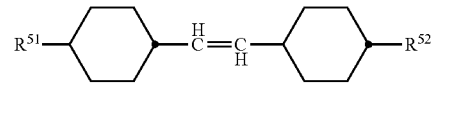

V-9

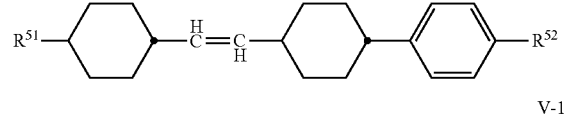

V-10

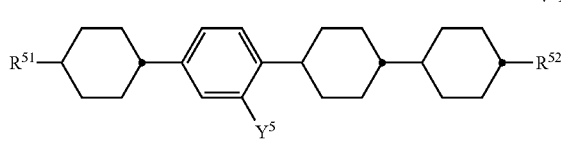

V-11

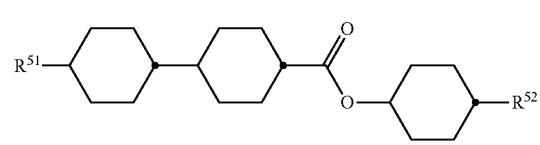

V-12

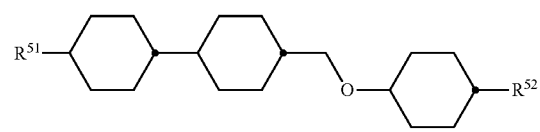

-continued

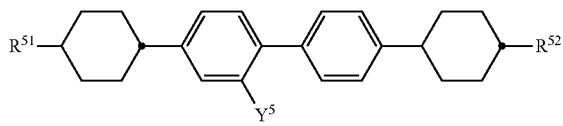

V-13

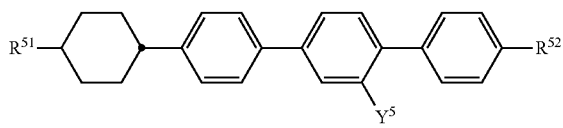

V-14 in which the parameters have the respective meanings indicated above for formula V and
$Y^5$ denotes H or F
and preferably
$R^{51}$ denotes alkyl or alkenyl and
$R^{52}$ denotes alkyl, alkenyl or alkoxy, preferably alkyl or alkenyl, particularly preferably alkenyl.

The medium particularly preferably comprises one or more compound(s) of the formula V-1, selected from the group
of the formula V-1 in which $R^{51}$ denotes vinyl or 1-propenyl and $R^{52}$ denotes alkyl, preferably n-alkyl, particularly preferably $R^{51}$ denotes vinyl and $R^{52}$ denotes propyl, and
of the formula V-1 in which $R^{51}$ and $R^{52}$, independently of one another, denote vinyl or 1-propenyl, preferably $R^{51}$ denotes vinyl and particularly preferably $R^{51}$ and $R^{52}$ denote vinyl.

The medium according to the invention particularly preferably comprises compounds of the formula V-1 in amounts of 20% by weight or more, in particular 25% by weight or more, very particularly preferably 30% by weight or more, in particular compounds of the formula V-1c'

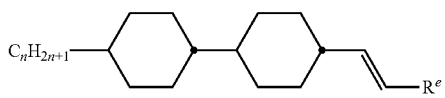

V-1c' in which
n denotes 3, 4 or 5, and
$R^e$ denotes H, $CH_3$ or $C_2H_5$.

In a further preferred embodiment, the medium comprises one or more compounds of the formula V-2.

In a further preferred embodiment, the medium comprises one or more compounds of the formula V-3. The proportion of these biphenyls in the mixture as a whole is preferably 3% by weight or more, in particular 5% by weight or more.

Particularly preferred compounds of the formulae V-3 are the compounds of the following formulae:

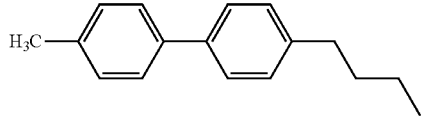

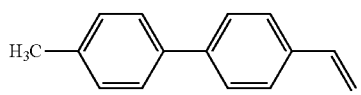

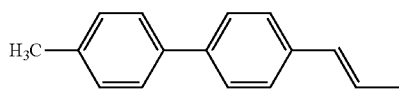

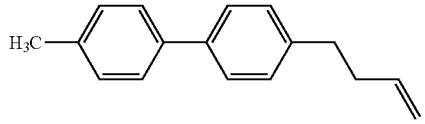

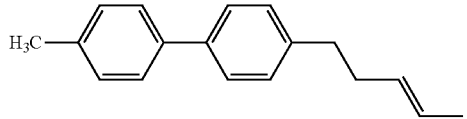

and of these in particular those of the final formula.

In a preferred embodiment, the medium comprises one or more compounds of the formula V-4, particularly preferably one or more compound(s) in which $R^{51}$ denotes vinyl or 1-propenyl and $R^{52}$ denotes alkyl, preferably n-alkyl, particularly preferably $R^{51}$ denotes vinyl and $R^{52}$ denotes methyl.

In a preferred embodiment, the medium comprises one or more compounds of the formula V-5, particularly preferably one or more compound(s) in which $R^{51}$ denotes alkyl, vinyl or 1-propenyl and $R^{52}$ denotes alkyl, preferably n-alkyl.

In a further preferred embodiment, the medium comprises one or more compounds of the formula V-6, preferably selected from the group of the compounds PGP-2-3, PGP-2-4, PGP-2-5, PGP-3-3 and PGP-3-4, and from the group of the formulae PGP-1-2V, PGP-2-2V and PGP-3-2V, where the acronyms (abbreviations) are explained in Tables A to C and illustrated by examples in Table D.

In a further preferred embodiment, the medium comprises one or more compounds of the formula V-13.

In a further preferred embodiment, the medium comprises one or more compounds of the formula V-14.

The chiral compound or the chiral compounds which can be used in component D of the liquid-crystal media in accordance with the present invention is or are selected from the known chiral dopants. Component D preferably consists predominantly, particularly preferably essentially and very particularly preferably virtually completely of one or more compounds selected from the group of the compounds of the following formulae VI to VIII:

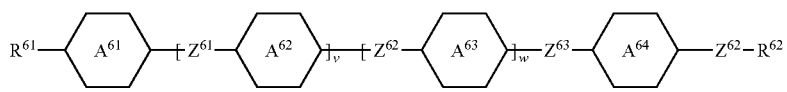

VI

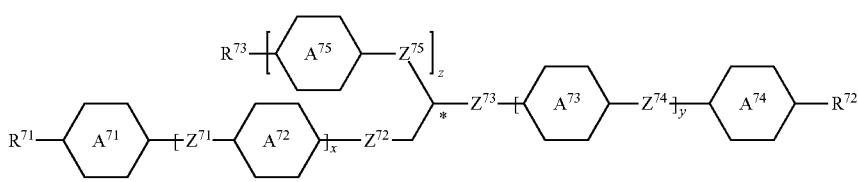

VII

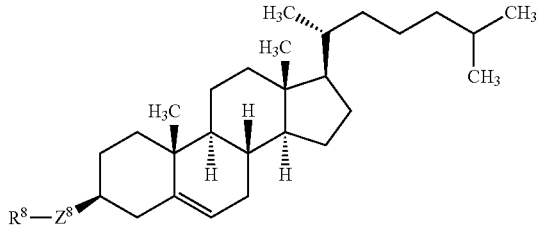

VIII in which

R$^{61}$ and R$^{62}$, R$^{71}$ to R$^{73}$ and R$^8$ each, independently of one another, have the meaning given above for R$^{51}$ under formula V, and alternatively denote H, CN, F, Cl, CF$_3$, OCF$_3$, CF$_2$H or OCF$_2$H, and at least one of R$^{61}$ and R$^{62}$ denotes a chiral group, Z$^{61}$ and Z$^{62}$, Z$^{71}$ to Z$^{73}$ and Z$^8$ each, independently of one another, denote —CH$_2$CH$_2$—, —CH═CH—, —COO—, —O—CO— or a single bond, preferably Z$^{61}$, Z$^{62}$, Z$^{71}$, Z$^{74}$ and Z$^{75}$ denote a single bond, Z$^{63}$, Z$^{72}$ and Z$^{73}$ denote —COO— or a single bond, Z$^{72}$ preferably denotes —COO—, and Z$^{73}$ and Z$^8$ denote —O—CO—,

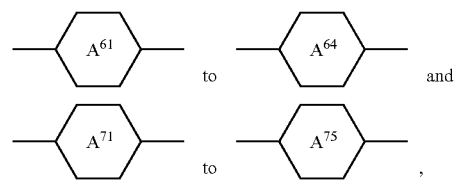

each, independently of one another, denote

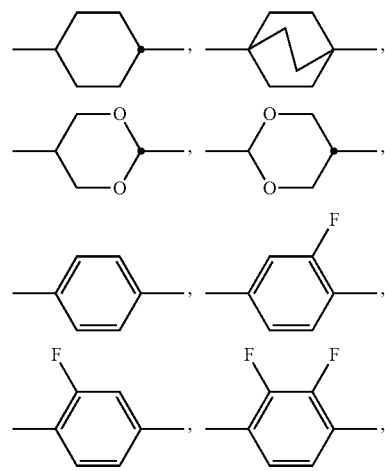

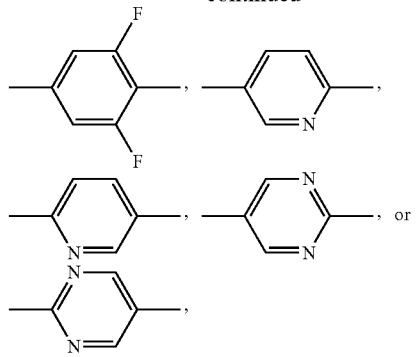

u and v, and x, y and z each, independently of one another, denote 0 or 1, preferably u and v both denote 0 and x and v both denote 1.

Particularly preferred embodiments of the present invention satisfy one or more of the following conditions.

i. The liquid-crystalline medium has a birefringence of 0.085 or more.

ii. The liquid-crystalline medium comprises one or more compounds selected from the group of the sub-formulae I-1 to I-45.

iii. The concentrations of the individual homologous compounds of the formula I in the medium are in the range from 1 to 40%, preferably from 2 to 35% and particularly preferably from 5 to 30%.

iv. The proportion of compounds of the formula II in the medium is 10% or more.

v. The concentrations of the individual homologous compounds of the formula II are in the range from 2 to 16%, preferably from 3 to 12% and particularly preferably from 4 to 10%.

vi. The liquid-crystalline medium comprises one or more particularly preferred compounds selected from the group of the compounds of the formulae II-1, II-2, II-3 and/or II-14, preferably of the formulae CY-n-Om, CY-V-On, CY-nV-Om, CEY-n-Om, CEY-V-On, CEY-nV-Om, PY-n-Om, PY-V-On, PY-nV-Om, LY-n-Om, LY-V-On and/or LY-nV-Om, where the concentration of the individual homologous compounds is preferably in the range from 2% or more to 15% or less and the total concentration of the compounds in the medium is 60% or less.

vii. The liquid-crystalline medium comprises one or more particularly preferred compounds selected from the group of the compounds of the formulae II-4, II-5, II-15 and/or II-16, preferably of the formulae CCYn-m, CCY-V-n, CCY-n-m, CCY-n-Om, CCY-V-On, CCY-nV-Om, CPYn-m, CPY-V-n, CPY-nV-m, CPY-n-Om, CPY-V-On, CPY-nV-Om, CLY-n-m, CLY-V-n, LY-nV-m, CLY-n-Om, CLY-V-On, CLY-nV-Om, where the concentration of the individual homologous compounds is preferably in the range from 2% or more to 20% or less and the total concentration of the compounds in the medium is 50% or less.

viii. The liquid-crystalline medium comprises one or more particularly preferred compounds selected from the group of the compounds of the formulae II-6 and/or II-17, preferably of the formulae PPY-n-m, PPYV-n, PPY-nV-m, PYP-n-m, PYP-V-n and/or PYP-nV-m, where the concentration of the individual homologous compounds in the case of PYP-n-m, PYP-V-n and PYP-nV-m is preferably in the range from 2% or more to 20% or less and in the case of PPY-n-m, PPY-V-n and PPY-nV-m is preferably in the range from 2% or more to 10% or less and the total concentration of the compounds in the medium is 30% or less.

ix. The medium comprises one or more compounds of the formula III, preferably of the formulae III-1 and/or III-2, particularly preferably of the formula III-2a, where the concentration of the individual homologous compounds in the medium is preferably 2% or more to 15% or less and the total concentration is 30% or less.

x. The medium comprises one or more compounds of the formula IV.

xi. The medium comprises one or more compounds of the formula V, preferably in a total concentration of 10% or more to 80% or less.

xii. The medium comprises one or more particularly preferred compounds selected from the group of the compounds of the formulae V-1 and V-4.

xiii. The medium comprises one or more particularly preferred compounds selected from the group of the compounds of the formulae V-2, V-3, V-5, V-12 and V-13 and/or V-7.

xiv. The liquid-crystalline medium comprises one or more particularly preferred compounds of the formula V-1 selected from the sub-formulae mentioned below:

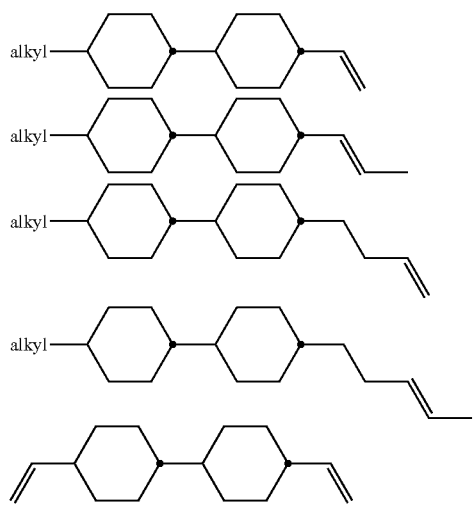

in which alkyl has the meaning given above and preferably denotes, in each case independently of one another, alkyl having 1 to 6, preferably having 2 to 5, C atoms and particularly preferably n-alkyl.

xv. The liquid-crystalline medium comprises one or more compounds of the formula V selected from the group of the following formulae:

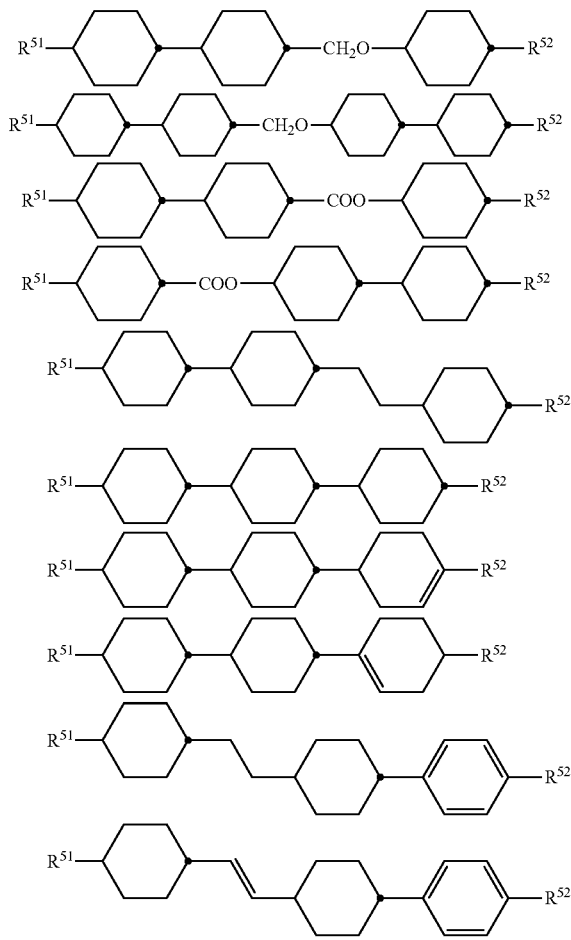

in which $R^{51}$ and $R^{52}$ have the meanings indicated above, and $R^{51}$ and $R^{52}$, independently of one another, preferably denote a straight-chain alkyl, alkoxy or alkenyl radical having 1 or 2 to 7 C atoms respectively, particularly preferably straight-chain alkyl, furthermore alkenyl.

The proportion of these compounds in the mixture is preferably 5 to 40% by weight.

xvi. The liquid-crystalline medium comprises one or more compounds of the formula V, selected from the group of the compounds of the following formulae: CC-n-V and/or CC-n-Vm, CPP-n-m, CGP-n-m and CCOC-n-m, in which the meanings of the acronyms (abbreviations) are explained in Tables A to C and illustrated by examples in Table D, preferably in a total concentration of up to 10% or more to 70% or less.

xvii. The liquid-crystalline medium essentially consists of 2% by weight to 80% by weight of one or more compounds of the formula I,
2% by weight to 80% by weight of one or more compounds of the formula II,
2% by weight to 80% by weight of one or more compounds selected from the group of the compounds of the formulae III and/or IV, and/or
2% by weight to 80% by weight of one or more compounds of the formula V.

xviii. The liquid-crystalline medium comprises one or more compounds of the formula I containing two or three six-membered or five-membered rings in amounts of 1% to 15%, in particular 2% to 12% and very particularly preferably 3% to 8%, per individual compound.

xix. The liquid-crystalline medium comprises one or more compounds of the formula II, preferably in amounts of 2% or more, in particular 5% or more and very particularly preferably 5% or more to 30% or less, in particular in the range from 2% or more to 12% or less, per homologous individual compound.

xx. The liquid-crystalline medium comprises one or more compounds of the formulae II-4 and/or II-5, preferably in a total concentration of 60% or less and in a concentration of 2% or more, in particular 5% or more and very particularly preferably 5% or more to 20% or less, per homologous individual compound.

xxi. The liquid-crystalline medium comprises one or more compounds of the formulae II-6 and/or II-7, preferably in a total concentration of 50% or less and preferably in a concentration of 2% or more to 10% or less, per homologous individual compound of the formula II-6 and in a concentration of 2% or more to 20% or less per homologous individual compound of the formula II-6.

xxii. The liquid-crystalline medium comprises one or more compounds of the formula II, preferably in amounts of 2% or more, in particular 5% or more and very particularly preferably 5% to 25%, in particular in the range from 2% to 12%, per individual compound.

xxiii. The liquid-crystalline medium comprises one or more compounds of the formula V, preferably in amounts of 3% or more, in particular 5% or more and very particularly preferably 5% to 25%, in particular in the range from 2% to 20%, per individual compound.

The invention furthermore also relates to an electro-optical display having active-matrix addressing based on the ECB effect, characterised in that it contains, as dielectric, a liquid-crystalline medium in accordance with the present invention.

This electro-optical display preferably has a backlight whose light has no component having a wavelength of less than 380 nm, preferably less than 400 nm, more preferably less than 410 nm, even more preferably less than 420 nm, even more preferably less than 430 nm and very particularly preferably less than 440 nm. This embodiment is preferably achieved by using a corresponding cut-off filter having the desired cut-off wavelength between the backlight and the liquid-crystal medium or particularly preferably by using an LED backlight. In the latter case, it is generally not necessary to use a cut-off filter.

The preferred LCDs in accordance with the present application use an LED backlight. The lifetime of the display, in particular that of the liquid-crystal medium used, can thus usually be significantly increased.

An alternative design of the LCDs according to the invention uses an optical cut-off filter between the backlight and the adjacent substrate. In this embodiment, a conventional CCFL backlight can also be used without the lifetime of the display being excessively impaired. The cut-off filter allows virtually no radiation through below the cut-off wavelength ($\lambda_{cut-off}$). In this case, however, an upper limit for the total concentration ($c_{max}$) of the alkenyl compounds used (present) in the liquid-crystal medium should preferably be observed. The maximum tolerable concentration of the alkenyl compounds depends primarily here on the voltage holding ratio necessary for the particular application. Furthermore, the maximum tolerable concentration of the alkenyl compounds depends on the cut-off wavelength and the residual transmission of the cut-off filter used (including the substrate) and also, albeit to a lesser extent, on the type of alkenyl compounds used.

Typical representatives of the alkenyl compounds here are regarded as being the compounds of the type CC-n-V and CC-n-Vm, particularly CC-3-V and CC-3-V1, in particular CC-3-V (see Table D).

The following table shows the maximum total concentrations of this (these) compound(s) in corresponding liquid-crystal media on use of cut-off filters having various cut-off wavelengths. On use of an LED backlight, which does not require a cut-off filter, the shortest wavelength emitted, generally that of the blue LED, corresponds to this cut-off wavelength.

| No. | $\lambda_{cut-off}$/nm | $c_{max}$(alkenyls*)/% |
|---|---|---|
| 1 | 380 | 0 |
| 2 | 400 | 5 |
| 3 | 410 | 10 |
| 4 | 420 | 30 |
| 5 | 430 | 50 |
| 6 | 440 | 80 |

Note:
*preferably CC-n-Vm, particularly preferably CC-3-V.

The maximum total concentrations of the various alkenyl or alkynyl compounds depend on the type of the corresponding compounds used. The maximum total concentrations for various types of compound are shown in the following table.

| | Compound | | | | | |
|---|---|---|---|---|---|---|
| | CC-n-Vm, | CVY-n-Om | CBY-n-Om | PBY-n-Om | CTY-n-Om | Total |
| $\lambda_{cut-off}$/nm | $c_{max}$(alkenyls/alkynyls*)/% | | | | | |
| 400 | 10 | 0 | 0 | 0 | 0 | 10 |
| 410 | 30 | 15 | 15 | 25 | 15 | 60 |
| 420 | 70 | 45 | 45 | 60 | 45 | 100 |

Note:
*preferably CC-n-Vm, particularly preferably CC-3-V.

The liquid-crystal mixture preferably has a nematic phase range of at least 60 degrees, preferably at least 70 degrees and very particularly preferably at least 90 degrees, and a rotational viscosity $\gamma_1$ of at most 115 mPa·s at 20° C.

The liquid-crystal medium according to the invention preferably has a $\Delta\epsilon$ of −0.5 or less to −8.0 or more, in particular −2.5 or less to −6.0 or more, where $\Delta\epsilon$ denotes the dielectric anisotropy.

The rotational viscosity $\gamma_1$ is preferably 115 mPa·s or less, preferably 95 mPa·s or less and in particular 85 mPa·s or less.

The birefringence $\Delta n$ of the liquid-crystal mixture is generally in the range from 0.06 or more to 0.25 or less, preferably in the range from 0.08 or more to 0.20 or less.

The threshold voltage $V_0$ of the liquid-crystal mixture is generally in the range from 1.2 V or more to 3.0 V or less, preferably in the range from 1.5 V or more to 2.5 V or less.

The mixtures according to the invention are suitable for all VA-TFT applications, such as, for example, VAN, MVA, (S)-PVA and ASV. They are furthermore suitable for IPS, FFS and PALC applications of negative $\Delta\epsilon$.

The nematic liquid-crystal mixtures in the displays according to the invention generally comprise two or three components, components A and B and/or C, which themselves each consist of one or more individual compounds.

For component A, one (or more) individual compound(s) having a value of $\Delta\epsilon \leq -0.8$ is (are) preferably selected. This value must be more negative the smaller the proportion of A in the mixture as a whole.

For component B, one (or more) individual compound(s) having a value of $\Delta\epsilon \leq -0.8$ is (are) preferably selected. This value must be more negative the smaller the proportion of B in the mixture as a whole.

Component C has pronounced nematogeneity and a flow viscosity of not greater than 30 mm²·s⁻¹, preferably not greater than 25 mm²·s⁻¹, at 20° C.

For component B, one (or more) individual compound(s) having an absolute value of $\Delta\epsilon$ of <0.8 is (are) preferably selected.

Particularly preferred individual compounds in component C are extremely low-viscosity nematic liquid crystals having a flow viscosity of not greater than 18 mm²·s⁻¹, preferably not greater than 12 mm²·s⁻¹, at 20° C.

Component B is monotropically or enantiotropically nematic and is able to prevent the occurrence of smectic phases down to very low temperatures in liquid-crystal mixtures. For example, if various materials of high nematogeneity are added to a smectic liquid-crystal mixture, the nematogeneity of these materials can be compared through the degree of suppression of smectic phases that is achieved.

A multiplicity of suitable materials is known to the person skilled in the art from the literature. Particular preference is given here to compounds of the formula V.

The liquid-crystal mixtures according to the invention preferably comprise 4 to 15, in particular 5 to 12, and particularly preferably 10 or fewer, compounds of the formulae I and (II and/or III and/or IV) and/or V.

Besides compounds selected from the group of the formulae I to V, other constituents may also be present in liquid-crystal mixtures according to the invention, for example in an amount of up to 45% of the mixture as a whole, but preferably up to 35%, in particular up to 10%.

The other constituents of the liquid-crystal mixtures according to the invention are preferably selected from nematic or nematogenic substances, in particular known substances, from the classes of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-biscyclohexylbiphenyls or cyclohexylpyrimidines, phenyl- or cyclohexyldioxanes, optionally halogenated stilbenes, benzyl phenyl ethers, tolans and substituted cinnamic acid esters.

The most important compounds which are suitable as constituents of liquid-crystal mixtures of this type can be characterised by the formula IV $$R^{91}\text{-L-G-E-}R^{92} \qquad \text{IX}$$

in which L and E each denote a carbo- or heterocyclic ring system from the group formed by 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline,

| G denotes | —CH=CH— | —N(O)=N— |
|---|---|---|
| | —CH=CQ— | —CH=N(O)— |
| | —C≡C— | —CH₂—CH₂— |
| | —CO—O— | —CH₂—O— |
| | —CO—S— | —CH₂—S— |
| | —CH=N— | —COO-Phe-COO— |
| | —CF₂O— | —CF=CF— |
| | —OCF₂— | —OCH₂— |
| | —(CH₂)₄— | —(CH₂)₃O— | or a C—C single bond, Q denotes halogen, preferably chlorine, or —CN, and $R^{91}$ and $R^{92}$ each denote alkyl, alkenyl, alkoxy, alkanoyloxy (or oxaalkyl) or alkoxycarbonyloxy having up to 18, preferably up to 8, carbon atoms, or one of these radicals alternatively denotes CN, NC, NO₂, NCS, CF₃, OCF₃, F, Cl or Br.

In most of these compounds, $R^{91}$ and $R^{92}$ are different from one another, one of these radicals usually being an alkyl or alkoxy group. Other variants of the proposed substituents are also common. Many such substances or also mixtures thereof are commercially available. All these substances can be prepared by methods known from the literature.

The synthesis of the particularly preferred compounds of the formula I in which the ring $A^{12}$ denotes cyclohexane and $Z^{12}$ is a C—C triple bond, i.e. —C≡C—, is preferably carried out as depicted in the following reaction scheme, Scheme 1. The cross-coupling of aryl halides (bromides 2 or also iodides) to suitable alkynes 1 (Sonogashira coupling) gives the desired compounds of the type "CTY". The alkynes 1 required are accessible, for example, from corresponding aldehydes by a Corey-Fuchs reaction.

Scheme 1: Synthesis of compounds of the formula I (compounds 3 in particular) in which $A^{12}$ denotes cyclohexane and $Z^{12}$ is a C—C triple bond —C≡C— (compounds of the type "CTY").

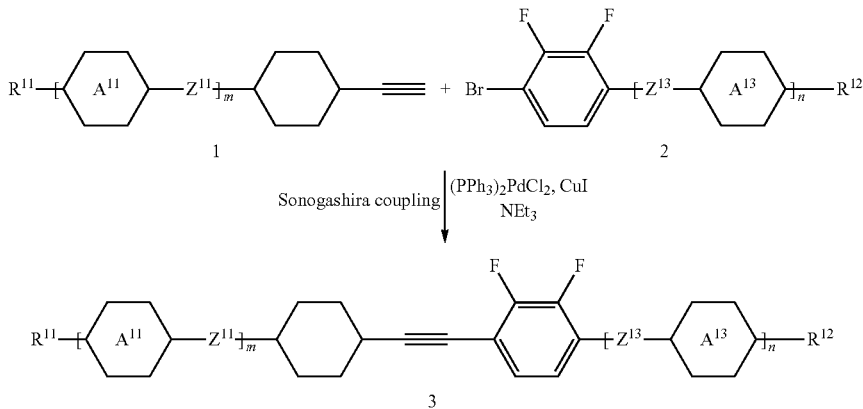

The compounds 3 are also suitable starting materials for the synthesis of the compounds I in which the ring $A^{12}$ denotes cyclohexane and $Z^{12}$ is a C—C double bond —CH=CH— (see Scheme 2). The C—C triple bond is hydrogenated to a C—C double bond by Lindlar hydrogenation using "poisoned" palladium catalysts. The Z-alkenes are obtained here. The isomerisation to the desired compounds 4 having an E-configured double bond generally proceeds to completion.

Scheme 2: Synthesis of compounds I (compounds 4 in particular) in which $A^{12}$ denotes cyclohexane and $Z^{12}$ is a C—C double bond —CH=CH— (compounds of the type "CVY").

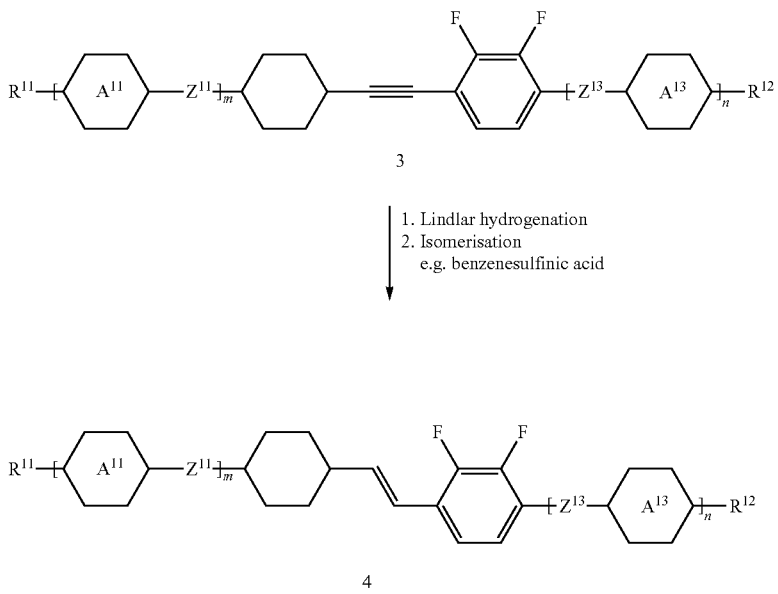

Alternatively, the compounds of type 4 can also be obtained by a Wittig reaction of the aldehydes 6 using triphenylphosphonium salts 5 (see Scheme 3).

Scheme 3: Synthesis of compounds of the formula I (compounds 4 in particular) in which $A^{12}$ denotes cyclohexane and $Z^{12}$ is a C—C double bond —CH=CH— (compounds of the type "CVY") by Wittig reaction.

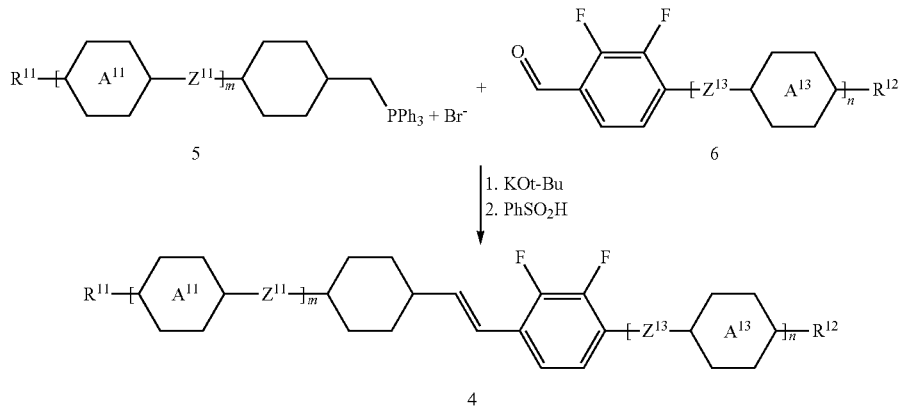

The synthesis of the particularly preferred compounds of the formula I in which the ring $A^{12}$ denotes cyclohexane and $Z^{12}$ is a fluorinated C—C double bond —CF=CF— is preferably carried out as depicted in Scheme 4. The synthesis starts from cyclohexanols 7, which are firstly converted into the chlorides 8 thereof. From these, cyclohexyllithium compounds 9 are generated, for example using Li/di-tert-butylbiphenyl, and are then reacted directly with the building block 10. This gives the compounds 11. The silyl group is cleaved off by reaction with TBAF. This gives the compounds 12. These are then converted into suitable halides 13 by deprotonation using t-BuLi and scavenging of the resultant organolithium compound using bromine or iodine. The alkenyl iodides or bromides 13 are obtained exclusively in the preferred E form, and they are suitable reactants for giving the compounds I having difluoroethylene bridges (compounds 15 in Scheme 4) in a palladium-catalysed cross-coupling to the arylboronic acids 14.

Scheme 4: Synthesis of compounds of the formula I (compounds 15 in particular) in which $A^{12}$ denotes cyclohexane and $Z^{12}$ is a fluorinated C—C double bond —CF=CF— (compounds of the type "CBY").

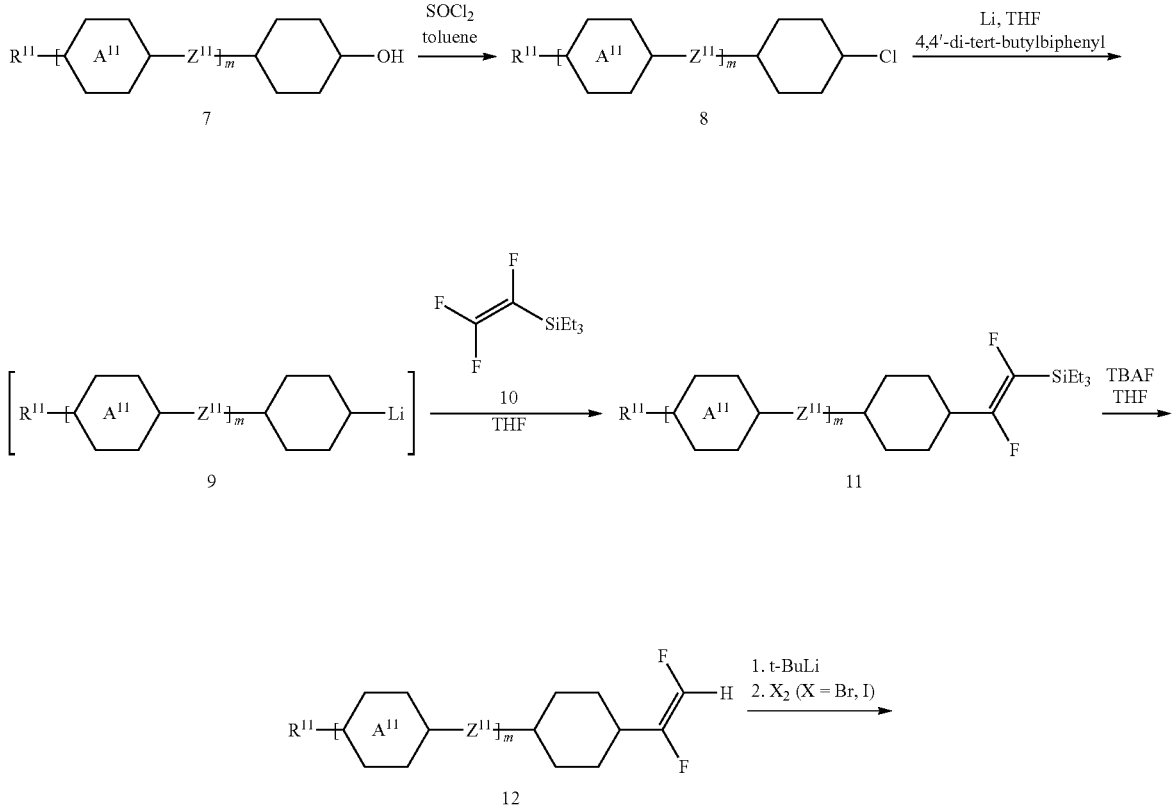

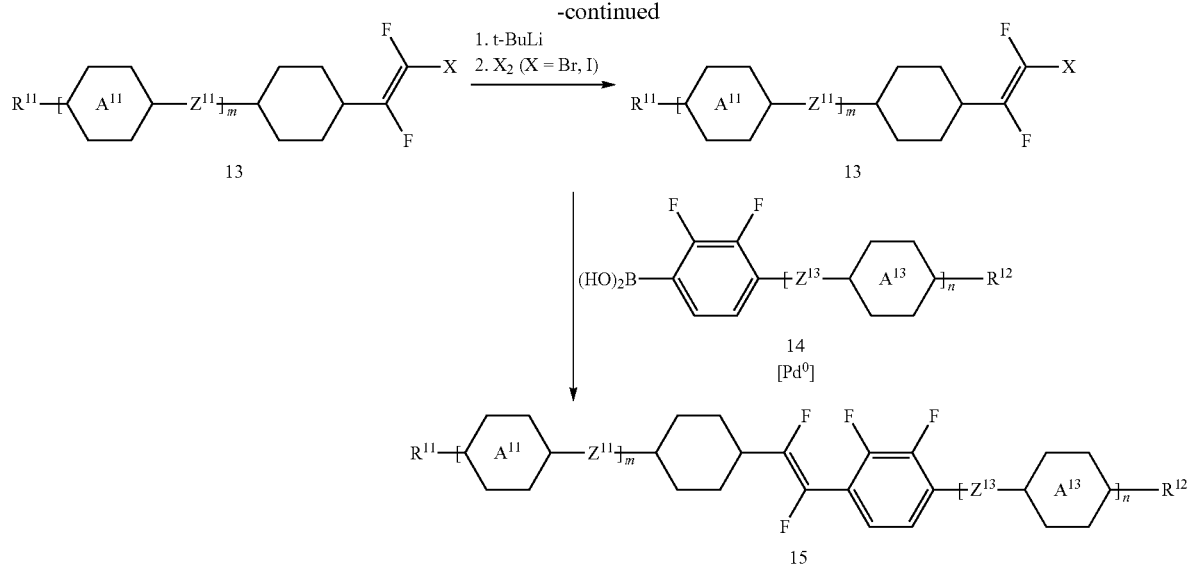

The concentration of the compounds of the formula IX in the mixture as a whole is preferably 1% to 25%, particularly preferably 1% to 15% and very particularly preferably 2% to 9%.

The media according to the invention may optionally also comprise a dielectrically positive component, whose total concentration is preferably 10% or less, based on the entire medium.

In a preferred embodiment, the liquid-crystal media according to the invention, or liquid-crystal media employed in accordance with the invention, comprise in total, based on the mixture as a whole, 5% or more to 60% or less, preferably 10% or more to 50% or less, preferably 15% or more to 40% or less and particularly preferably 20% or more to 35% or less and very particularly preferably 25% or more to 30% or less of component A and 1% or more to 45% or less, preferably 2% or more to 40% or less, preferably 3% or more to 35% or less and particularly preferably 5% or more to 30% or less and very particularly preferably 10% or more to 20% or less of component B and 5% or more to 80% or less, preferably 25% or more to 75% or less, particularly preferably 35% or more to 70% or less and very particularly preferably 40% or more to 65% or less of component C.

The liquid-crystal media according to the invention, or liquid-crystal media employed in accordance with the invention, preferably have a nematic phase from in each case at least −20° C. or less to 70° C. or more, particularly preferably from −30° C. or less to 80° C. or more, very particularly preferably from −40° C. or less to 85° C. or more and most preferably from −40° C. or less to 105° C. or more.

The expression "have a nematic phase" here means on the one hand that no smectic phase and no crystallisation are observed at low temperatures at the corresponding temperature and on the other hand that no clearing occurs on heating out of the nematic phase. The investigation at low temperatures is carried out in a flow viscometer at the corresponding temperature and checked by storage in test cells having a cell thickness corresponding to the electro-optical application for at least 100 hours. If the storage stability at a temperature of −20° C. in a corresponding test cell is 1000 h or more, the medium is regarded as stable at this temperature. At temperatures of −30° C. and −40° C., the corresponding times are 500 h and 250 h respectively. At high temperatures, the clearing point is measured in capillaries by conventional methods.

In addition, the liquid-crystal media according to the invention, or liquid-crystal media employed in accordance with the invention, have high values for the voltage holding ratio in liquid-crystal cells.

In freshly filled cells at 20° C. in the cells, these are greater than or equal to 95%, preferably greater than or equal to 97%, particularly preferably greater than or equal to 98% and very particularly preferably greater than or equal to 99%, and after 5 minutes in the oven at 100° C. in the cells, these are greater than or equal to 90%, preferably greater than or equal to 93%, particularly preferably greater than or equal to 96% and very particularly preferably greater than or equal to 98%.

These preferred values for the individual physical properties are preferably also in each case maintained by the media according to the invention in combination with one another.

In the present application, the term "compounds", also written as "compound(s)", means both one and also a plurality of compounds, unless explicitly indicated otherwise.

For the present invention, the following definitions apply in connection with the specification of the constituents of the compositions, unless indicated otherwise in individual cases:

"comprise": the concentration of the constituents in question in the composition is preferably 5% or more, particularly preferably 10% or more, very particularly preferably 20% or more, "predominantly consist of": the concentration of the constituents in question in the composition is preferably 50% or more, particularly preferably 55% or more and very particularly preferably 60% or more, "essentially consist of": the concentration of the constituents in question in the composition is preferably 80% or more, particularly preferably 90% or more and very particularly preferably 95% or more, and "virtually completely consist of": the concentration of the constituents in question in the composition is preferably 98% or more, particularly preferably 99% or more and very particularly preferably 100.0%.

This applies both to the media as compositions with their constituents, which can be components and compounds, and also to the components with their constituents, the compounds. Only in relation to the concentration of an individual compound relative to the medium as a whole does the term comprise mean: the concentration of the compound in question is preferably 1% or more, particularly preferably 2% or more, very particularly preferably 4% or more.

For the present invention, "≤" means less than or equal to, preferably less than, and "≥" means greater than or equal to, preferably greater than.

For the present invention,

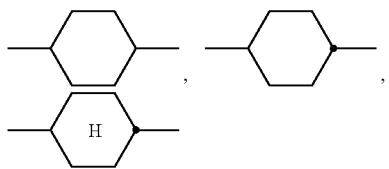

and "Cyc"denote trans-1,4-cyclohexylene, and

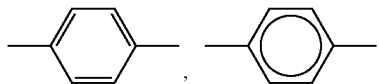

and "Phe"denote 1,4-phenylene.

For the present invention, the expression "dielectrically positive compounds" means compounds having a Δε of >1.5, the expression "dielectrically neutral compounds" means those where −1.5≤Δε≤1.5 and the expression "dielectrically negative compounds" means those where Δε<−1.5. The dielectric anisotropy of the compounds is determined here by dissolving 10% of the compounds in a liquid-crystalline host and determining the capacitance of the resultant mixture in each case in at least one test cell having a cell thickness of 20 μm with homeotropic and with homogeneous surface alignment at 1 kHz. The measurement voltage is typically 0.5 V to 1.0 V, but is always lower than the capacitive threshold of the respective liquid-crystal mixture investigated.

The host mixture used for dielectrically positive and dielectrically neutral compounds is ZLI-4792 and that used for dielectrically negative compounds is ZLI-2857, both from Merck KGaA, Germany. The values for the respective compounds to be investigated are obtained from the change in the dielectric constant of the host mixture after addition of the compound to be investigated and extrapolation to 100% of the compound employed. The compound to be investigated is dissolved in the host mixture in an amount of 10%. If the solubility of the substance is too low for this purpose, the concentration is halved in steps until the investigation can be carried out at the desired temperature.

The liquid-crystal media according to the invention, or liquid-crystal media employed in accordance with the invention, may, if necessary, also comprise further additives, such as, for example, stabilisers and/or pleochroic dyes and/or chiral dopants in the usual amounts. The amount of these additives employed is preferably in total 0% or more to 10% or less, based on the amount of the entire mixture, particularly preferably 0.1% or more to 6% or less. The concentration of the individual compounds employed is preferably 0.1% or more to 3% or less. The concentration of these and similar additives is generally not taken into account when specifying the concentrations and concentration ranges of the liquid-crystal compounds in the liquid-crystal media.

In a preferred embodiment, the liquid-crystal media according to the invention, or liquid-crystal media employed in accordance with the invention, comprise a polymer precursor which comprises one or more reactive compounds, preferably reactive mesogens, and, if necessary, also further additives, such as, for example, polymerisation initiators and/or polymerisation moderators, in the usual amounts. The amount of these additives employed is in total 0% or more to 10% or less, based on the amount of the entire mixture, preferably 0.1% or more to 2% or less. The concentration of these and similar additives is not taken into account when specifying the concentrations and concentration ranges of the liquid-crystal compounds in the liquid-crystal media.

The compositions consist of a plurality of compounds, preferably 3 or more to 30 or fewer, particularly preferably 6 or more to 20 or fewer and very particularly preferably 10 or more to 16 or fewer compounds, which are mixed in a conventional manner. In general, the desired amount of the components used in lesser amount is dissolved in the components making up the principal constituent of the mixture. This is advantageously carried out at elevated temperature. If the selected temperature is above the clearing point of the principal constituent, completion of the dissolution operation is particularly easy to observe. However, it is also possible to prepare the liquid-crystal mixtures in other conventional ways, for example using pre-mixes or from a so-called "multibottle system".

It goes without saying to the person skilled in the art that the media according to the invention for use in VA, IPS, FFS or PSVA displays may also comprise compounds in which, for example, H, N, O, Cl, F have been replaced by the corresponding isotopes.

The structure of the liquid-crystal displays according to the invention corresponds to the conventional geometry, as described, for example, in EP-A 0 240 379.

The liquid-crystal phases according to the invention can be modified by means of suitable additives in such a way that they can be employed in any type of, for example, ECB, VAN, IPS, GH or ASM-VA LCD display that has been disclosed to date.

Table E below indicates possible dopants which can be added to the mixtures according to the invention. If the mixtures comprise one or more dopants, where the dopant or dopants is (are) employed in amounts of 0.01 to 4% by weight, preferably 0.1 to 1.0% by weight.

Stabilisers which can be added, for example, to the mixtures according to the invention, preferably in amounts of 0.01 to 6% by weight, in particular 0.1 to 3% by weight, are mentioned below in Table F.

For the purposes of the present invention, all concentrations are, unless explicitly noted otherwise, indicated in per cent by weight and relate to the corresponding mixture or mixture component, unless explicitly indicated otherwise.

All temperature values indicated in the present application, such as, for example, the melting point T(C,N), the smectic (S) to nematic (N) phase transition T(S,N) and the clearing point T(N,I), are indicated in degrees Celsius (° C.) and all temperature differences are correspondingly indicated in differential degrees (° or degrees), unless explicitly indicated otherwise.

For the present invention, the term "threshold voltage" relates to the capacitive threshold ($V_0$), also known as the Freedericks threshold, unless explicitly indicated otherwise.

All physical properties are and have been determined in accordance with "Merck Liquid Crystals, Physical Properties of Liquid Crystals", status November 1997, Merck KGaA, Germany, and apply to a temperature of 20° C., and Δn is determined at 589 nm and $\Delta\epsilon$ at 1 kHz, unless explicitly indicated otherwise in each case.

The electro-optical properties, for example the threshold voltage ($V_0$) (capacitive measurement), are, as is the switching behaviour, determined in test cells produced at Merck Japan Ltd. The measurement cells have soda-lime glass substrates and are constructed in an ECB or VA configuration with polyimide alignment layers (SE-1211 with diluent **26 (mixing ratio 1:1), both from Nissan Chemicals, Japan), which have been rubbed perpendicular to one another and effect a homeotropic alignment of the liquid crystals. The surface area of the transparent, virtually square electrodes of ITO is 1 cm$^2$.

Unless indicated otherwise, a chiral dopant is not added to the liquid-crystal mixtures used, but the latter are also particularly suitable for applications in which doping of this type is necessary.

The voltage holding ratio is determined in test cells produced at Merck Japan Ltd. The measurement cells have soda-lime glass substrates and are constructed with polyimide alignment layers (SE-1211 from Nissan Chemicals Ltd., Japan), which homeotropically align the liquid-crystal media, with a layer thickness of 50 nm which have been rubbed perpendicular to one another. The layer thickness of the liquid-crystal media is uniformly 6.0 µm. The surface area of the transparent electrodes of ITO is 1 cm$^2$.

The voltage holding ratio is determined at 20° C. ($HR_{20}$) and after 5 minutes in the oven at 100° C. ($HR_{100}$). The voltage used has a frequency of 60 Hz.

The rotational viscosity is determined using the rotating permanent magnet method and the flow viscosity in a modified Ubbelohde viscometer. For liquid-crystal mixtures ZLI-2293, ZLI-4792 and MLC-6608, all products from Merck KGaA, Darmstadt, Germany, the rotational viscosity values determined at 20° C. are 161 mPa·s, 133 mPa·s and 186 mPa·s respectively, and the flow viscosity values (v) are 21 mm$^2$·s$^{-1}$, 14 mm$^2$·s$^{-1}$ and 27 mm$^2$·s$^{-1}$ respectively.

The following symbols are used in the present application:
$V_0$ threshold voltage, capacitive [V] at 20° C.,
$n_e$ extraordinary refractive index measured at 20° C. and 589 nm,
$n_o$ ordinary refractive index measured at 20° C. and 589 nm,
$\Delta n$ optical anisotropy measured at 20° C. and 589 nm,
$\epsilon_\perp$ dielectric permittivity perpendicular to the director at 20° C. and 1 kHz,
$\epsilon_\parallel$ dielectric permittivity parallel to the director at 20° C. and 1 kHz,
$\Delta\epsilon$ dielectric anisotropy at 20° C. and 1 kHz,
T(N,I) or
cl.p. clearing point [° C.],
$\gamma_1$ rotational viscosity measured at 20° C. [mPa·s],
$K_1$ elastic constant, "splay" deformation at 20° C. [pN],
$K_2$ elastic constant, "twist" deformation at 20° C. [pN],
$K_3$ elastic constant, "bend" deformation at 20° C. [pN], and
LTS low-temperature stability (phase stability), determined in test cells.

The following examples explain the present invention without limiting it. However, they show the person skilled in the art preferred mixture concepts with compounds preferably to be employed and the respective concentrations thereof and combinations thereof with one another. In addition, the examples illustrate the properties and property combinations that are accessible.

For the present invention and in the following examples, the structures of the liquid-crystal compounds are indicated by means of acronyms, with the transformation into chemical formulae taking place in accordance with Tables A to C below. All radicals $C_nH_{2n+1}$, $C_mH_{2m+1}$ and $C_lH_{2l+1}$ or $C_nH_{2n}$, $C_mH_{2m}$ and $C_lH_{2l}$ are straight-chain alkyl radicals or alkylene radicals, in each case having n, m and l C atoms respectively. Table A shows the codes for the ring elements of the nuclei of the compound, Table B lists the bridging units, and Table C lists the meanings of the symbols for the left- and right-hand end groups of the molecules. The acronyms are composed of the codes for the ring elements with optional linking groups, followed by a first hyphen and the codes for the left-hand end group, and a second hyphen and the codes for the right-hand end group. Table D shows illustrative structures of compounds together with their respective abbreviations.

TABLE A

| Ring elements | | | |
|---|---|---|---|
| C | cyclohexane | | |
| D | dioxane | D1 | dioxane isomer |
| A | tetrahydropyran | A1 | tetrahydropyran isomer |
| P | phenyl | | |
| G | fluorophenyl | G1 | fluorophenyl isomer |

TABLE A-continued
| Ring elements | | | |
|---|---|---|---|
| U | 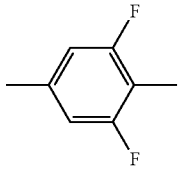 | Ul | 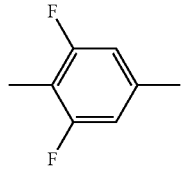 |
| Y | 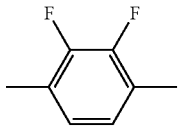 | | |
| P(F, Cl)Y | 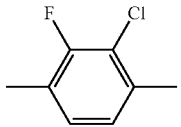 | P(Cl, F)Y | 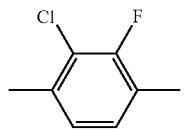 |
| np | 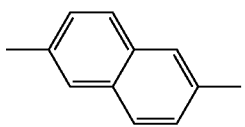 | | |
| n3f | 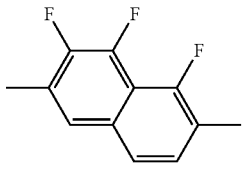 | n3fl | 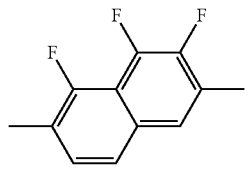 |
| th | 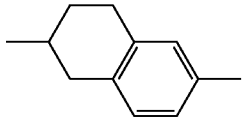 | thl | 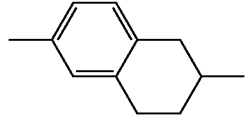 |
| tH2f | 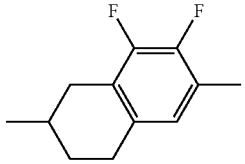 | tH2fl | 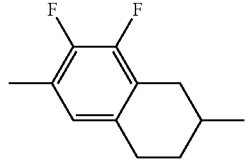 |
| o2f | 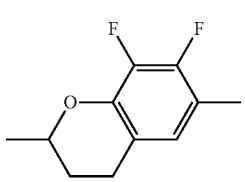 | o2fl | 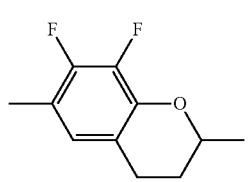 |
| dh | 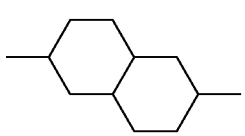 | | |
| K |  | Kl | 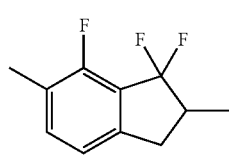 |

TABLE A-continued

Ring elements

| L | (cyclohexene ring) | Ll | (cyclohexene ring) |
| F | (fluorinated cyclohexene ring) | Fl | (fluorinated cyclohexene ring) |

TABLE B

Bridging units

| | | | |
|---|---|---|---|
| E | —$CH_2$—$CH_2$— | | |
| V | —CH=CH— | | |
| T | —C≡C— | | |
| W | —$CF_2$—$CF_2$— | | |
| B | —CF=CF— | | |
| Z | —CO—O— | ZI | —O—CO— |
| X | —CF=CH— | XI | —CH=CF— |
| O | —$CH_2$—O— | OI | —O—$CH_2$— |
| Q | —$CF_2$—O— | QI | —O—$CF_2$— |

TABLE C

End groups

| On the left individually or in combination | | On the right individually or in combination | |
|---|---|---|---|
| -n- | $C_nH_{2n+1}$— | -n | —$C_nH_{2n+1}$ |
| -nO- | $C_nH_{2n+1}$—O— | -nO | —O—$C_nH_{2n+1}$ |
| -V- | $CH_2$=CH— | -V | —CH=$CH_2$ |
| -nV- | $C_nH_{2n+1}$—CH=CH— | -nV | —$C_nH_{2n}$—CH=$CH_2$ |
| -Vn- | $CH_2$=CH—$C_nH_{2n}$— | -Vn | —CH=CH—$C_nH_{2n+1}$ |
| -nVm- | $C_nH_{2n+1}$—CH=CH—$C_mH_{2m}$— | -nVm | —$C_nH_{2n}$—CH=CH—$C_mH_{2m+1}$ |
| -N- | N≡C— | -N | —C≡N |
| -S- | S=C=N— | -S | —N=C=S |
| -F- | F— | -F | —F |
| -CL- | Cl— | -CL | —Cl |
| -M- | $CFH_2$— | -M | —$CFH_2$ |
| -D- | $CF_2H$— | -D | —$CF_2H$ |
| -T- | $CF_3$— | -T | —$CF_3$ |
| -MO- | $CFH_2O$— | -OM | —$OCFH_2$ |
| -DO- | $CF_2HO$— | -OD | —$OCF_2H$ |
| -TO- | $CF_3O$— | -OT | —$OCF_3$ |
| -A- | H—C≡C— | -A | —C≡C—H |
| -nA- | $C_nH_{2n+1}$—C≡C— | -An | —C≡C—$C_nH_{2n+1}$ |
| -NA- | N≡C—C≡C— | -AN | —C≡C—C≡N |

| On the left only in combination | | On the right only in combination | |
|---|---|---|---|
| -...n...- | —$C_nH_{2n}$— | -...n... | —$C_nH_{2n}$— |
| -...M...- | —CFH— | -...M... | —CFH— |
| -...D...- | —$CF_2$— | -...D... | —$CF_2$— |
| -...V...- | —CH=CH— | -...V... | —CH=CH— |
| -...Z...- | —CO—O— | -...Z... | —CO—O— |
| -...ZI...- | —O—CO— | -...ZI... | —O—CO— |
| -...K...- | —CO— | -...K... | —CO— |
| -...W...- | —CF=CF— | -...W... | —CF=CF— | in which n and m are each integers, and the three dots "..." are place markers for other abbreviations from this table.

Besides the compounds of the formula I, the mixtures according to the invention preferably comprise one or more compounds of the compounds mentioned below.

The following abbreviations are used, where n, m and z each, independently of one another, denote an integer, preferably 1 to 7, and z particularly preferably denotes 2.

TABLE D

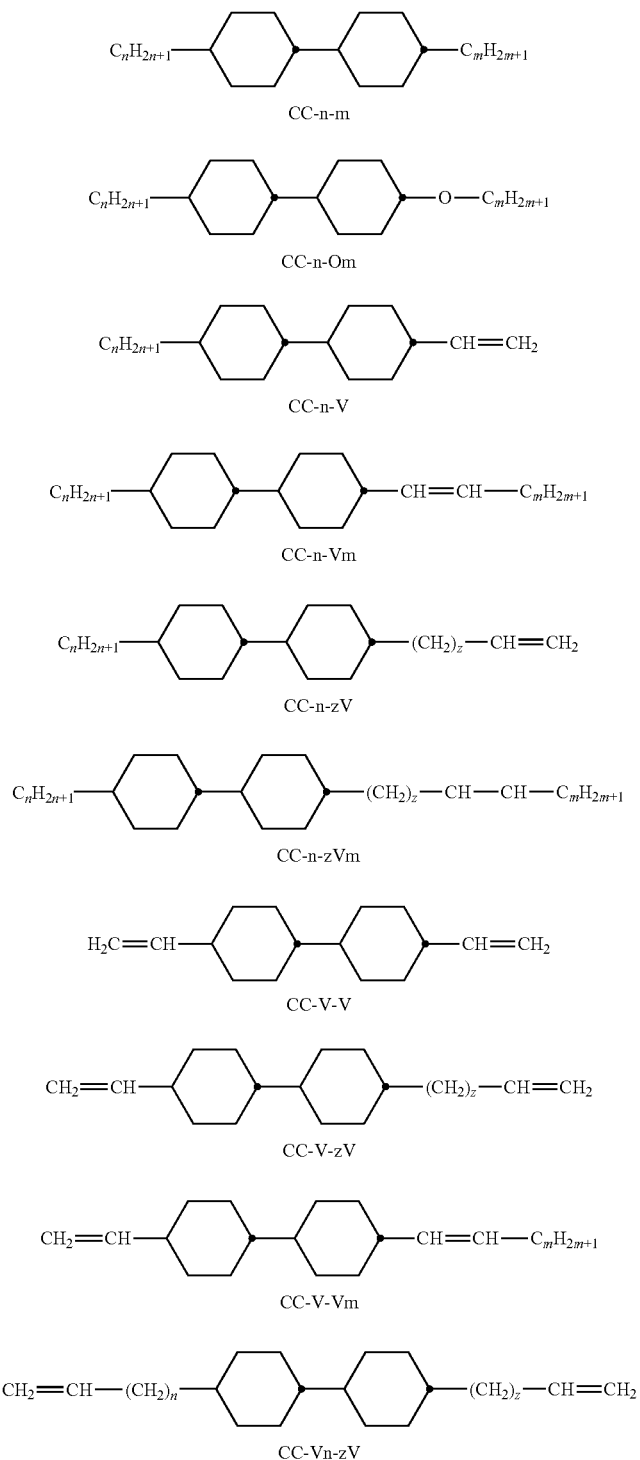

TABLE D-continued
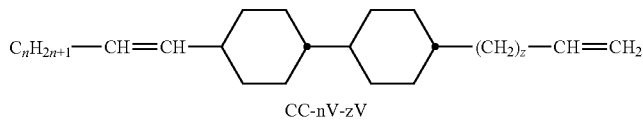
CC-nV-zV
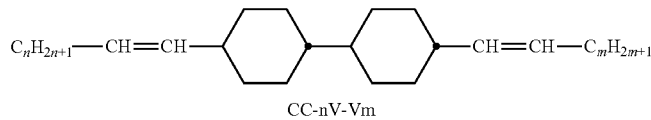
CC-nV-Vm
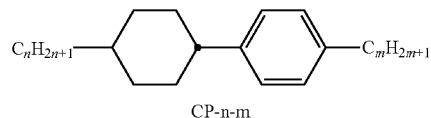
CP-n-m
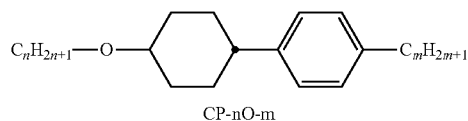
CP-nO-m
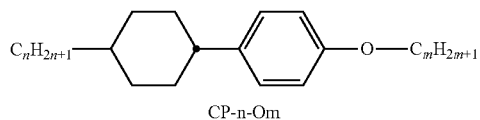
CP-n-Om
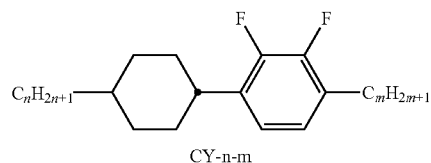
CY-n-m
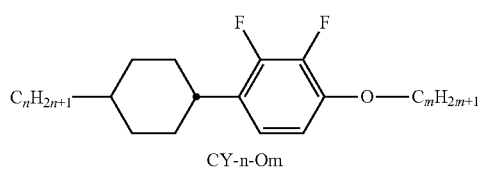
CY-n-Om
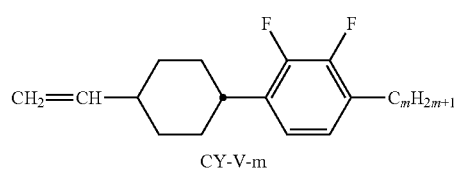
CY-V-m
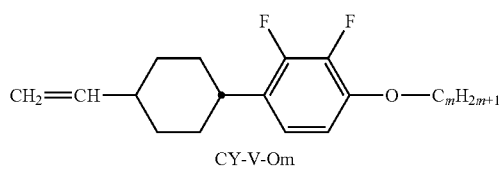
CY-V-Om
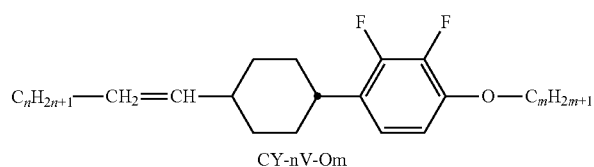
CY-nV-Om TABLE D-continued
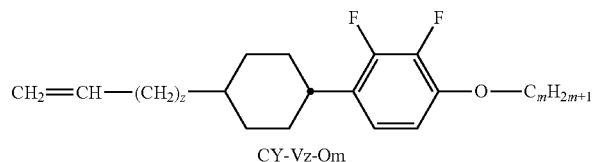
CY-Vz-Om
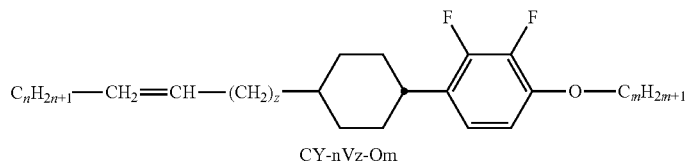
CY-nVz-Om
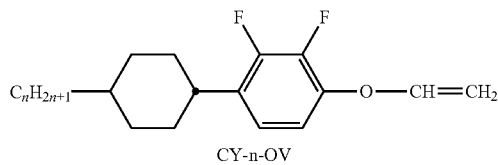
CY-n-OV
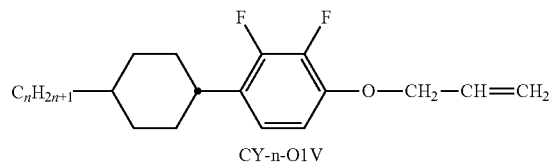
CY-n-O1V
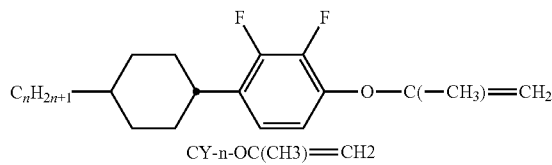
CY-n-OC(CH3)=CH2
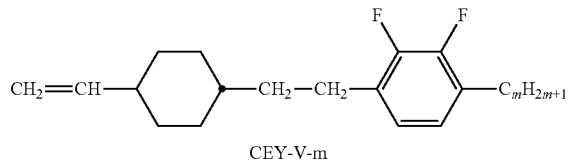
CEY-V-m
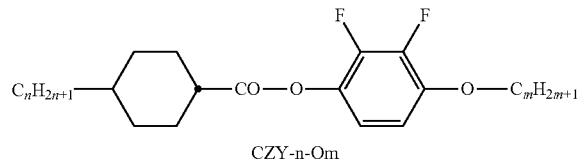
CZY-n-Om
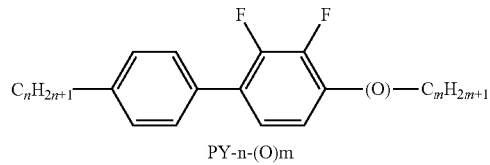
PY-n-(O)m
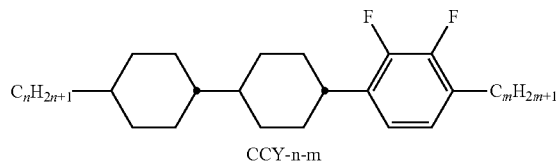
CCY-n-m TABLE D-continued
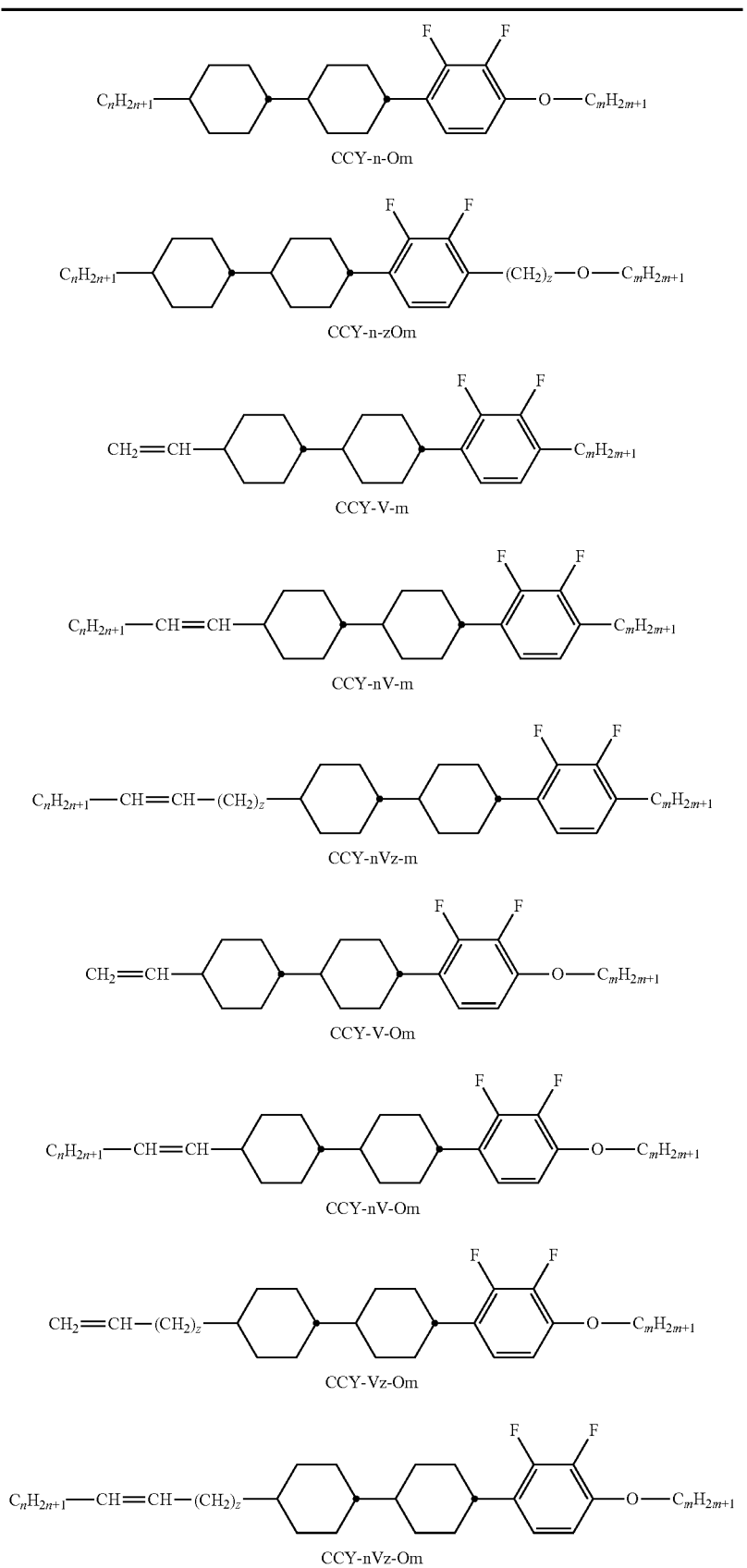

TABLE D-continued
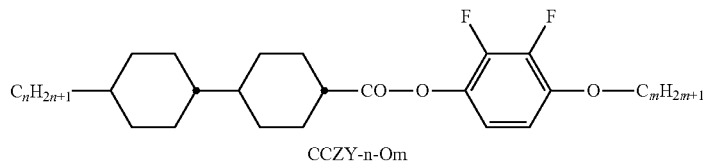
CCZY-n-Om
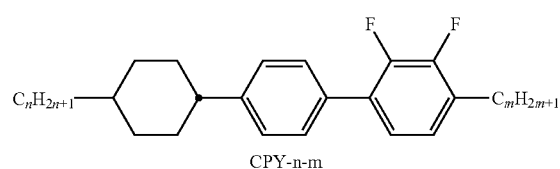
CPY-n-m
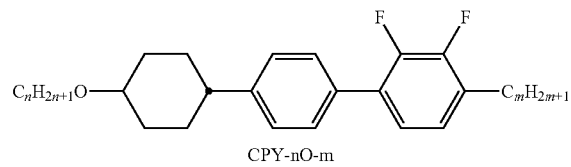
CPY-nO-m
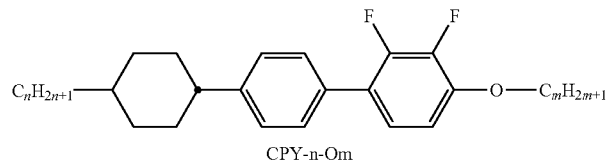
CPY-n-Om
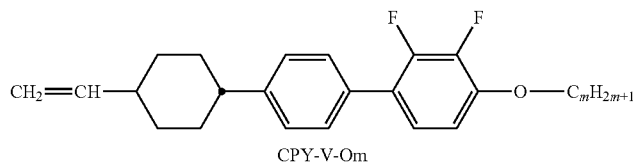
CPY-V-Om
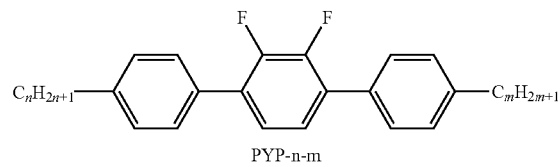
PYP-n-m
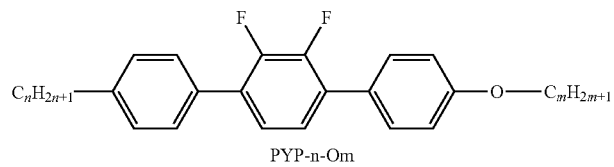
PYP-n-Om
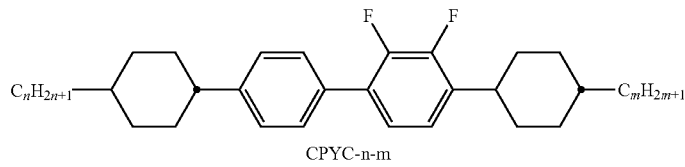
CPYC-n-m
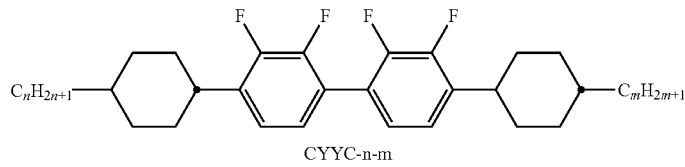
CYYC-n-m TABLE D-continued
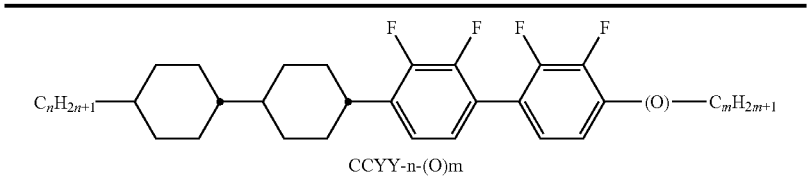
CCYY-n-(O)m
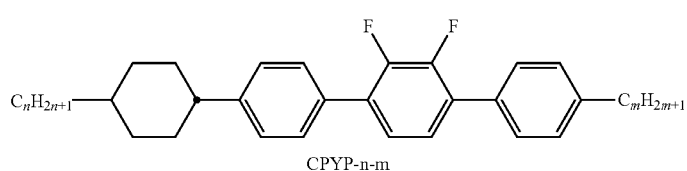
CPYP-n-m
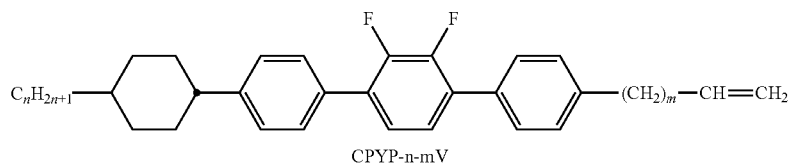
CPYP-n-mV
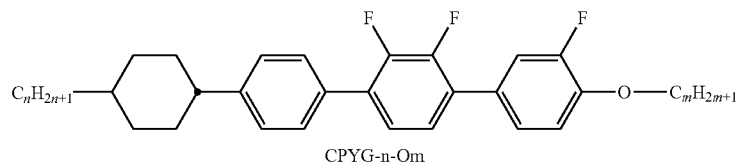
CPYG-n-Om
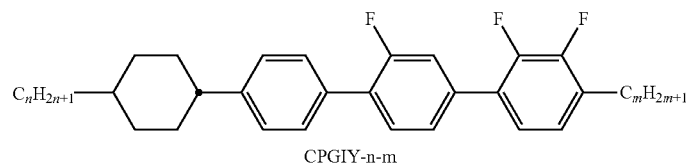
CPGIY-n-m
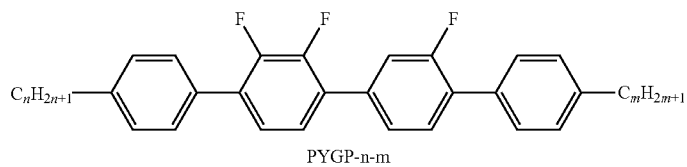
PYGP-n-m
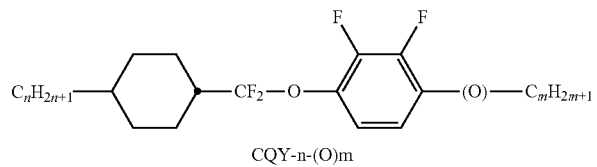
CQY-n-(O)m
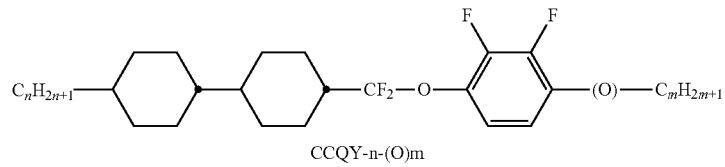
CCQY-n-(O)m
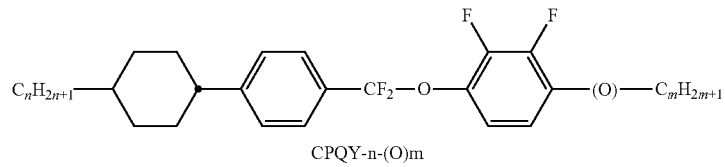
CPQY-n-(O)m TABLE D-continued
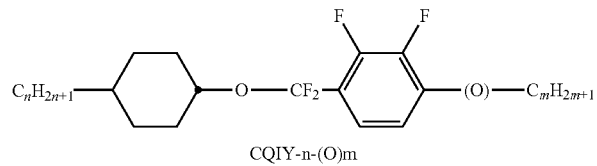
CQIY-n-(O)m
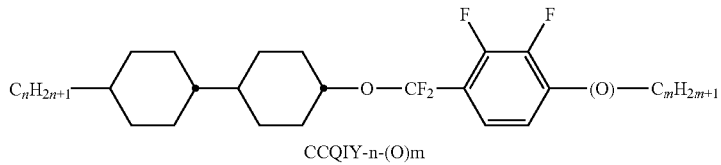
CCQIY-n-(O)m
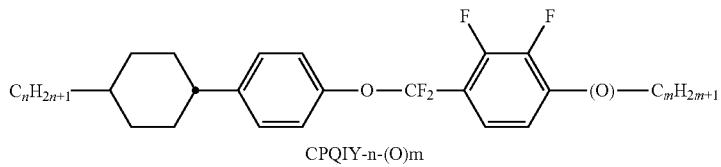
CPQIY-n-(O)m
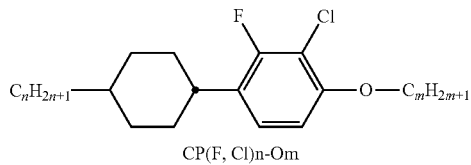
CP(F, Cl)n-Om
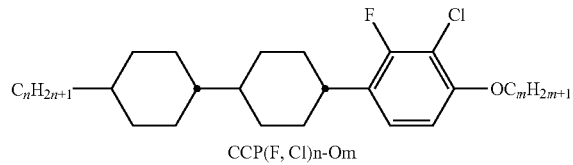
CCP(F, Cl)n-Om
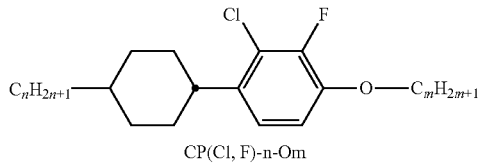
CP(Cl, F)-n-Om
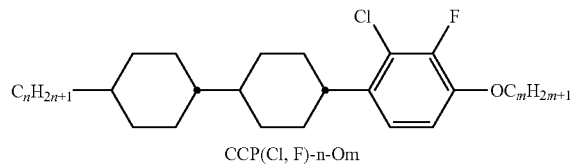
CCP(Cl, F)-n-Om
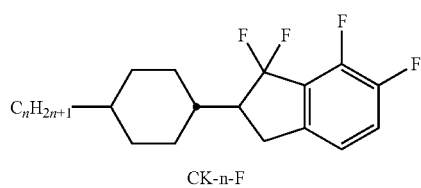
CK-n-F
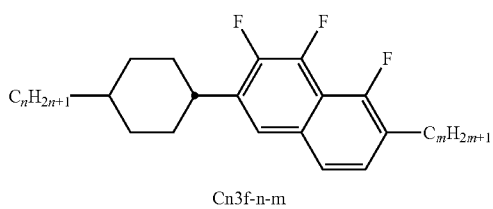
Cn3f-n-m TABLE D-continued
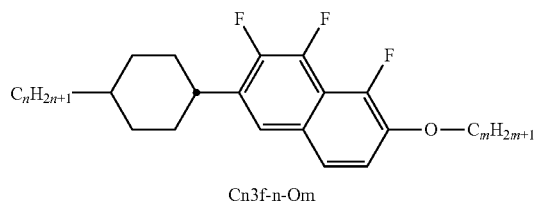
Cn3f-n-Om
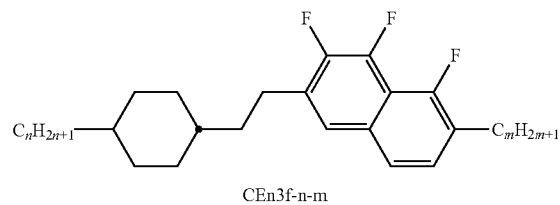
CEn3f-n-m
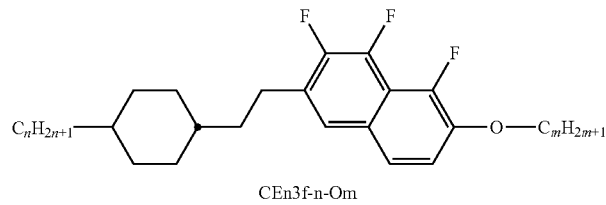
CEn3f-n-Om
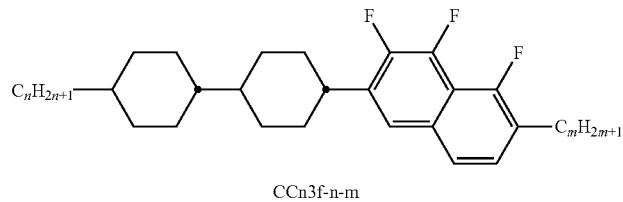
CCn3f-n-m
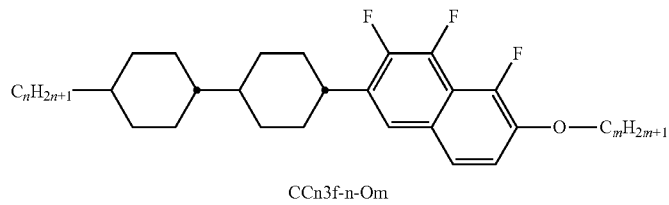
CCn3f-n-Om
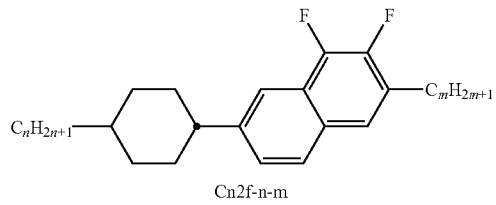
Cn2f-n-m
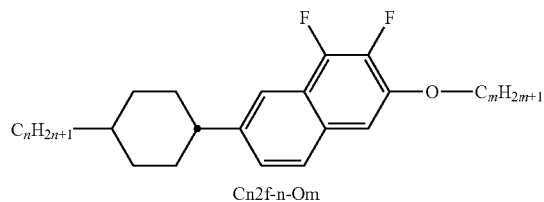
Cn2f-n-Om TABLE D-continued
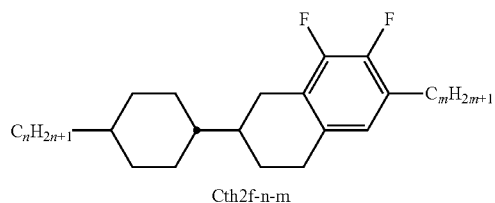
Cth2f-n-m
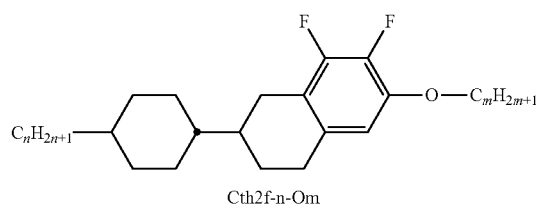
Cth2f-n-Om
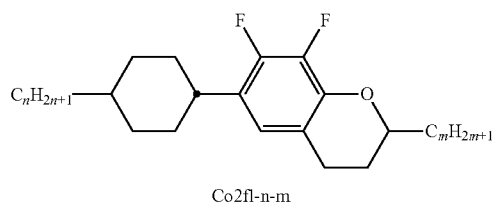
Co2fl-n-m
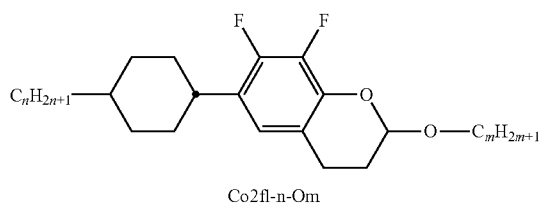
Co2fl-n-Om
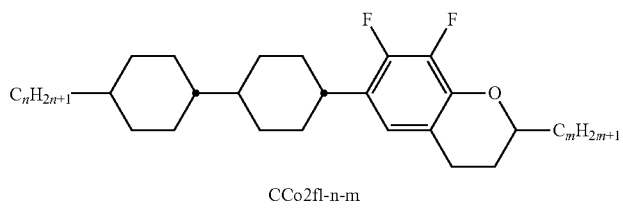
CCo2fl-n-m
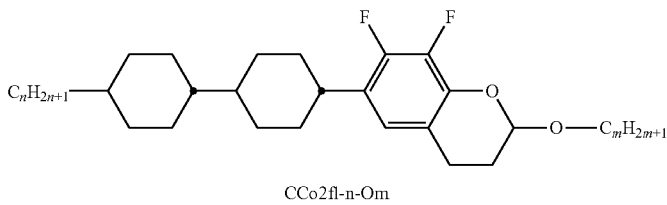
CCo2fl-n-Om
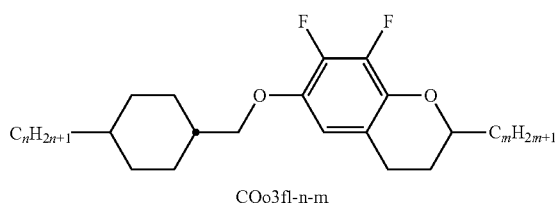
COo3fl-n-m TABLE D-continued
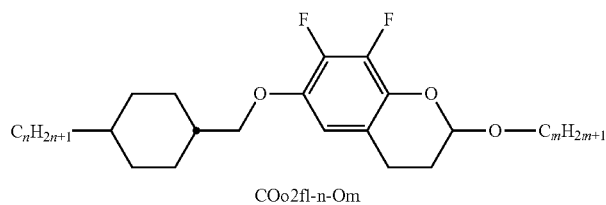
COo2fl-n-Om
CCOo2fl-n-m
CCOo2fl-n-Om
LY-n-m
LY-n-Om
LY-V-m
LY-V-Om
CLY-n-m TABLE D-continued
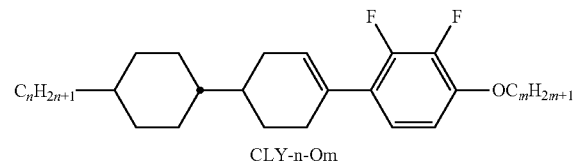
CLY-n-Om
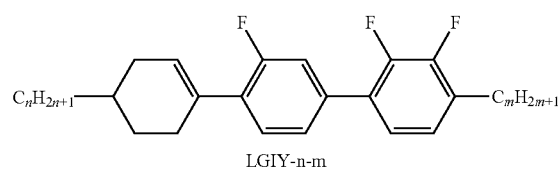
LGIY-n-m
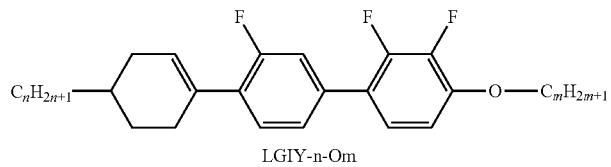
LGIY-n-Om
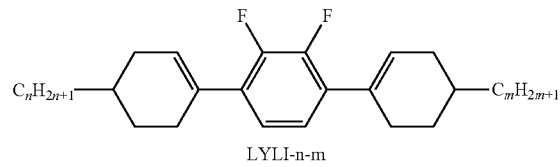
LYLI-n-m
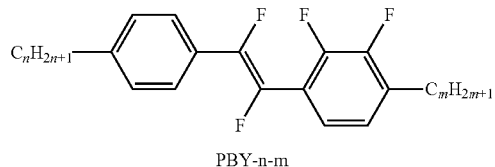
PBY-n-m
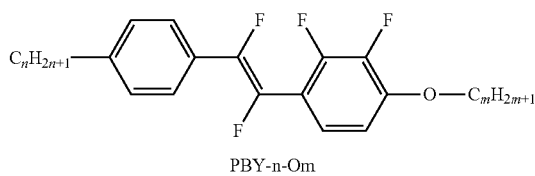
PBY-n-Om
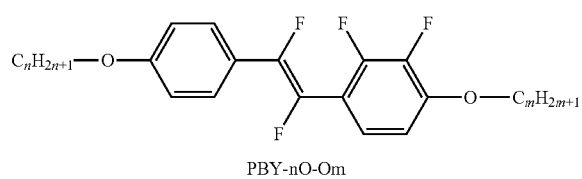
PBY-nO-Om
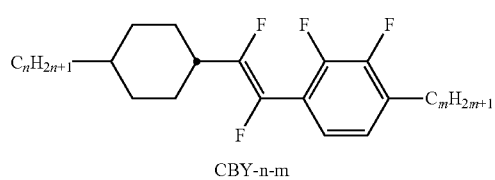
CBY-n-m
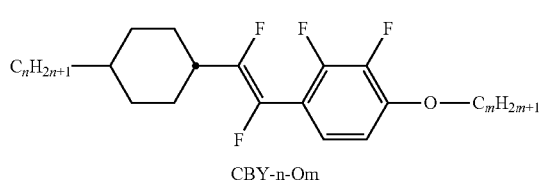
CBY-n-Om TABLE D-continued
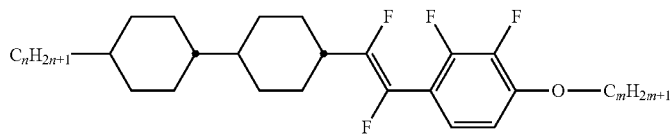
CCBY-n-Om
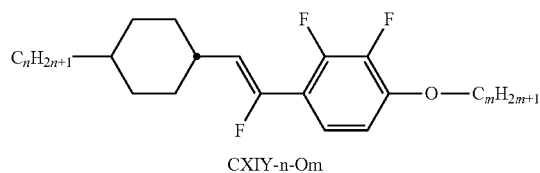
CXIY-n-Om
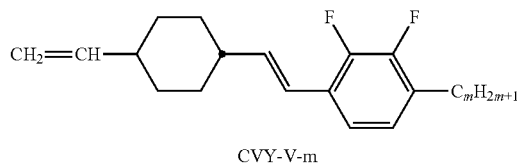
CVY-V-m
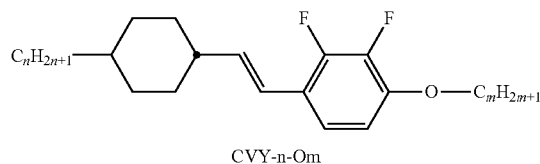
CVY-n-Om
Table E shows chiral dopants which are preferably employed in the mixtures according to the invention.
TABLE E
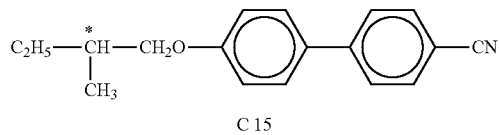
C 15
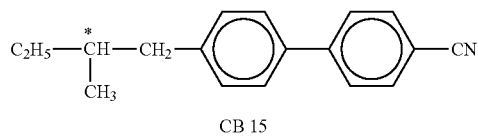
CB 15
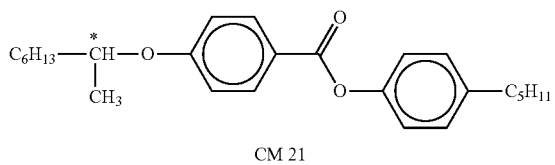
CM 21
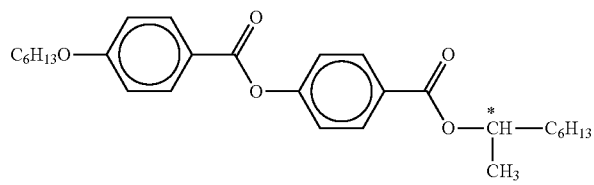
R S-811/S-811

TABLE E-continued
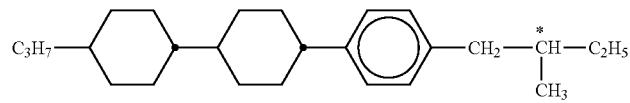
CM 44
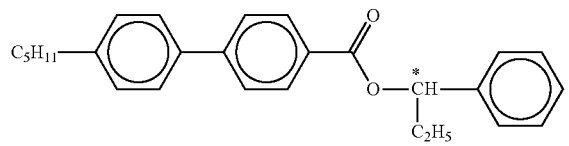
CM 45
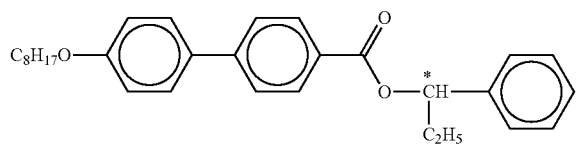
CM 47
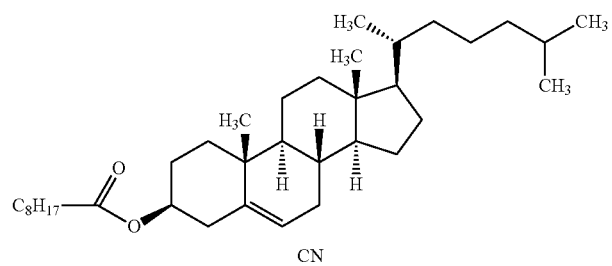
CN
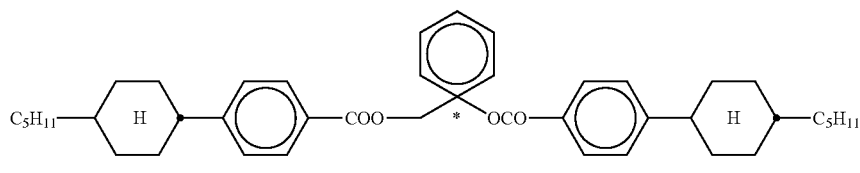
R-1011/S-1011
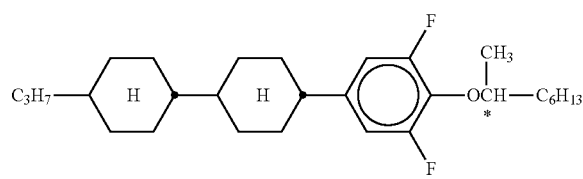
R-2011/S-2011
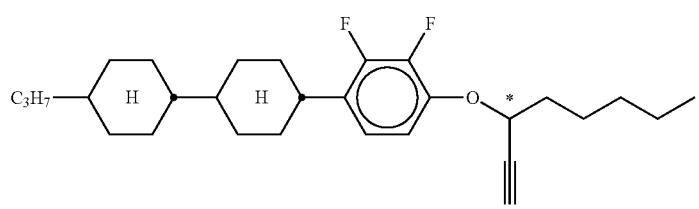
R-3011/S-3011

TABLE E-continued
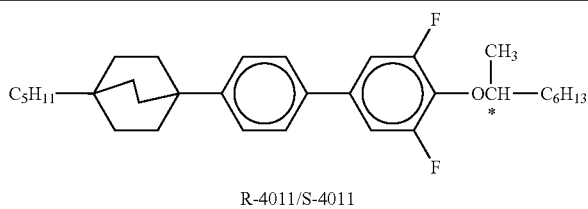
R-4011/S-4011
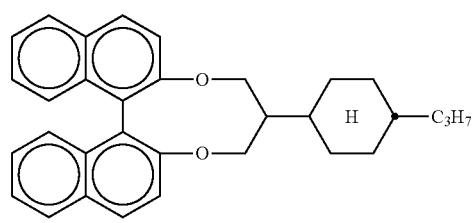
R-5011/S-5011
Compounds selected from the group of the compounds from Table E.
TABLE F
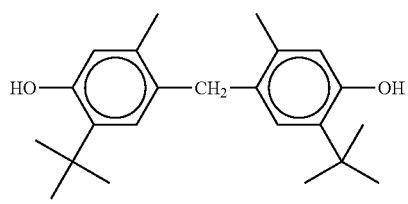
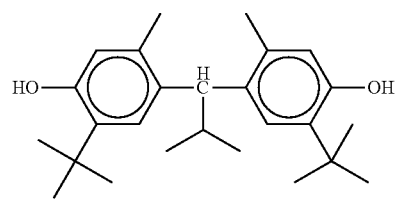
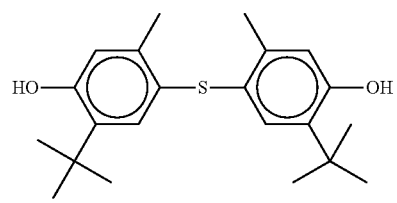
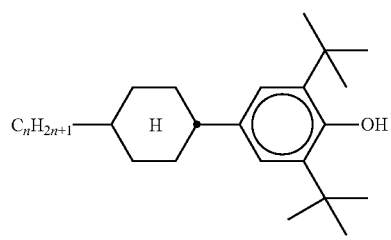

TABLE F-continued
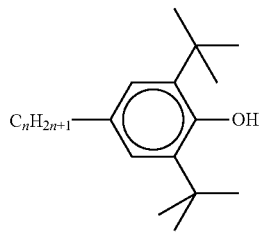
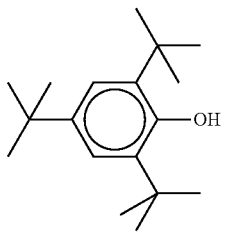
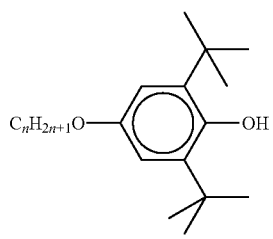
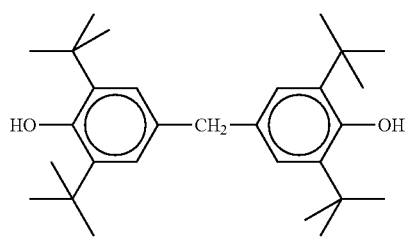
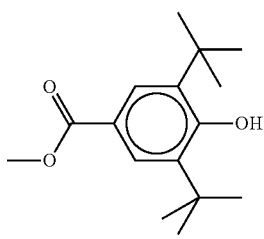
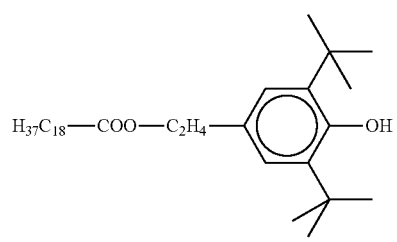
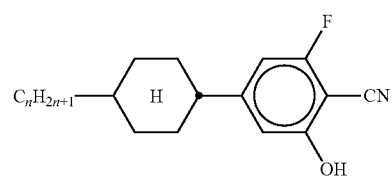

TABLE F-continued
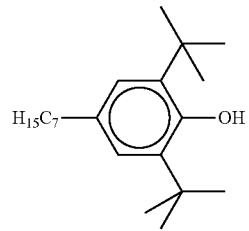
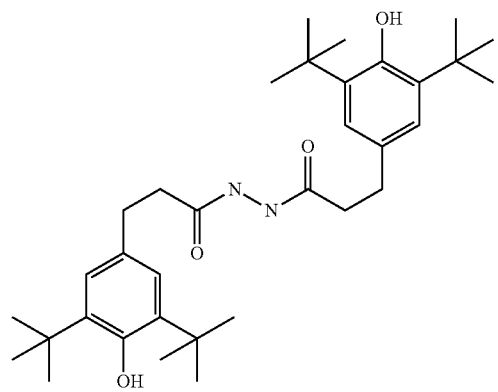 [SMILES: CC(C)(C)c1cc(CCC(=O)NNC(=O)CCc2cc(C(C)(C)C)c(O)c(C(C)(C)C)c2)cc(C(C)(C)C)c1O]
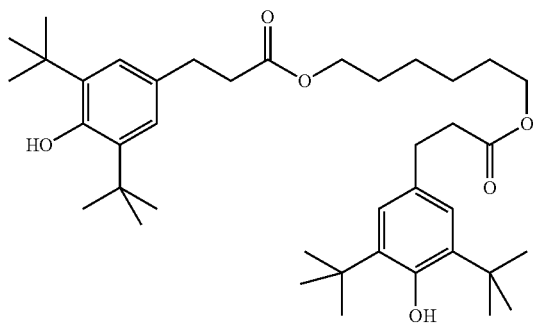 [SMILES: CC(C)(C)c1cc(CCC(=O)OCCCCCCOC(=O)CCc2cc(C(C)(C)C)c(O)c(C(C)(C)C)c2)cc(C(C)(C)C)c1O]
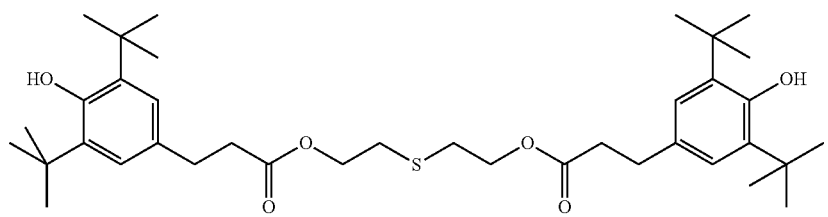 [SMILES: CC(C)(C)c1cc(CCC(=O)OCCSCCOC(=O)CCc2cc(C(C)(C)C)c(O)c(C(C)(C)C)c2)cc(C(C)(C)C)c1O]
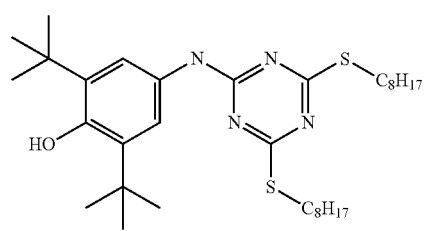

TABLE F-continued
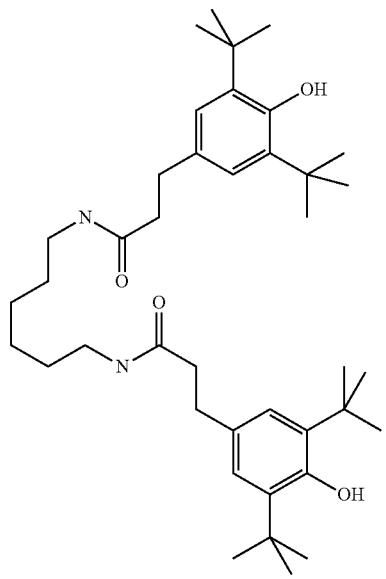 [SMILES: CC(C)(C)c1cc(CCC(=O)NCCCCCCNC(=O)CCc2cc(C(C)(C)C)c(O)c(C(C)(C)C)c2)cc(C(C)(C)C)c1O]
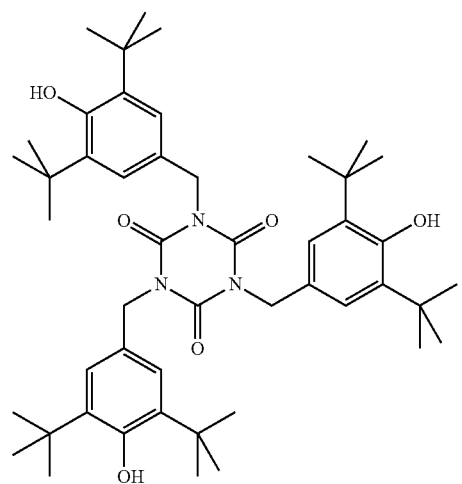 [SMILES: CC(C)(C)c1cc(Cn2c(=O)n(Cc3cc(C(C)(C)C)c(O)c(C(C)(C)C)c3)c(=O)n(Cc3cc(C(C)(C)C)c(O)c(C(C)(C)C)c3)c2=O)cc(C(C)(C)C)c1O]
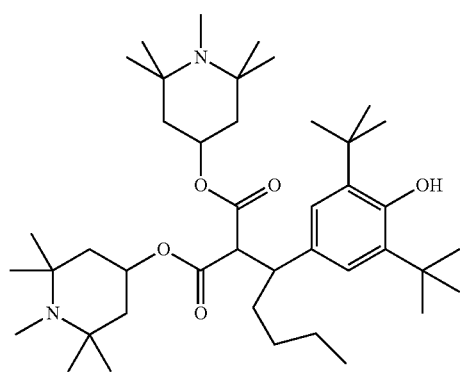 [SMILES: CCCCC(c1cc(C(C)(C)C)c(O)c(C(C)(C)C)c1)C(C(=O)OC1CC(C)(C)N(C)C(C)(C)C1)C(=O)OC1CC(C)(C)N(C)C(C)(C)C1]

TABLE F-continued
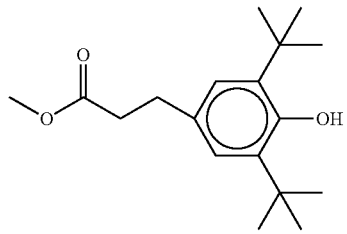
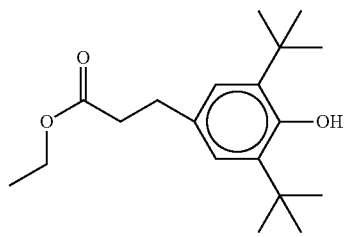
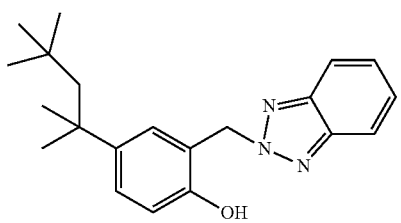 [SMILES: CC(C)(C)CC(C)(C)c1ccc(O)c(Cn2nc3ccccc3n2)c1]
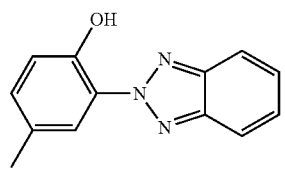 [SMILES: Cc1ccc(O)c(-n2nc3ccccc3n2)c1]
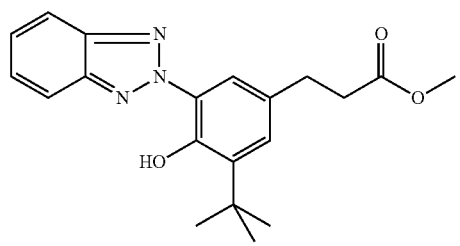
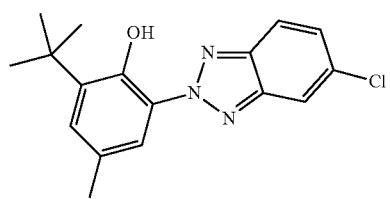 [SMILES: Cc1cc(-n2nc3ccc(Cl)cc3n2)c(O)c(C(C)(C)C)c1]

TABLE F-continued
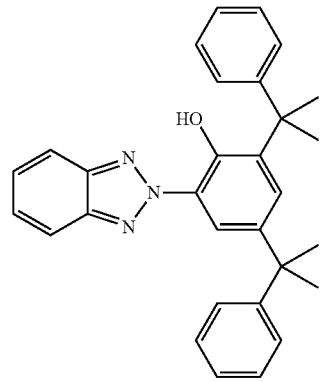 [SMILES: CC(C)(c1ccccc1)c1cc(-n2nc3ccccc3n2)c(O)c(C(C)(C)c2ccccc2)c1]
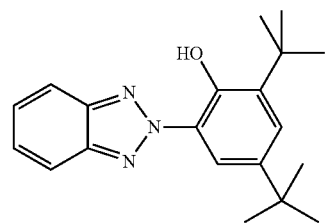 [SMILES: CC(C)(C)c1cc(-n2nc3ccccc3n2)c(O)c(C(C)(C)C)c1]
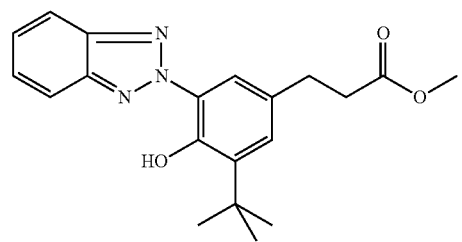 [SMILES: COC(=O)CCc1cc(-n2nc3ccccc3n2)c(O)c(C(C)(C)C)c1]
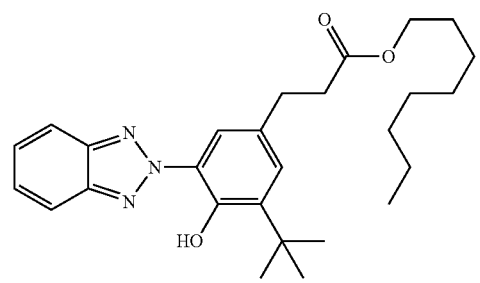 [SMILES: CCCCCCCCOC(=O)CCc1cc(-n2nc3ccccc3n2)c(O)c(C(C)(C)C)c1]

TABLE F-continued
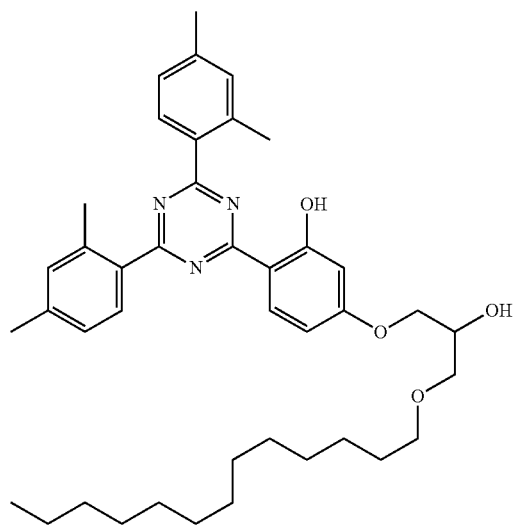 [SMILES: CCCCCCCCCCCCCOCC(O)COc1ccc(-c2nc(-c3ccc(C)cc3C)nc(-c3ccc(C)cc3C)n2)c(O)c1]
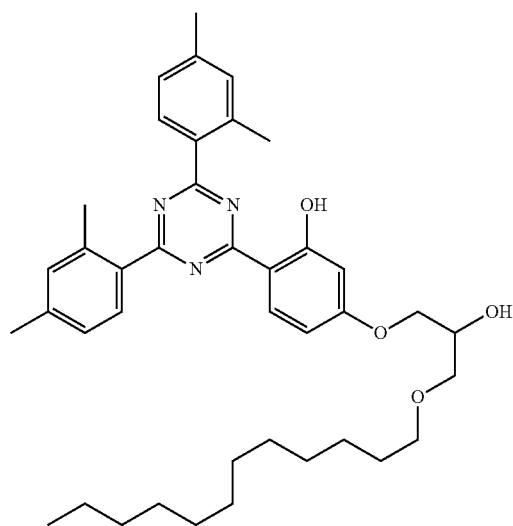 [SMILES: CCCCCCCCCCCCOCC(O)COc1ccc(-c2nc(-c3ccc(C)cc3C)nc(-c3ccc(C)cc3C)n2)c(O)c1]
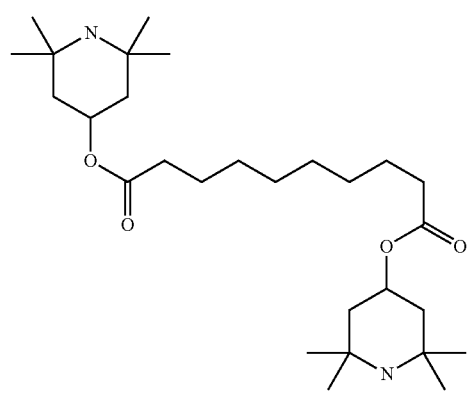

TABLE F-continued
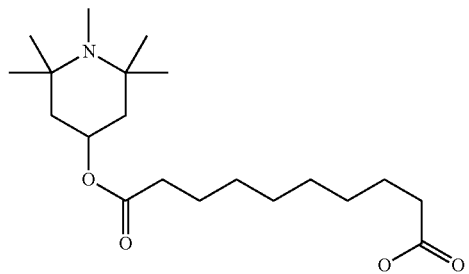
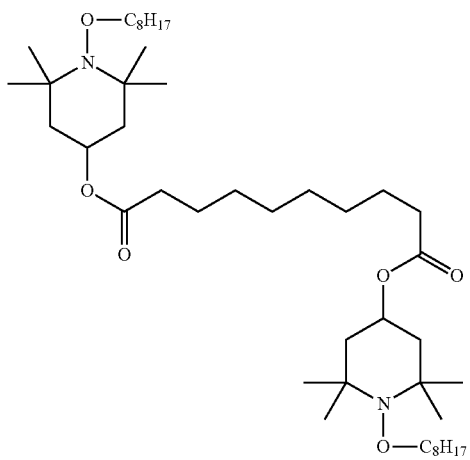
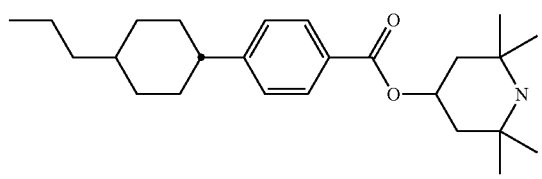
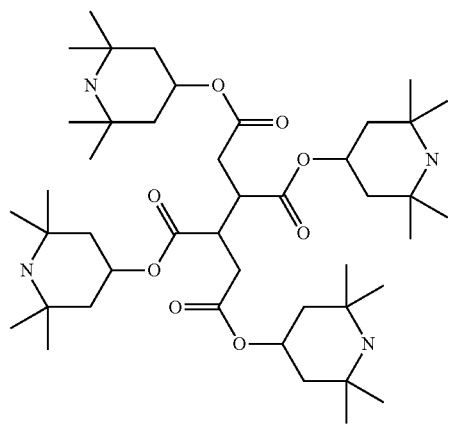

TABLE F-continued

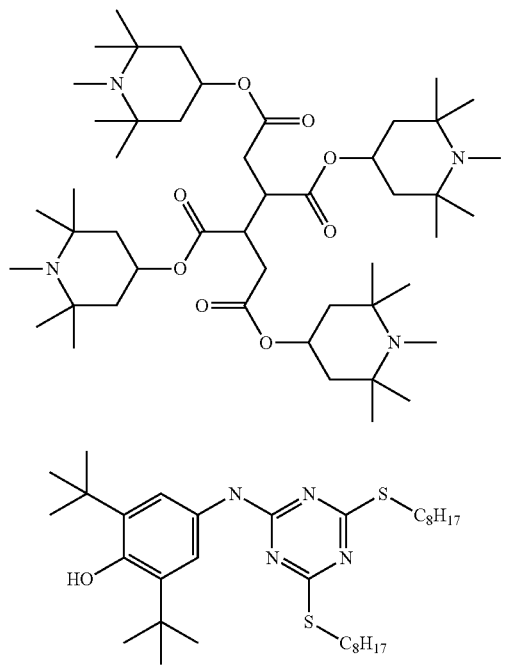

(n here denotes an integer from 1 to 12)

In a preferred embodiment of the present invention, the media according to the invention comprise one or more compounds selected from the group of the compounds from Table F.

SUBSTANCE EXAMPLES

Example 1

Preparation of 1-ethoxy-2,3-difluoro-4-(4-propvlcyclohexylethynyl)benzene ("CTY-3-O2")

The compound 1-ethoxy-2,3-difluoro-4-(4-propylcyclohexylethynyl)benzene ("CTY-3-O2") according to the invention is synthesised as described below.

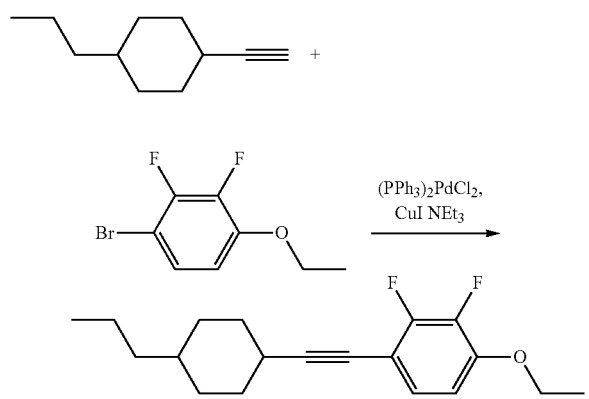

A mixture of 20.6 g (0.14 mol) of 1-ethynyl-4-propylcyclohexane, 25.0 g (0.11 mol) of 1-bromo-4-ethoxy-2,3-difluorobenzene, 2.22 g (3.16 mmol) of bis(triphenylphosphine)palladium(II) chloride and 603 mg (3.16 mmol) of copper(I) iodide in 440 ml of triethylamine is warmed at 50° C. for 19 h. After cooling, the mixture is diluted with MTBE and neutralised using dil. hydrochloric acid. The organic phase is separated off, and the aqueous phase is extracted with MTBE. The combined organic phases are washed with sodium chloride solution and dried using sodium sulfate. The solution is concentrated to dryness, and the residue is purified by column chromatography (SiO$_2$, n-heptane:chlorobutane=9:1). The further purification is carried out by recrystallisation from n-heptane, giving 1-ethoxy-2,3-difluoro-4-(4-propylcyclohexylethynyl)benzene as a colourless solid (m.p. 64° C.). This has the phase sequence: C 64° C. I. The properties, extrapolated from a 10% solution in ZLI-4792, are:

T(N,I) (=cl.p.)=56° C.;

$\Delta\epsilon$=−5.3;

$\Delta$n=0.1438 and $\gamma_1$=72 mPa·s.

$^1$H-NMR (300 MHz, CHCl$_3$): $\delta$=7.07-6.99 (m, 1H, H$_{aryl.}$), 6.65-6.58 (m, 1H, H$_{aryl.}$), 4.10 (q, 2H, J=7.0 Hz, —OCH$_2$CH$_3$), 2.46-2.34 (m, 1H, H$_{propargyl.}$), 2.09-2.00 (m, 2H, H$_{aliphat.}$), 1.83-1.73 (m, 2H, H$_{aliphat.}$), 1.55-1.12 (m, 10H, H$_{aliphat.}$), 1.00-0.84 (m, 5H, H$_{aliphat.}$).

$^{19}$F-NMR (282 MHz, CHCl$_3$): $\delta$=−134.6 (dd, 1F, J=19.4 Hz, J=7.3 Hz), −158.9 (dm, 1F, J=19.4 Hz).

MS (EI): m/e (%)=306 (32, M$^+$), 210 (100).

Examples 2 to 19

The following compounds are synthesised analogously to the compound of Substance Example 1.

| Sub. Ex. | Structural formula | Acronym | Physical data |
|---|---|---|---|
| 2 | | CCTY-3-O2 | C 87 N 215 I<br>cl.p. = 225° C.<br>Δε = −5.5<br>Δn = 0.1706 |
| 3 | | CTY-3-O4 | C 39 N (35) I<br>cl.p. = 32° C.<br>Δε = −5.3<br>Δn = 0.1334<br>γ₁ = 66 mPa·s |
| 4 | | CTY-5-O2 | C 42 N 53 I<br>cl.p. = 52° C.<br>Δε = −5.4<br>Δn = 0.1434<br>γ₁ = 110 mPa·s |
| 5 | | CTY-5-O3 | C 36 N 42 I<br>cl.p. = 45° C.<br>Δε = −5.0<br>Δn = 0.1284<br>γ₁ = 106 mPa·s |
| 6 | | CTY-3-1 | C 42 I<br>cl.p. = −1° C.<br>Δε = −2.0<br>Δn = 0.1284<br>γ₁ = 32 mPa·s |
| 7 | | CCTY-3-O3 | C 88 N 204 I<br>cl.p. = 218° C.<br>Δε = −5.3<br>Δn = 0.1655 |
| 8 | | CTY-3-O1 | C 36 I<br>cl.p. = 14° C.<br>Δε = −5.3<br>Δn = 0.1394<br>γ₁ = 69 mPa·s |
| 9 | | CCTY-3-1 | C 94 N 186 I<br>cl.p. = 203° C.<br>Δε = −2.4<br>Δn = 0.1706 |
| 10 | | CCTY-5-O4 | C 67 SmC (55)<br>SmA 134 N<br>196 I<br>cl.p. = 214° C.<br>Δε = −5.1<br>Δn = 0.1545 |
| 11 | | CTYP-3-1 | C 94 N 164 I<br>cl.p. = 182° C.<br>Δε = −2.4<br>Δn = 0.2425 |

-continued

| Sub. Ex. | Structural formula | Acronym | Physical data |
|---|---|---|---|
| 12 | | CCTY-3-O4 | C 73 SmA 83 N 197 I cl.p. = 211° C. Δε = −5.3 Δn = 0.1592 |
| 13 | | CTYY-3-O3 | C 78 N 143 I cl.p. = 145° C. Δε = −8.1 Δn = 0.2085 |
| 14 | | CCTY-5-O3 | C 77 SmA 117 N 200 I cl.p. = 218° C. Δε = −5.4 Δn = 0.1645 |
| 15 | | CCTY-V1 | C 53 N 174 I cl.p. = 183° C. Δε = −2.6 Δn = 0.1695 |
| 16 | | CCTY-V-O2 | C 86 N 199 I cl.p. = 211° C. Δε = −5.7 Δn = 0.1844 |
| 17 | | CTY-5-O4 | C 31 N 46 I cl.p. = 48° C. Δε = −5.1 Δn = 0.1353 $\gamma_1$ = 111 mPa·s |
| 18 | | CCTY-1V-O2 | C 110 N 251 I cl.p. = 250° C. Δε = −5.5 Δn = 0.1811 |
| 19 | | CTY-V-O2 | C 52 I cl.p. = 11° C. Δε = −6.3 Δn = 0.1441 $\gamma_1$ = 53 mPa·s |

Example 20

1-Butoxy-2,3-difluoro-4-[(E)-2-(4-pentylcyclohexyl) vinyl]-benzene ("CVY-5-O4")

The compound 1-butoxy-2,3-difluoro-4-[(E)-2-(4-pentylcyclohexyl)vinyl]-benzene ("CVY-5-O4") according to the invention is synthesised as described below.

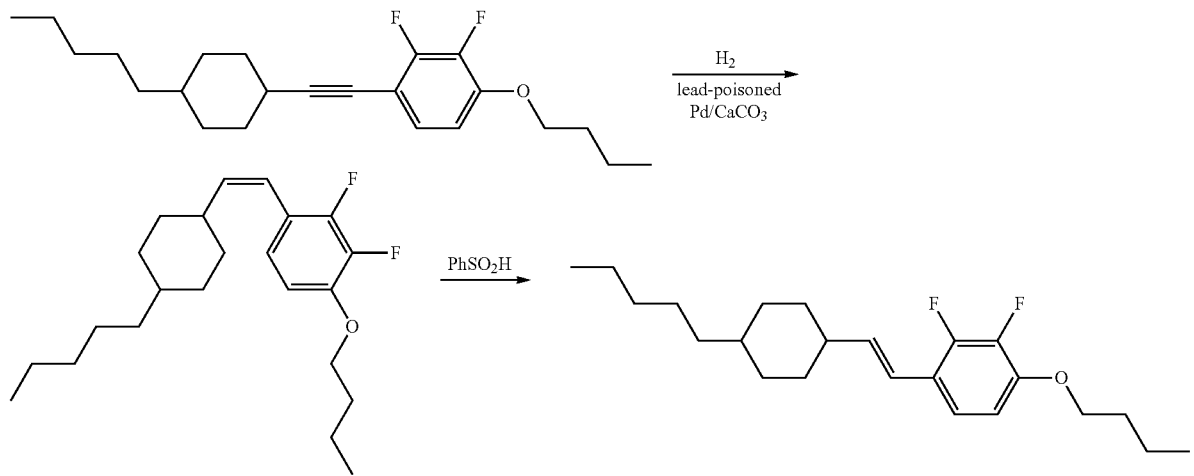

4.40 g (12.0 mmol) of 1-butoxy-2,3-difluoro-4-(4-pentyl-cyclohexylethynyl)benzene in 50 ml of THF are hydrogenated at room temperature and atmospheric pressure for a few minutes in the presence of Pd(5%)/CaCO$_3$ (lead-poisoned Lindlar catalyst). The reaction solution is filtered and concentrated to dryness.

The residue is taken up in 25 ml of toluene and refluxed for 20 h together with 811 mg (4.94 mmol) of benzenesulfinic acid sodium salt and 6 ml of 1 N hydrochloric acid. The batch is diluted with MTBE and washed successively with water, sat. sodium hydrogencarbonate solution and sat. sodium chloride solution. The solution is dried using sodium sulfate and concentrated to dryness. The residue is purified by column chromatography (SiO$_2$, n-heptane:1-chlorobutane=4:1). The further purification is carried out by recrystallization from ethanol and n-heptane, giving 1-butoxy-2,3-difluoro-4-[(E)-2-(4-pentylcyclohexyl)vinyl]benzene ("CVY-5-O4") as a colourless solid.

Phase sequence: C 54 N 74 I;
cl.p.=78° C.;
$\Delta\varepsilon$=−6.0;
$\Delta n$=0.1345 and
$\gamma_1$=138 mPa·s.

$^1$H-NMR (300 MHz, CHCl$_3$): δ=7.07-6.99 (m, 1H, H$_{aryl.}$), 6.70-6.62 (m, 1H, H$_{aryl.}$), 6.38 (d, 1H, J=15.8 Hz, H$_{alkenyl.}$), 6.13 (dd, 1H, J=15.8 Hz, J=7.0 Hz, H$_{alkenyl.}$), 4.03 (t, 2H, 6.6 Hz, —OCH$_2$C$_3$H$_7$), 2.13-1.99 (m, 1H, H$_{allyl.}$), 1.87-1.73 (m, 6H, H$_{aliphat.}$), 1.56-1.43 (m, 2H, H$_{aliphat.}$), 1.36-1.11 (m, 11H, H$_{aliphat.}$), 1.02-0.86 (m, 8H, H$_{aliphat.}$).

$^{19}$F-NMR (282 MHz, CHCl$_3$): δ=−142.9 (ddd, 1F, J=19.1 Hz, J=7.6 Hz, J=1.9 Hz), −159.8 (ddd, 1F, J=19.1 Hz, J=7.6 Hz, J=1.9 Hz).

MS (EI): m/e (%)=354 (53, M$^+$), 156 (100).

Examples 21 to 29

The following compounds were synthesised analogously:

| Ex. | Structural formula | Acronym | Physical data |
|---|---|---|---|
| 21 | | CVY-3-O2 | C 61 N 66 I<br>cl.p. = 67° C.<br>Δε = −6.4<br>Δn = 0.1374<br>$\gamma_1$ = 99 mPa·s |
| 22 | | CVY-3-O4 | Tg −75 C 21 N 61 I<br>cl.p. = 59° C.<br>Δε = −5.4<br>Δn = 0.1255<br>$\gamma_1$ = 103 mPa·s |
| 23 | | CVY-3-O1 | C 52 N 56 I<br>cl.p. = 43° C.<br>Δε = −6.3<br>Δn = 0.1285<br>$\gamma_1$ = 63 mPa·s |

-continued

| Ex. | Structural formula | Acronym | Physical data |
|---|---|---|---|
| 24 | | CCVY-3-O3 | C 42 SmA 142 N 219 I cl.p. = 235° C. Δε = −5.7 Δn = 0.1523 |
| 25 | | CCVY-3-O2 | C 76 SmA 118 N 231 I cl.p. = 247° C. Δε = −6.0 Δn = 0.1595 |
| 26 | | CCVY-5-O3 | Tg −79 C 34 Sm 103 SmA 166 N 220 I cl.p. = 236° C. Δε = −5.7 Δn = 0.1595 |
| 27 | | CCVY-5-O4 | Tg −79 SmC −35 SmA 172 N 214 I cl.p. = 236° C. Δε = −5.3 Δn = 0.1465 |
| 28 | | CVY-5-O4 | Tg −79 C 23 SmA (9) N 69 I cl.p. = 73° C. Δε = −5.5 Δn = 0.1264 γ₁ = 151 mPa·s |
| 29 | | CCVY-1V-O2 | C 91 SmA (78) N 271 I cl.p. = 262° C. Δε = −5.6 Δn = 0.1791 |

Example 30

1-[(E)-1,2-Difluoro-2-(4-propylcyclohexyl)vinyl]-4-ethoxy-2,3-difluorobenzene ("CBY-3-O2")

The compound 1-[(E)-1,2-difluoro-2-(4-propylcyclohexyl)vinyl]-4-ethoxy-2,3-difluorobenzene ("CBY-3-O2") according to the invention is synthesised as described below.

30.1 Synthesis of 1-chloro-4-propylcyclohexane

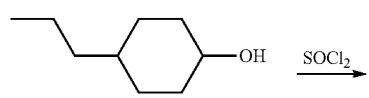

100.0 g (0.70 mol) of 4-propylcyclohexanol are initially introduced in 1200 ml of toluene together with 2.7 ml of DMF, and the mixture is heated to reflux. 255 ml (3.52 mol) of thionyl chloride are carefully metered in, and the batch is heated for a further 4 h. After cooling, the mixture is added to water, and the organic phase is separated off. The aqueous phase is extracted with toluene, and the combined organic phases are washed with water and saturated sodium chloride solution. The solution is dried using sodium sulfate and concentrated to dryness. The crude product is purified by column chromatography (SiO₂, n-heptane), giving 1-chloro-4-propylcyclohexane as a colourless liquid.

30.2 Synthesis of [(Z)-1,2-difluoro-2-(4-propylcyclohexyl)vinyl]triethylsilane The starting material triethyltrifluorovinylsilane is synthesised as described in the literature [S. A. Fontana, C. R. Davis, Y.-B. He, D. J. Burton, *Tetrahedron* 1996, 52, 37-44].

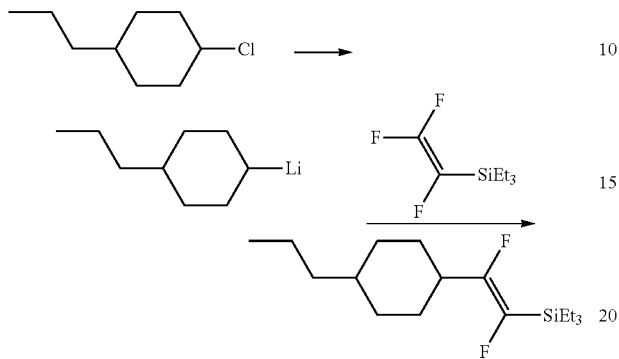

74.1 g (0.28 mol) of 4,4'-di-tert-butylbiphenyl are initially introduced in 1000 ml of THF in an argon atmosphere, and 1.6 g (0.23 mol) of lithium (granules) are added at 0° C. After 5 h, the blue solution is cooled to −78° C., and 40.6 g (0.25 mol) of 1-chloro-4-propylcyclohexane are added. After 30 min at this temperature, 49.6 g (0.25 mol) of triethyltrifluorovinylsilane are metered in. The mixture is warmed slowly and stirred at room temperature for 16 h. Water is added, and the batch is extracted with MTBE. The aqueous phase is extracted with MTBE, and the combined organic phases are washed with water and saturated sodium chloride solution. The solution is dried using sodium sulfate and concentrated under reduced pressure. The residue is digested with methanol, and insoluble material is filtered off. The filtrate is concentrated under reduced pressure, and the residue is purified by column chromatography (SiO$_2$, pentane), giving [(Z)-1,2-difluoro-2-(4-propylcyclohexyl)vinyl]triethylsilane as a colourless oil.

30.3 Synthesis of 1-((E)-1,2-difluorovinyl)-4-propylcyclohexane

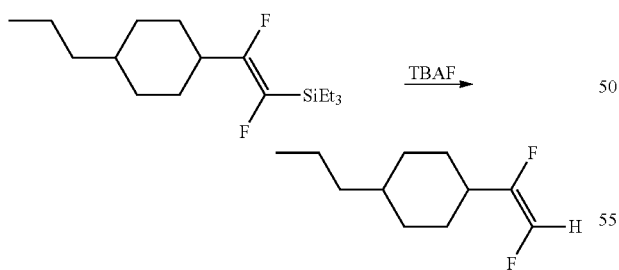

34.6 g (0.11 mol) of [(Z)-1,2-difluoro-2-(4-propylcyclohexyl)vinyl]triethylsilane are refluxed for 20 h in 900 ml of THF together with 45 ml of water and 160 ml of TBAF (0.16 mol, 1 M soln. in THF). The batch is diluted with MTBE and washed a number of times with water. The aqueous phases are extracted with MTBE, and the combined organic phases are washed with water and saturated sodium chloride solution. The solution is dried using sodium sulfate and concentrated under reduced pressure. The residue is purified by column chromatography (SiO$_2$, pentane), giving 1-((E)-1,2-difluorovinyl)-4-propylcyclohexane as a colourless oil.

30.4 Synthesis of 1-((Z)-1,2-difluoro-2-iodovinyl)-4-propylcyclohexane

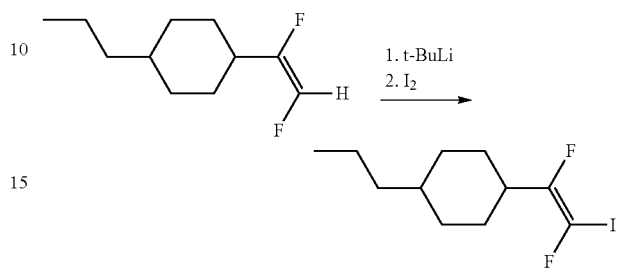

7.0 g (26.3 mmol) of 1-((E)-1,2-difluorovinyl)-4-propylcyclohexane are initially introduced in 150 ml of THF at −55° C., and 20.5 ml (30.2 mmol, 15% soln. in n-pentane) of t-BuLi are metered in. After 2 h at this temperature, a solution of 7.67 g (30.0 mmol) of iodine in 50 ml of THF is added dropwise. The mixture is slowly warmed to 0° C., and water is added. The batch is extracted with MTBE, and the organic phase is washed with water and saturated sodium chloride solution. The solution is dried using sodium sulfate and concentrated to dryness. The residue is purified by column chromatography (SiO$_2$, pentane), giving 1-((Z)-1,2-difluoro-2-iodovinyl)-4-propylcyclohexane as a pale-violet oil.

30.5 Synthesis of 1-[(E)-1,2-difluoro-2-(4-propylcyclohexyl)vinyl]-4-ethoxy-

2,3-difluorobenzene ("CBY-3-O2")

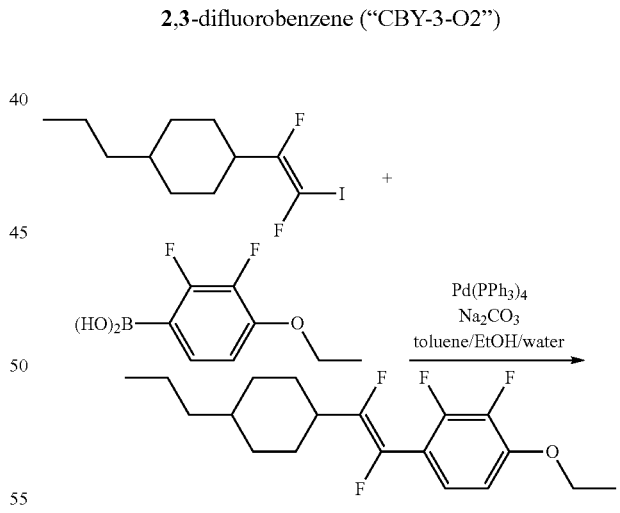

6.30 g (20.1 mmol) of 1-((Z)-1,2-difluoro-2-iodovinyl)-4-propylcyclohexane and 4.86 g (24.1 mmol) of 2,3-difluoro-4-ethoxybenzeneboronic acid are refluxed for 19 h together with 1.16 g (1.0 mmol) of tetrakistriphenylpalladium(0) and 20 ml (20 mmol) of sodium carbonate solution (2 M) in 90 ml of ethanol/toluene (2:1). Water is added, and the batch is extracted with MTBE. The aqueous phase is extracted with MTBE, and the combined organic phases are washed with water. The solution is dried using sodium sulfate and concentrated to dryness. The residue is purified by column chromatography (SiO$_2$, n-heptane:1-chlorobutane=4:1). The further purification is carried out by recrystallisation from n-heptane, giving 1-[(E)-1,2-difluoro-2-(4-propylcyclohexyl)vinyl]-4-ethoxy-2,3-difluorobenzene as a colourless solid (m.p. 60° C.).

Phase sequence: C 60 N 64 I;

cl.p.=59° C.;

$\Delta\epsilon$=−6.5;

$\Delta n$=0.1169 and $\gamma_1$=106 mPa·s.

$^1$H-NMR (400 MHz, CHCl$_3$): δ=7.11-7.06 (m, 1H, H$_{aryl.}$), 6.77-6.71 (m, 1H, H$_{aryl.}$), 4.14 (q, 2H, J=7.2 Hz, —OCH$_2$CH$_3$), 2.81-2.64 (m, 1H, H$_{allyl.}$), 1.89-1.80 (m, 4H, H$_{aliphat.}$), 1.63-1.43 (m, 5H, H$_{aliphat.}$), 1.38-1.16 (m, 5H, H$_{aliphat.}$), 1.07-0.95 (m, 2H, H$_{aliphat.}$), 0.89 (t, 3H, J=7.2 Hz, CH$_2$CH$_3$).

$^{19}$F-NMR (376 MHz, CHCl$_3$): δ=−135.0 to −135.2 (m, 1F, F$_{aryl.}$), −152.0 (ddd, 1H, J=131 Hz, J=12.6 Hz, J=4.9 Hz, F$_{alkenyl.}$), −155.0 (ddd, 1H, J=131 Hz, J=30.1 Hz, J=21.4 Hz, F$_{alkenyl.}$), −155.0 (ddd, 1H, J=131 Hz, J=30.1 Hz, J=21.4 Hz, F$_{alkenyl.}$), −158.9 (ddd, 1H, J=21.4 Hz, J=7.5 Hz, J=2.4 Hz, F$_{aryl.}$).

MS (EI): m/e (%)=344 (100, M$^+$).

Mixture Examples 1 to 4

Mixtures M-1 to M-4 having the following compositions are prepared and investigated with respect to their properties.

Mixture Example 1

| Composition | | |
| --- | --- | --- |
| Compound | | Concentration |
| No. | Abbreviation | /% by weight |
| 1 | PBY-3-O2 | 20.0 |
| 2 | CY-3-O4 | 9.6 |
| 3 | CY-5-O4 | 9.6 |
| 4 | CCY-2-O2 | 9.6 |
| 5 | CCY-3-O2 | 9.6 |
| 6 | CCY-5-O2 | 9.6 |
| 7 | CCY-2-1 | 6.4 |
| 8 | CCY-3-1 | 6.4 |
| 9 | CC-3-4 | 6.4 |
| 10 | CP-5-3 | 12.8 |
| Σ | | 100.0 |

| Physical properties | |
| --- | --- |
| T(N, I) = | 71.5° C. |
| n$_e$(20° C., 589 nm) = | 1.591 |
| Δn(20° C., 589 nm) = | 0.111 |
| Δε(20° C., 1 kHz) = | −3.9 |
| γ$_1$(20° C.) = | 161 mPa·s |

This mixture is highly suitable for use in VA displays.

Comparison Test

This mixture is introduced into a test cell for determination of the VHR and investigated with respect to its stability to a backlight which is customary for LCDs (cold cathode fluorescent lamp/CCFL backlight) as described above.

The HR (VHR) (voltage holding ratio) in the cell after 5 min in the oven at 100° C. (HR$_{100}$) is 92%. After irradiation with the CCFL backlight for 1000 h, the HR is 77%.

Test

In the comparison test, this mixture is introduced into a VHR test cell. However, it is investigated here with respect to its stability to a (new) backlight for LCDs which utilises LEDs as light sources. The HR (VHR) (voltage holding ratio) in the cell after 10 min at 100° C. is 92% as in the comparison test. After irradiation with the LED backlight for 1000 h, however, the HR is still 86% and is thus significantly better.

Mixture Example 2

| Composition | | |
| --- | --- | --- |
| Compound | | Concentration |
| No. | Abbreviation | /% by weight |
| 1 | CBY-3-O2 | 19.0 |
| 2 | CY-5-O2 | 5.0 |
| 3 | CCY-3-O2 | 2.0 |
| 4 | CLY-2-O4 | 4.0 |
| 5 | CLY-3-O2 | 4.0 |
| 6 | CLY-3-O3 | 4.0 |
| 7 | CPY-2-O2 | 8.0 |
| 8 | CPY-3-O2 | 9.0 |
| 9 | CC-3-V | 34.0 |
| 10 | CC-3-V1 | 11.0 |
| Σ | | 100.0 |

| Physical properties | |
| --- | --- |
| T(N, I) = | 81° C. |
| n$_e$(20° C., 589 nm) = | 1.5736 |
| Δn(20° C., 589 nm) = | 0.0966 |
| ε$_\perp$(20° C., 1 kHz) = | 6.3 |
| Δε(20° C., 1 kHz) = | −3.0 |
| γ$_1$(20° C.) = | 93 mPa·s |
| k$_1$(20° C.) = | 13.9 pN |
| k$_3$(20° C.) = | 16.7 pN |
| V$_0$(20° C.) = | 2.51 V |

This mixture is highly suitable for use in VA displays. It is adequately stable to lighting with an LED backlight.

Mixture Example 3

| Composition | | |
| --- | --- | --- |
| Compound | | Concentration |
| No. | Abbreviation | /% by weight |
| 1 | CVY-3-O2 | 19.0 |
| 2 | CY-5-O2 | 5.0 |
| 3 | CCY-3-O2 | 5.0 |
| 4 | CLY-2-O4 | 4.0 |
| 5 | CLY-3-O2 | 4.0 |
| 6 | CLY-3-O3 | 4.0 |
| 7 | CPY-2-O2 | 6.0 |
| 8 | CPY-3-O2 | 8.0 |
| 9 | CC-3-V | 38.0 |
| 10 | CC-3-V1 | 7.0 |
| Σ | | 100.0 |

-continued

| Physical properties | |
|---|---|
| T(N, I) = | 82° C. |
| $n_e$(20° C., 589 nm) = | 1.5769 |
| Δn(20° C., 589 nm) = | 0.0978 |
| $\epsilon_\perp$(20° C., 1 kHz) = | 6.5 |
| Δε(20° C., 1 kHz) = | −3.1 |
| $\gamma_1$(20° C.) = | 88 mPa · s |
| $k_1$(20° C.) = | 14.6 pN |
| $k_3$(20° C.) = | 16.4 pN |
| $V_0$(20° C.) = | 2.43 V |

This mixture is highly suitable for use in VA displays. It is adequately stable to lighting with an LED backlight.

Mixture Example 4

| Composition | | |
|---|---|---|
| Compound | | Concentration |
| No. | Abbreviation | /% by weight |
| 1 | CVY-3-O2 | 22.0 |
| 2 | CY-3-O2 | 3.0 |
| 3 | CY-5-O2 | 6.0 |
| 4 | CCY-3-O2 | 8.0 |
| 5 | CCY-4-O2 | 3.0 |
| 6 | CLY-2-O4 | 4.0 |
| 7 | CLY-3-O2 | 4.0 |
| 8 | CLY-3-O3 | 4.0 |
| 9 | CPY-3-O2 | 5.0 |
| 10 | CC-3-V | 33.0 |
| 11 | CC-3-V1 | 8.0 |
| Σ | | 100.0 |

| Physical properties | |
|---|---|
| T(N, I) = | 80° C. |
| $n_e$(20° C., 589 nm) = | 1.5718 |
| Δn(20° C., 589 nm) = | 0.0943 |
| $\epsilon_\perp$(20° C., 1 kHz) = | 7.0 |
| Δε(20° C., 1 kHz) = | −3.5 |
| $\gamma_1$(20° C.) = | 108 mPa · s |
| $k_1$(20° C.) = | 14.5 pN |
| $k_3$(20° C.) = | 16.5 pN |
| $V_0$(20° C.) = | 2.29 V |

This mixture is highly suitable for use in VA displays. It is adequately stable to lighting with an LED backlight.

The invention claimed is:

1. An electro-optical display based on a liquid-crystal cell, which contains as dielectric, a liquid-crystalline medium having negative dielectric anisotropy and includes a backlight which only emits light having a wavelength of 420 nm or more or has, between the liquid-crystal layer and the backlight, a cut-off filter which only allows light having a wavelength of 420 nm or more to pass through, wherein the liquid-crystalline medium having negative dielectric anisotropy comprises a) a (first) dielectrically negative component (component A), which consists of one or more compounds of formula I

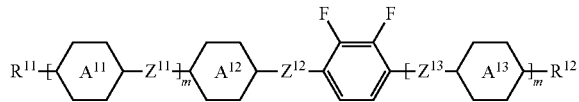

in which $R^{11}$ and $R^{12}$ each, independently of one another, denote H, an unsubstituted alkyl or alkenyl radical having up to 15 C atoms, in which one or more $CH_2$ groups are optionally replaced by —O—, —S—,

—C≡C—, —$CF_2$—O—, —O—$CF_2$—, —CO—O— or —O—CO— in such a way that O atoms are not linked directly to one another,

and, if present,

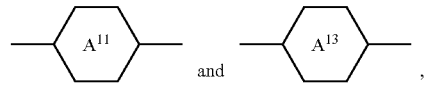

each, independently of one another, denote

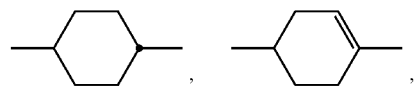

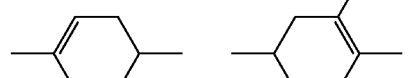

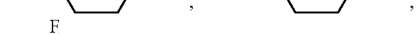

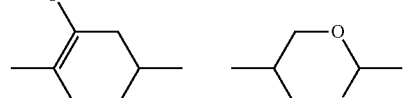

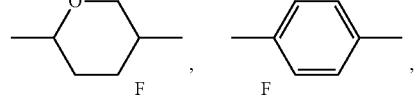

or

-continued

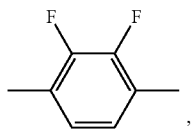

$Z^{12}$ denotes —CF=CF—, —CF=CH—, —CH=CF—, —CH=CH— or —C≡C—, $Z^{11}$ and $Z^{13}$, if present, each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, m and n, independently of one another, denote 0, 1 or 2, and b) a (second) dielectrically negative component (component B).

2. A display according to claim 1, wherein the second dielectrically negative component (component B) of the liquid-crystalline medium consists of one or more compounds of formulae II, III and IV, wherein the compound of formula II is not a compound of formula I:

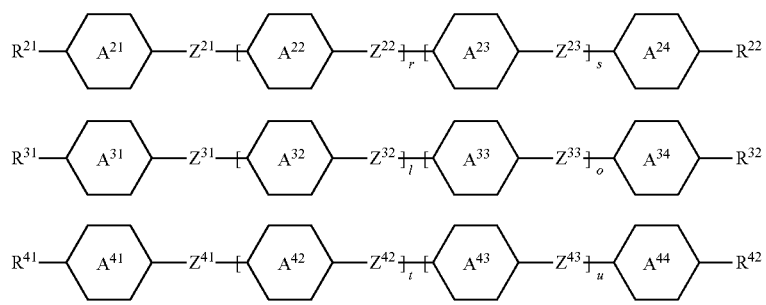

in which $R^{21}$ and $R^{22}$ each, independently of one another, denote H, an unsubstituted alkyl or alkenyl radical having up to 15 C atoms, in which one or more CH$_2$ groups are optionally replaced by —O—, —S—,

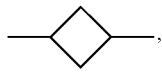

—C≡C—, —CF$_2$—O—, —O—CF$_2$—, —CO—O— or —O—CO— in such a way that O atoms are not linked directly to one another, $R^{31}$, $R^{32}$, $R^{41}$ and $R^{42}$ each, independently of one another, have one of the meanings given for $R^{21}$ and $R^{22}$, one of the rings

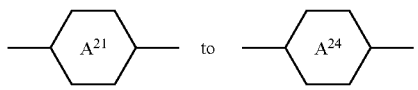

present denotes

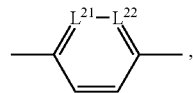

$L^{21}$ and $L^{22}$, independently of one another, denote =C($X^2$)— and one of $L^{21}$ and $L^{22}$ alternatively also denotes =N—, $X^2$ denotes F, Cl, OCF$_3$, CF$_3$, CH$_3$, CH$_2$F, or CHF$_2$, and the other rings, if present, each, independently of one another, denote

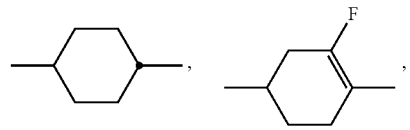

-continued

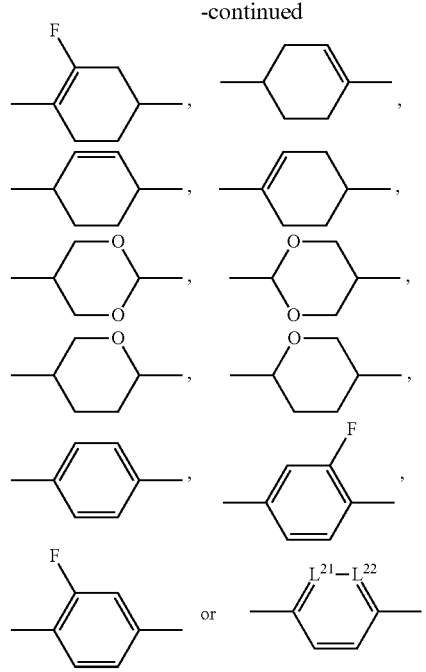

one of the rings
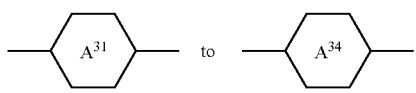
present denotes
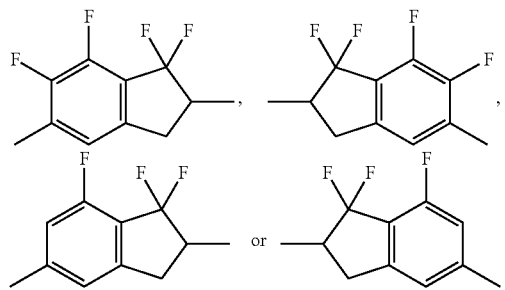
and the others, if present, each, independently of one another, denote
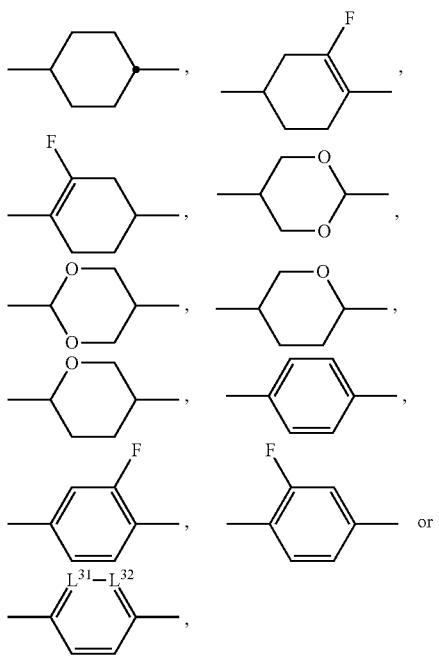
where
$L^{31}$ and $L^{32}$, independently of one another, denote =C($X^3$)— and one of $L^{31}$ and $L^{32}$ alternatively also denotes =N—, and
$X^3$ denotes F, Cl, OCF$_3$, CF$_3$, CH$_3$, CH$_2$F, or CHF$_2$,
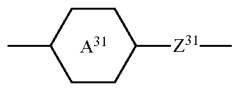
together optionally also denote a single bond, one of the rings
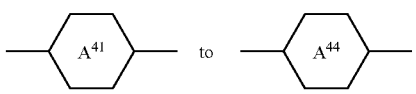
present denotes
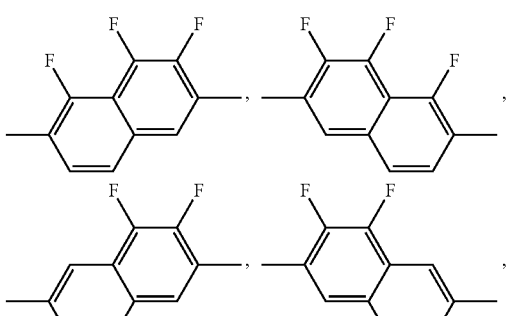
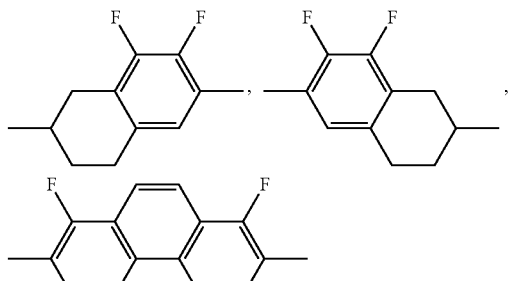
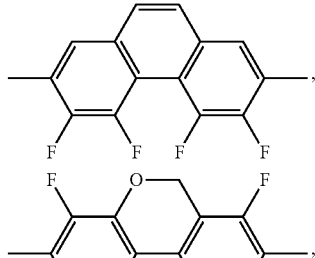
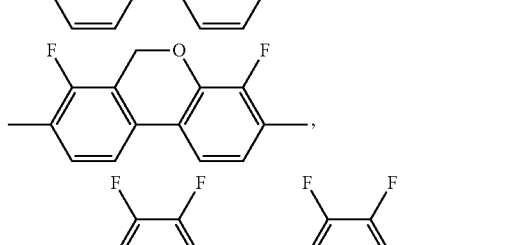
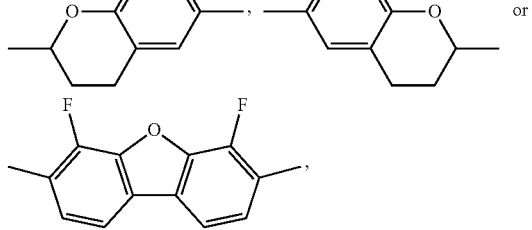

and the others, if present, each, independently of one another, denote

[structures shown]

together optionally also denote a single bond,
$Z^{21}$ to $Z^{23}$,
$Z^{31}$ to $Z^{33}$ and
$Z^{41}$ to $Z^{43}$ each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond,
l and o each, independently of one another, denote 0 or 1,
r and s each, independently of one another, denote 0 or 1, and
t and u each, independently of one another, denote 0 or 1.

3. A display according to claim 2, wherein the liquid-crystalline medium comprises
   c) a dielectrically neutral component (component C), which consists of one or more compounds of formula V $$R^{51}-\boxed{A^{51}}-Z^{51}-[\boxed{A^{52}}-Z^{52}]_p-[\boxed{A^{53}}-Z^{53}]_q-\boxed{A^{54}}-R^{52}$$
V in which
$R^{51}$ and $R^{52}$ each, independently of one another, denote H, an unsubstituted alkyl or alkenyl radical having up to 15 C atoms, in which one or more CH$_2$ groups are optionally replaced by —O—, —S—,

[structure]

—C≡C—, —CF$_2$—O—, —O—CF$_2$—, —CO—O— or —O—CO— in such a way that O atoms are not linked directly to one another, —$\boxed{A^{51}}$— to —$\boxed{A^{54}}$— each, independently of one another, denote

[structures shown]

$Z^{51}$ to $Z^{53}$ each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, and
p and q each, independently of one another, denote 0 or 1.

4. A display according to claim 1, wherein the liquid-crystalline medium comprises
   d) a chiral component (component D), which consists of one or more chiral compounds.

5. A display according to claim 2, wherein the second dielectrically negative component (component B) of the liquid-crystalline medium comprises one or more compounds of the formula II.

6. A display according to claim 1, wherein the liquid-crystalline medium comprises one or more compounds of formulae I-1 to I-5:

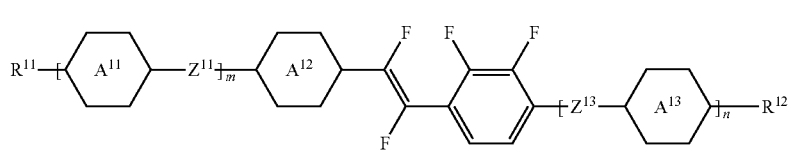

I-1

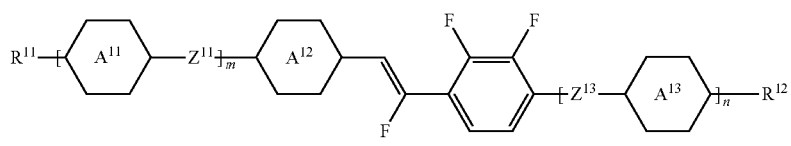

I-2

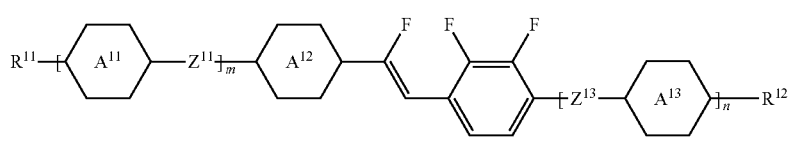

I-3

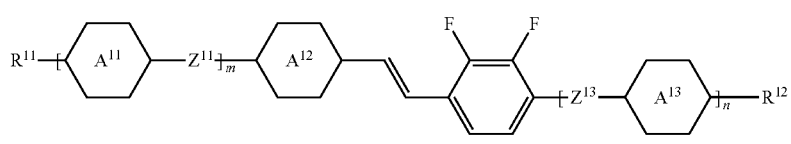

I-4

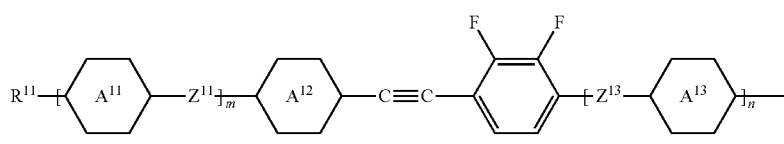

I-5 in which the variables have the meanings given for the compound of formula I.

7. A display according to claim 1, wherein the liquid-crystalline medium comprises one or more compounds of formulae I-1a to I-1g:

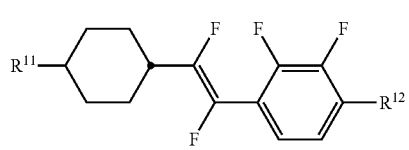

I-1a

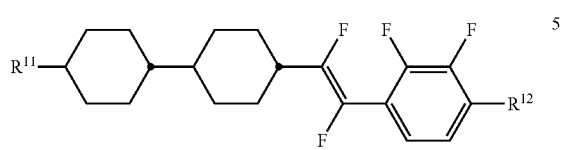

I-1b

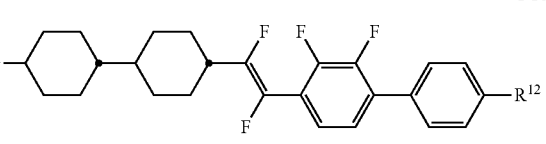

I-1c

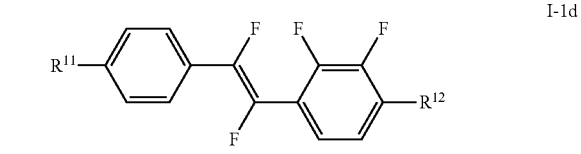

I-1d

-continued

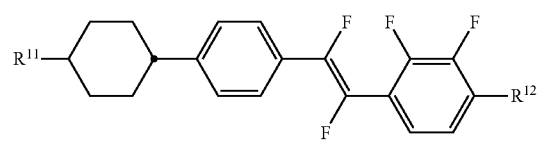

I-1e

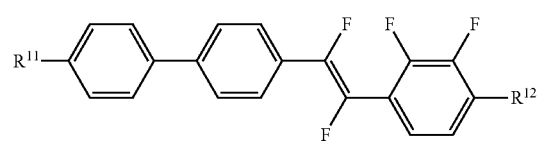

I-1f

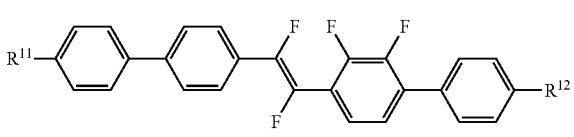

I-1g in which the variables have the meanings given for the compound of formula I.

8. A display according to claim 3, which contains a medium which comprises
   2-80% by weight of one or more compounds of the formula I, and
   2-80% by weight of one or more compounds of the formula II, and/or
   2-80% by weight of one or more compounds of the formula III, and/or 2-80% by weight of one or more compounds of the formula IV, and 2-80% by weight of one or more compounds of the formula V, where the total content of all compounds of the formulae I to V in the medium is 100% by weight or less.

9. A display according to claim 1, which has an active-matrix addressing device.

10. A display according to claim 1, which is based on the VA, ECB, PSVA, FFS or IPS effect.

11. A display according to claim 1, which has an LED backlight and/or a cut-off filter between the backlight and the liquid-crystal cell.

12. A display according to claim 1, which has a backlight, and wherein the light from the backlight which reaches the liquid-crystal medium does not comprise any light having a wavelength of less than 400 nm.

13. A liquid-crystalline medium having negative dielectric anisotropy, which comprises a) a (first) dielectrically negative component (component A), which consists of one or more compounds of formula I

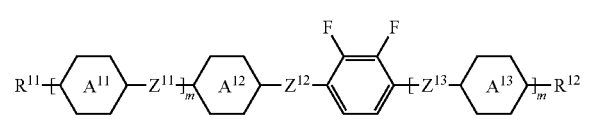

in which $R^{11}$ and $R^{12}$ each, independently of one another, denote H, an unsub-stituted alkyl or alkenyl radical having up to 15 C atoms, in which one or more $CH_2$ groups are optionally replaced by —O—, —S—,

—C≡C—, —$CF_2$—O—, —O—$CF_2$—, —CO—O— or —O—CO— in such a way that O atoms are not linked directly to one another,

and, if present,

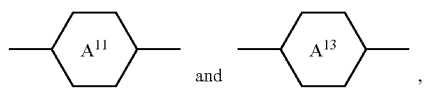

each, independently of one another, denote

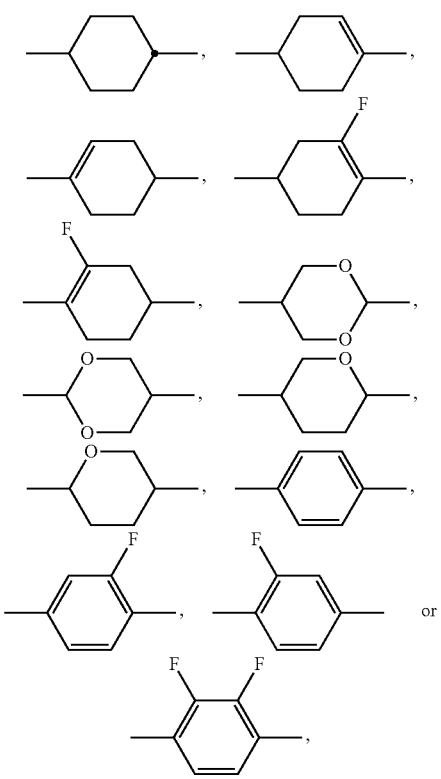

$Z^{12}$ denotes —CF═CF—, —CF═CH—, —CH═CF—, —CH═CH— or —C≡C—, $Z^{11}$ and $Z^{13}$, if present, each, independently of one another, denote —$CH_2$—$CH_2$—, —CH═CH—, —C≡C—, —$CH_2$—O—, —O—$CH_2$—, —CO—O—, —O—CO—, —$CF_2$—O—, —O—$CF_2$—, —$CF_2$—$CF_2$— or a single bond, m and n, independently of one another, denote 0, 1 or 2, and b) a (second) dielectrically negative component (component B).

14. A process for preparing a medium according to claim 13, comprising mixing together one or more compounds of the formula I with one or more compounds that form a dielectrically negative component (component B), which are optionally compounds of formulae II, III and IV, wherein the compound of formula II is not a compound of formula I

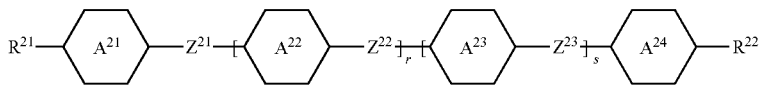

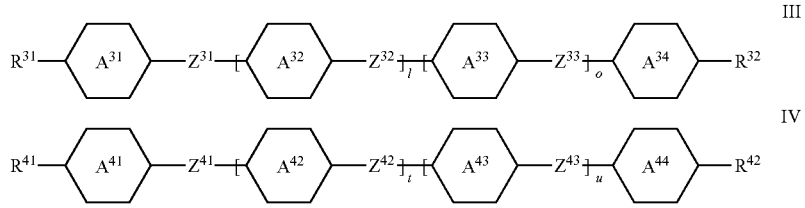

in which $R^{21}$ and $R^{22}$ each, independently of one another, denote H, an unsubstituted alkyl or alkenyl radical having up to 15 C atoms, in which one or more $CH_2$ groups are optionally replaced by —O—, —S—,

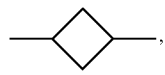

—C≡C—, —CF$_2$—O—, —O—CF$_2$—, —CO—O— or —O—CO— in such a way that O atoms are not linked directly to one another, $R^{31}$, $R^{32}$, $R^{41}$ and $R^{42}$ each, independently of one another, have one of the meanings given for $R^{21}$ and $R^{22}$, one of the rings

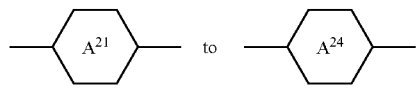

present denotes

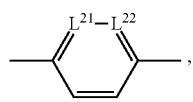

$L^{21}$ and $L^{22}$, independently of one another, denote —C($X^2$)— and one of $L^{21}$ and $L^{22}$ alternatively also denotes =N—, $X^2$ denotes F, Cl, OCF$_3$, CF$_3$, CH$_3$, CH$_2$F, or CHF$_2$, and the other rings, if present, each, independently of one another, denote

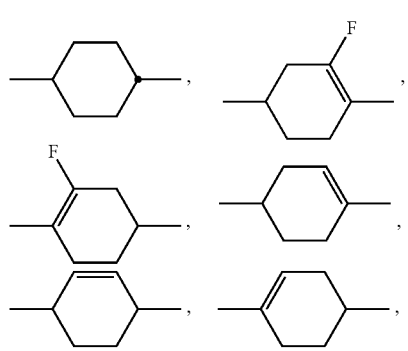

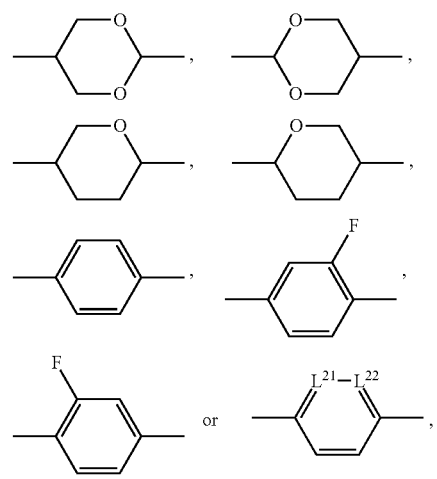

one of the rings

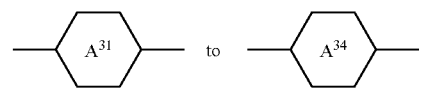

present denotes

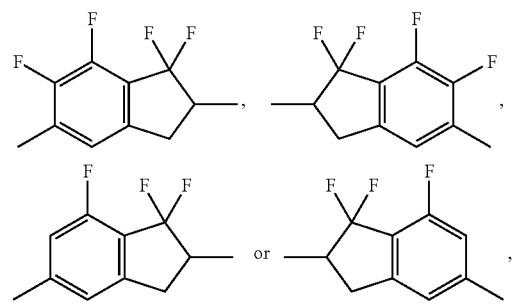

and the others, if present, each, independently of one another, denote

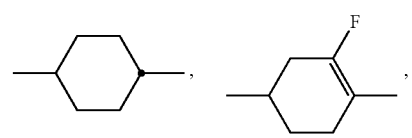

-continued
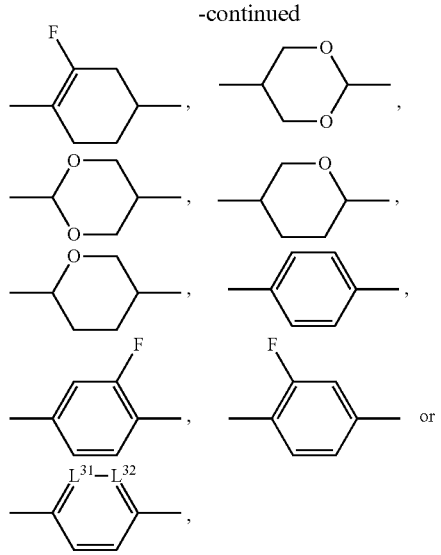
where
L$^{31}$ and L$^{32}$, independently of one another, denote =C(X$^3$)— and one of L$^{31}$ and L$^{32}$ alternatively also denotes =N—, and
X$^3$ denotes F, Cl, OCF$_3$, CF$_3$, CH$_3$, CH$_2$F, or CHF$_2$,
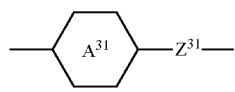
together optionally also denote a single bond,
one of the rings
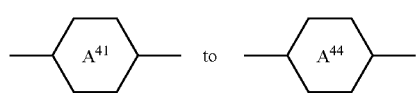
present denotes
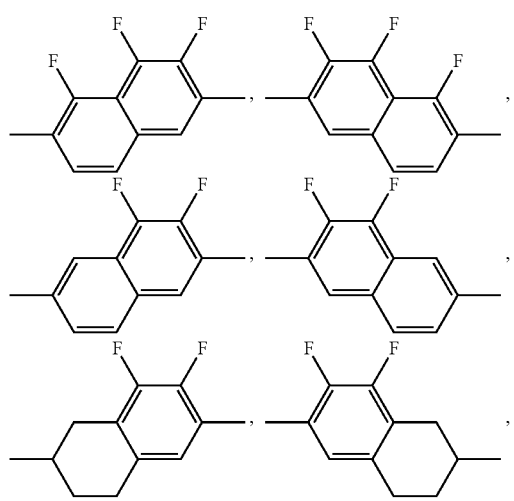
-continued
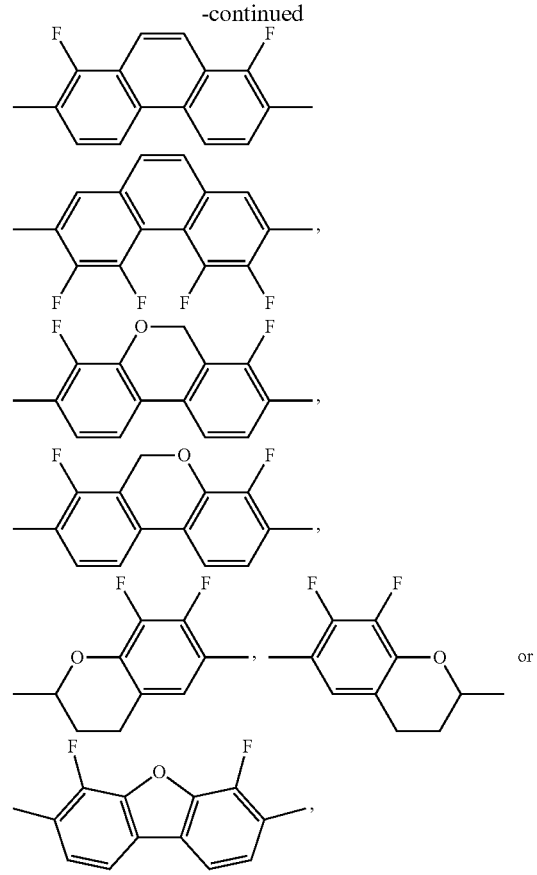
and the others, if present, each, independently of one another, denote
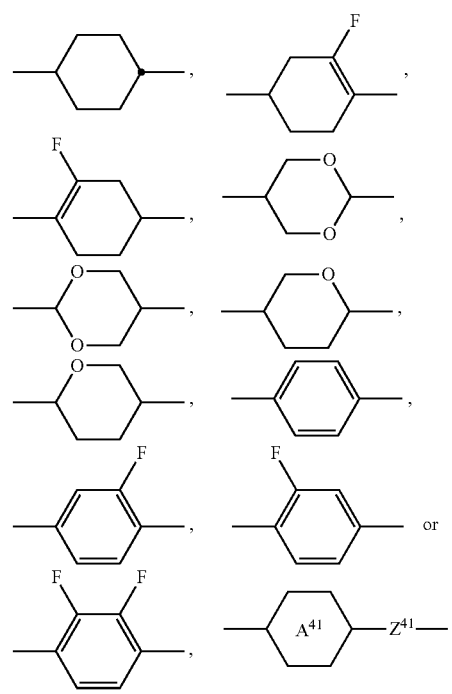

together optionally also denote a single bond,
$Z^{21}$ to $Z^{23}$,
$Z^{31}$ to $Z^{33}$ and
$Z^{41}$ to $Z^{43}$ each, independently of one another, denote
—CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond,
l and o each, independently of one another, denote 0 or 1,
r and s each, independently of one another, denote 0 or 1, and
t and u each, independently of one another, denote 0 or 1, and optionally with one or more compounds of the formula V

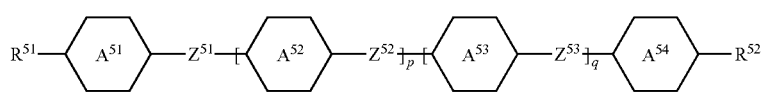

V in which
$R^{51}$ and $R^{52}$ each, independently of one another, denote H, an unsubstituted alkyl or alkenyl radical having up to 15 C atoms, in which one or more CH$_2$ groups are optionally replaced by —O—, —S—,

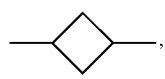

—C≡C—, —CF$_2$—O—, —O—CF$_2$—, —CO—O— or —O—CO— in such a way that O atoms are not linked directly to one another,

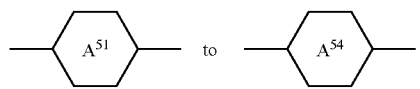

each, independently of one another, denote

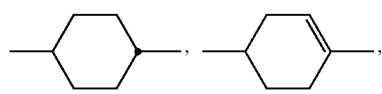

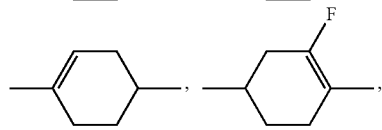

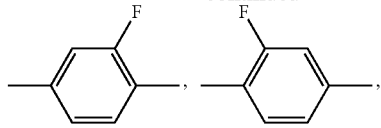

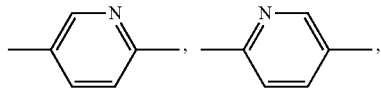

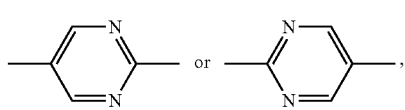

$Z^{51}$ to $Z^{53}$ each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, and p and q each, independently of one another, denote 0 or 1, and optionally with one or more further liquid-crystalline compounds and optionally with one or more dopants, dyes and/or additives.

15. A compound of formula I-1'

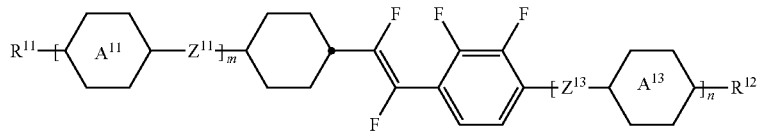

I-1' in which

R$^{11}$ and R$^{12}$ each, independently of one another, denote H, an unsubstituted alkyl or alkenyl radical having up to 15 C atoms, in which one or more CH$_2$ groups are optionally replaced by —O—, —S—,

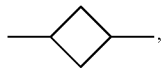

—C≡C—, —CF$_2$—O—, —O—CF$_2$—, —CO—O— or —O—CO— in such a way that 0 atoms are not linked directly to one another,

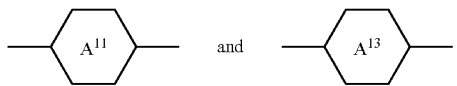

if present, each, independently of one another, denote

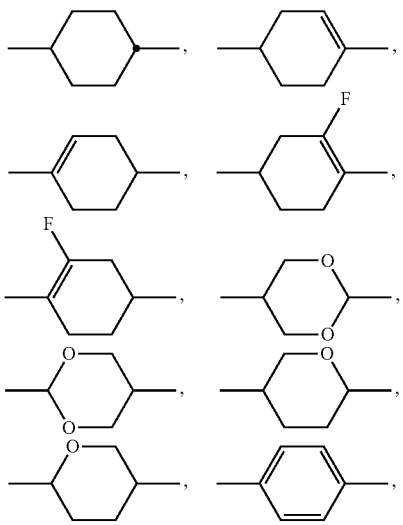

-continued

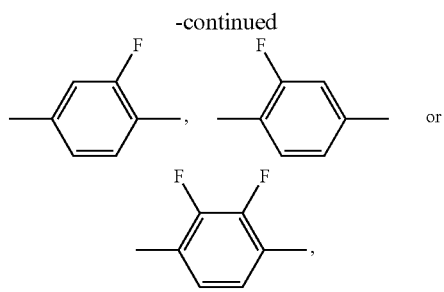

Z$^{11}$ and Z$^{13}$ if present, each, independently of one another, denote —CH$_2$—CH$_2$—, —CH═CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, m and n independently of one another, denote 0, 1 or 2.

16. A compound according to claim 15, which is of one of formulae I-1a, I-1b and I-1c:

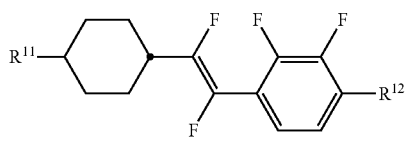

I-1a

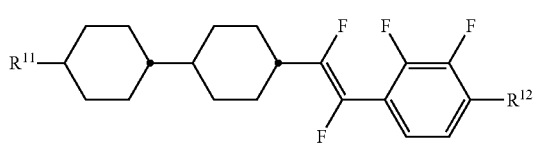

I-1b

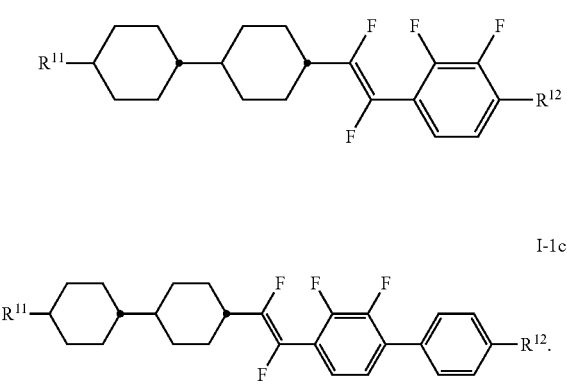

I-1c wherein R$^{11}$ and R$^{12}$ are as defined for the compound of formula I-1'.

17. A process for preparing a compound according to claim 15, comprising reacting a 1,2-difluoroethylene halide with an arylboronic acid in a cross-coupling.

18. A liquid-crystalline medium according to claim 13, which comprises c) a dielectrically neutral component (component C), which consists of one or more compounds of formula V

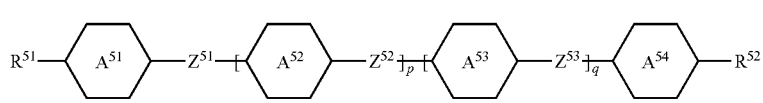

V in which

R$^{51}$ and R$^{52}$ each, independently of one another, denote H, an unsubstituted alkyl or alkenyl radical having up to 15 C atoms, in which one or more CH$_2$ groups are optionally replaced by —O—, —S—,

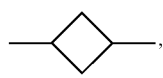

—C≡C—, —CF$_2$—O—, —O—CF$_2$—, —CO—O— or —O—CO— in such a way that O atoms are not linked directly to one another,

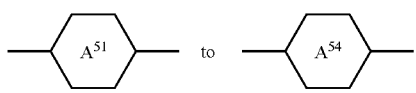

each, independently of one another, denote

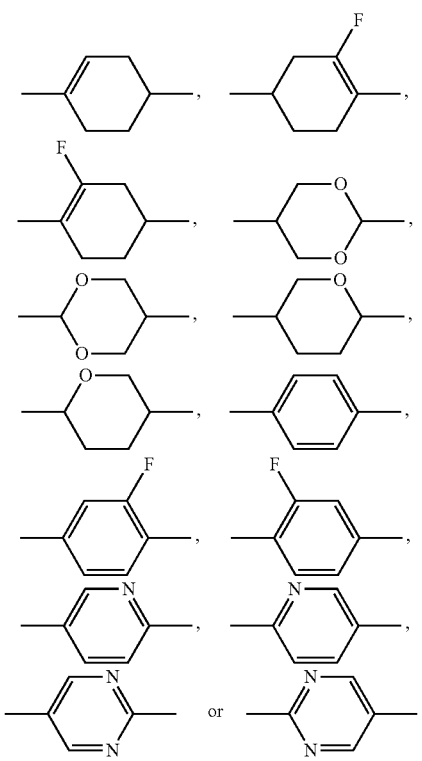

or $Z^{51}$ to $Z^{53}$ each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond, and p and q each, independently of one another, denote 0 or 1.

19. A liquid-crystalline medium according to claim 13, wherein, in the compound of formula I, (m+n) denotes 0, 1 or 2.

20. A display according to claim 1, wherein, in the compound of formula I, (m+n) denotes 0, 1 or 2.

21. A display according to claim 1, wherein the liquid-crystalline medium comprises c) a dielectrically neutral component (component C), which consists of one or more compounds of formula V

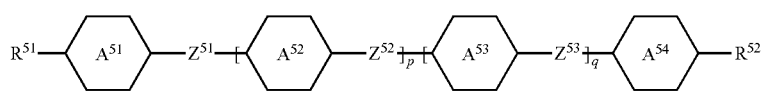

in which $R^{51}$ and $R^{52}$ each, independently of one another, denote H, an unsubstituted alkyl or alkenyl radical having up to 15 C atoms, in which one or more CH$_2$ groups are optionally replaced by —O—, —S—,

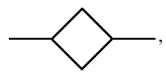

—C≡C—, —CF$_2$—O—, —O—CF$_2$—, —CO—O— or —O—CO— in such a way that O atoms are not linked directly to one another,

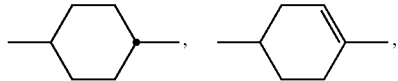

each, independently of one another, denote

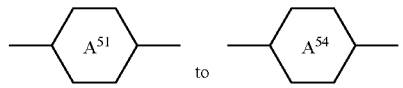

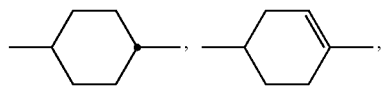

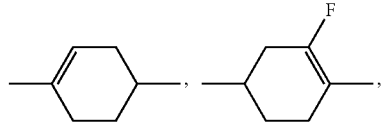

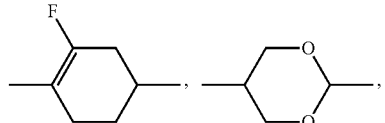

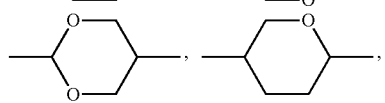

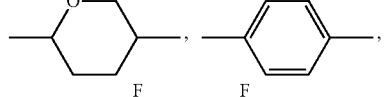

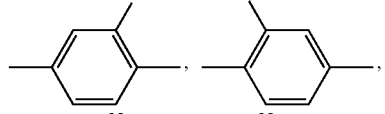

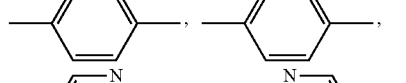

$Z^{51}$ to $Z^{53}$ each, independently of one another, denote —CH$_2$—CH$_2$—, —CH=CH—, —C≡C—, —CH$_2$—

O—, —O—CH$_2$—, —CO—O—, —O—CO—, —CF$_2$—O—, —O—CF$_2$—, —CF$_2$—CF$_2$— or a single bond, and p and q each, independently of one another, denote 0 or 1.

22. A liquid-crystalline medium according to claim 13, wherein the second dielectrically negative component (component B) of the liquid-crystalline medium consists of one or more compounds of formulae II, III and IV, wherein the compound of formula II is not a compound of formula I:

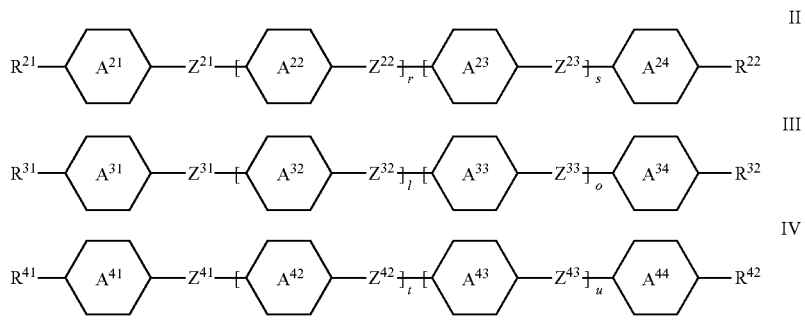

in which

R$^{21}$ and R$^{22}$ each, independently of one another, denote H, an unsubstituted alkyl or alkenyl radical having up to 15 C atoms, in which one or more CH$_2$ groups are optionally replaced by —O—, —S—,

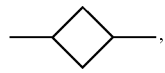

—C≡C—, —CF$_2$—O—, —O—CF$_2$—, —CO—O— or —O—CO— in such a way that O atoms are not linked directly to one another, R$^{31, R32, R41\ and\ R}$42 each, independently of one another, have one of the meanings given for R$^{21}$ and R$^{22}$, one of the rings

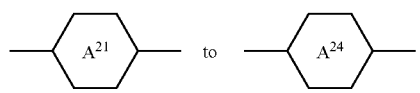

present denotes

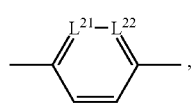

L$^{21}$ and L$^{22}$, independently of one another, denote =C(X$^2$)— and one of L$^{21}$ and L$^{22}$ alternatively also denotes —N—, X$^2$ denotes F, Cl, OCF$_3$, CF$_3$, CH$_3$, CH$_2$F, or CHF$_2$, and the other rings, if present, each, independently of one another, denote

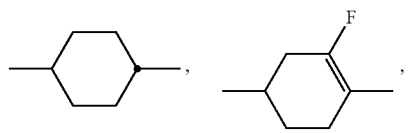

-continued

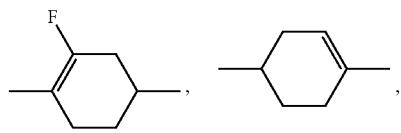

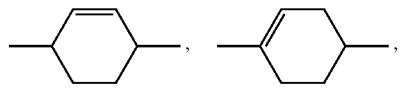

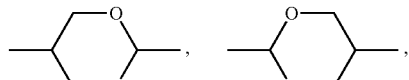

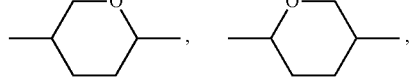

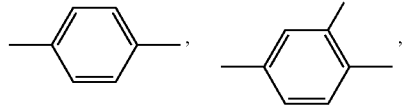

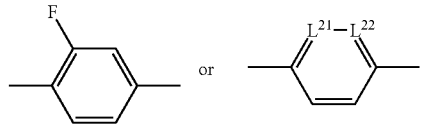

one of the rings

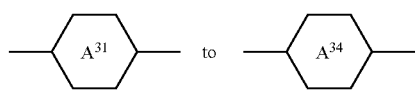

present denotes

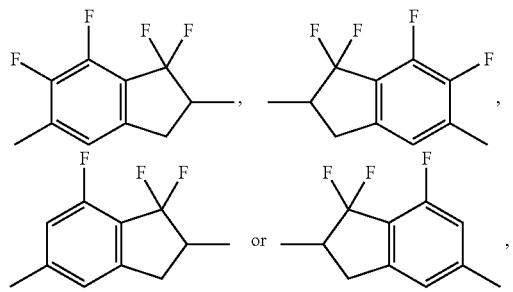

and the others, if present, each, independently of one another, denote

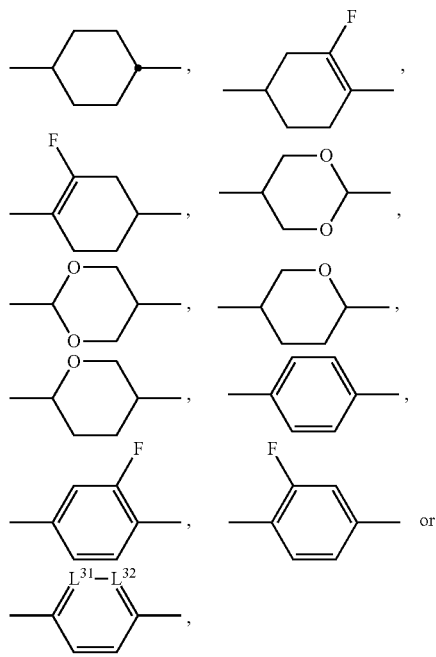

where
$L^{31}$ and $L^{32}$, independently of one another, denote $=C(X^3)-$ and one of $L^{31}$ and $L^{32}$ alternatively also denotes $=N-$, and
$X^3$ denotes F, Cl, $OCF_3$, $CF_3$, $CH_3$, $CH_2F$, or $CHF_2$,

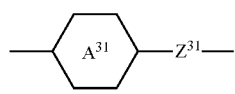

together optionally also denote a single bond,
one of the rings

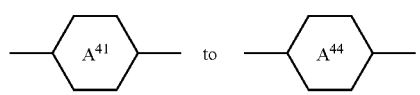

present denotes

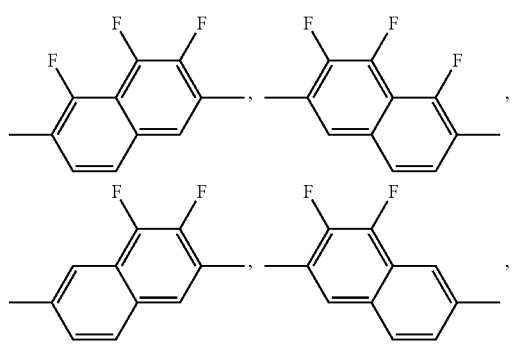

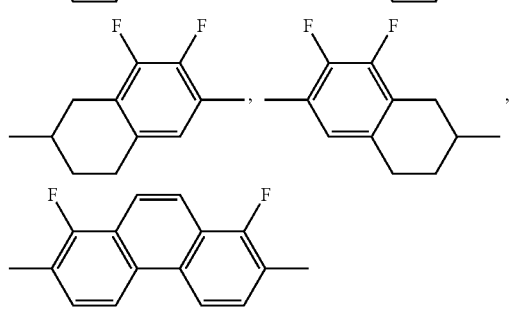

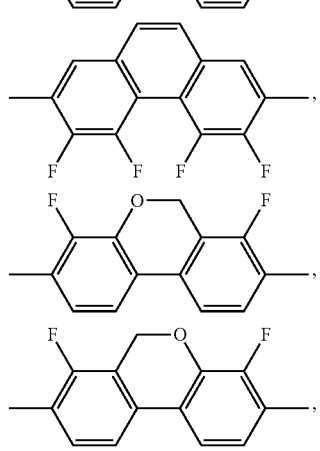

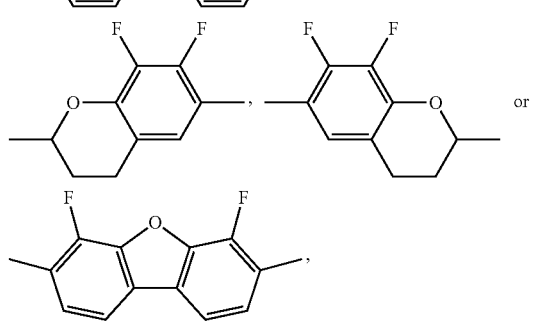

and the others, if present, each, independently of one another, denote

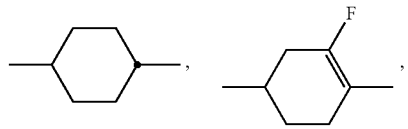

-continued

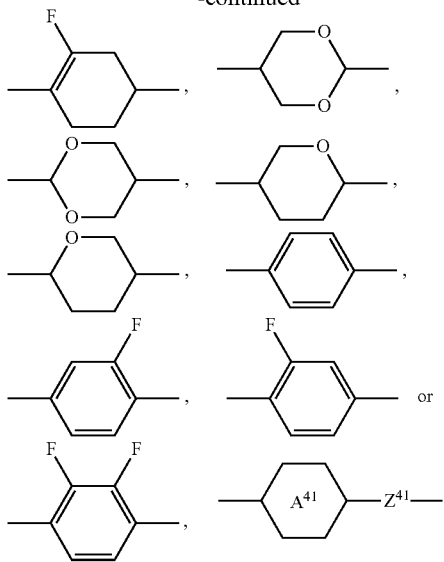

together optionally also denote a single bond,
$Z^{21}$ to $Z''$,
$Z^{31}$ to $Z^{33}$ and
$Z^{41}$ to $Z^{43}$ each, independently of one another, denote —CH$_2$—CH$_2$—, —CH=CH—, —C≡C—, —CH$_2$—O—, —O—CH$_2$—, —CO—O—, —O—CO—, —CF$_2$—O—, —O—CF$_2$—, —CF$_2$—CF$_2$— or a single bond,
l and o each, independently of one another, denote 0 or 1,
r and s each, independently of one another, denote 0 or 1, and
t and u each, independently of one another, denote 0 or 1.

23. A liquid-crystalline medium according to claim 13, comprising one or more compounds of formulae I-1a to I-1g:

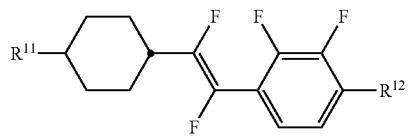

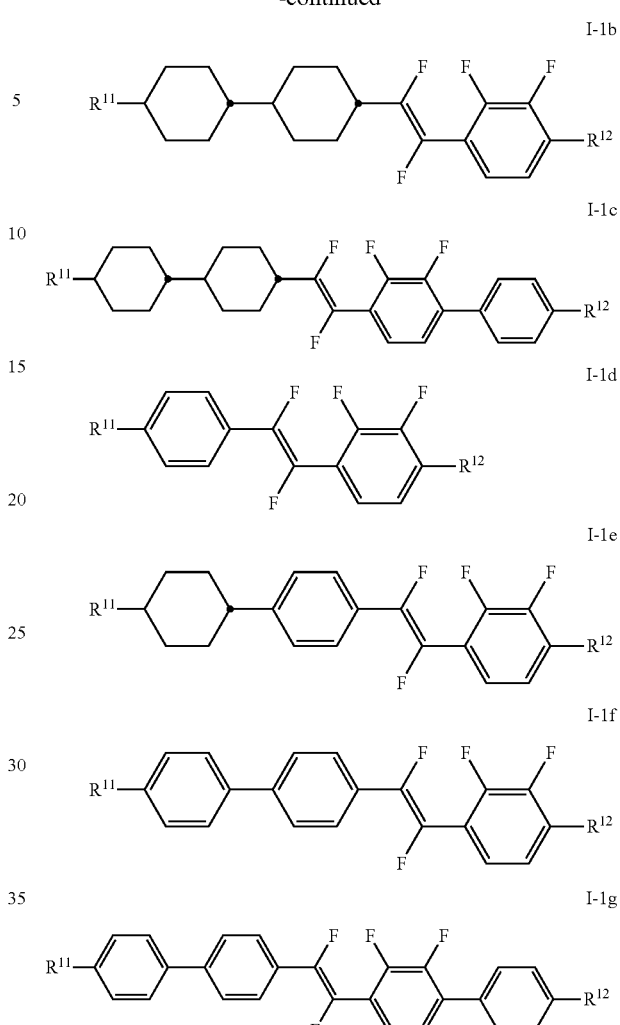

in which the variables have the meanings given for the compound of formula I.

* * * * *